(12) United States Patent
Kato et al.

(10) Patent No.: US 9,876,987 B2
(45) Date of Patent: *Jan. 23, 2018

(54) COMMUNICATION TERMINAL, COMMUNICATION METHOD AND COMPUTER READABLE INFORMATION RECORDING MEDIUM

(71) Applicant: RICOH COMPANY, LTD., Tokyo (JP)

(72) Inventors: Yoshinaga Kato, Kanagawa (JP); Kenji Tanaka, Kanagawa (JP); Shizu Kanauchi, Kanagawa (JP); Masaki Nakagawa, Kanagawa (JP); Alain Volmat, Tokyo (JP); Takahiro Asai, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/472,999

(22) Filed: Mar. 29, 2017

(65) Prior Publication Data

US 2017/0201718 A1    Jul. 13, 2017

Related U.S. Application Data

(63) Continuation of application No. 13/883,481, filed as application No. PCT/JP2011/075522 on Oct. 28, 2011, now Pat. No. 9,654,730.

(30) Foreign Application Priority Data

Nov. 4, 2010 (JP) ................................ 2010-247551
Nov. 30, 2010 (JP) ................................ 2010-267757
Aug. 1, 2011 (JP) ................................ 2011-168464

(51) Int. Cl.
  *H04N 7/14* (2006.01)
  *H04N 7/15* (2006.01)
  *H04N 5/445* (2011.01)

(52) U.S. Cl.
  CPC ........... *H04N 7/15* (2013.01); *H04N 5/44513* (2013.01); *H04N 7/142* (2013.01); *H04N 7/147* (2013.01)

(58) Field of Classification Search
  USPC ....................................................... 384/14.07
  See application file for complete search history.

(56) References Cited

U.S. PATENT DOCUMENTS

| 6,760,749 B1 | 7/2004 | Dunlap et al. |
| 2005/0052528 A1* | 3/2005 | Ohkawa ................. H04N 7/147 348/14.08 |

(Continued)

FOREIGN PATENT DOCUMENTS

| JP | H09-101767 | 4/1997 |
| JP | 2002-271763 | 9/2002 |

(Continued)

OTHER PUBLICATIONS

International Search Report dated Feb. 21, 2012, in PCT/JP2011/075522 filed Oct. 28, 2011.

(Continued)

*Primary Examiner* — Amal Zenati
(74) *Attorney, Agent, or Firm* — Oblon, McClelland, Maier & Neustadt, L.L.P.

(57) ABSTRACT

A communication terminal receives display data for displaying certain data on a screen of a display device and image data of an optical-to-electrical-converted image from another communication terminal via a communication network, includes a storage part storing reception information indicating whether the display data has been received by the communication terminal and arrangement information indicating at least one of a size and a position of the image based on the image data, in a manner of associating with one another; a reception part receiving the display data and the image data; an extraction part extracting, based on the reception information, the corresponding arrangement information from the storage part; and a display control part (Continued)

displaying the image using the image data based on the arrangement information extracted by the extraction part.

18 Claims, 53 Drawing Sheets

(56) References Cited

U.S. PATENT DOCUMENTS

| | | |
|---|---|---|
| 2005/0232581 A1 | 10/2005 | Karasawa |
| 2007/0200922 A1 | 8/2007 | Ueno et al. |
| 2008/0316295 A1 | 12/2008 | King et al. |
| 2009/0153751 A1* | 6/2009 | Asakura ............... G06F 3/1454 348/744 |
| 2010/0222113 A1 | 9/2010 | Anzai |
| 2010/0226546 A1 | 9/2010 | Tanaka |
| 2011/0261142 A1 | 10/2011 | Shanmukhadas et al. |

FOREIGN PATENT DOCUMENTS

| | | |
|---|---|---|
| JP | 2003-163905 | 6/2003 |
| JP | 2007-104273 | 4/2007 |
| JP | 2009-130880 | 6/2009 |
| JP | 2010-206745 A | 9/2010 |
| WO | WO 2009/112547 A1 | 9/2009 |

OTHER PUBLICATIONS

Extended Search Report dated Aug. 6, 2015, in European Patent Application No. 11838108.6.
Office Action dated Nov. 9, 2015, in Canadian Patent Application No. 2,814,941.
Japanese Office Action dated Jan. 19, 2016, in Patent Application No. 2011-168464 (without English Translation).

* cited by examiner

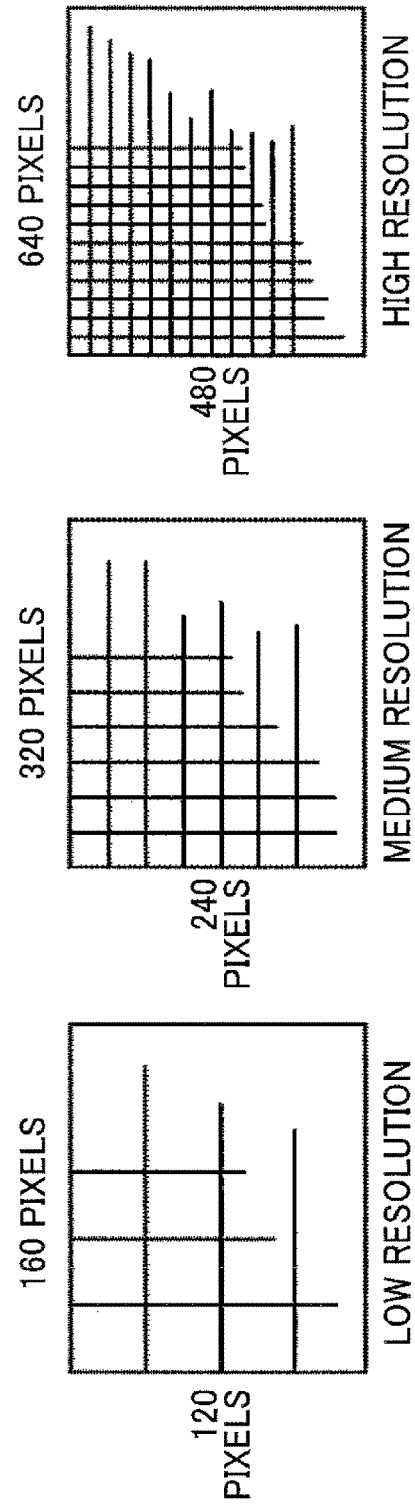

FIG.7

CHANGE QUALITY MANAGEMENT TABLE

| IP ADDRESS OF RELAY DESTINATION TERMINAL | IMAGE QUALITY (QUALITY OF IMAGE) OF IMAGE DATA TO RELAY |
|---|---|
| 1.3.2.4 | HIGH IMAGE QUALITY |
| 1.3.1.3 | LOW IMAGE QUALITY |
| 1.3.4.3 | MEDIUM IMAGE QUALITY |
| ... | ... |

FIG.8

RELAY APPARATUS MANAGEMENT TABLE

| RELAY APPARATUS ID | OPERATING STATE | RECEPTION DATE AND TIME | IP ADDRESS OF RELAY APPARATUS | MAXIMUM DATA TRANSMISSION RATE (Mbps) |
|---|---|---|---|---|
| 111a | ON-LINE | 2009.11.10.13:00 | 1.2.1.2 | 100 |
| 111b | ON-LINE | 2009.11.10.13:10 | 1.2.2.2 | 1000 |
| 111c | OFF-LINE | 2009.11.10.13:20 | 1.3.1.2 | 100 |
| 111d | ON-LINE | 2009.11.10.13:30 | 1.3.2.2 | 10 |

FIG.9

TERMINAL AUTHENTICATION MANAGEMENT TABLE

| TERMINAL ID | PASSWORD |
|---|---|
| 01aa | aaaa |
| 01ab | abab |
| 01ba | baba |
| ... | ... |

FIG.10

TERMINAL MANAGEMENT TABLE

| TERMINAL ID | OPERATING STATE | RECEPTION DATE AND TIME | IP ADDRESS OF TERMINAL |
|---|---|---|---|
| 01aa | ON-LINE | 2009.11.10.13:40 | 1.2.1.3 |
| 01ab | OFF-LINE | 2009.11.09.12:00 | 1.2.1.4 |
| 01ba | ON-LINE | 2009.11.10.13:45 | 1.2.2.3 |
| ... | ... | ... | ... |
| 01db | ON-LINE | 2009.11.10.13:50 | 1.3.2.4 |

FIG.11

DESTINATION LIST MANAGEMENT TABLE

| REQUEST SOURCE TERMINAL ID | DESTINATION TERMINAL ID |
|---|---|
| 01aa | 01ab,01ba,01db |
| 01ab | 01aa,01ba,01ca |
| 01ba | 01aa,01ab,01cb,01da |
| ... | ... |
| 01db | 01aa,01ab,01da |

FIG.12

SESSION MANAGEMENT TABLE

| SELECTION SESSION ID | RELAY APPARATUS ID | REQUEST SOURCE TERMINAL ID | DESTINATION TERMINAL ID | DELAY TIME (ms) | DELAY INFORMATION RECEPTION DATE AND TIME |
|---|---|---|---|---|---|
| se1 | 111a | 01aa | 01db | 200 | 2009.11.10.14:00 |
| se2 | 111b | 01ba | 01ca | 50 | 2009.11.10.14:10 |
| se3 | 111d | 01bb | 01da | 400 | 2009.11.10.14:20 |
| ... | ... | ... | ... | ... | ... |

FIG.13

ADDRESS PRIORITY MANAGEMENT TABLE

| DOT ADDRESS DIFFERENCES | ADDRESS PRIORITY |
|---|---|
| SAME . SAME . SAME . DIFF | 5 |
| SAME . SAME . DIFF . − | 3 |
| SAME . DIFF . − . − | 1 |
| DIFF . − . − . − | 0 |

FIG.14

TRANSMISSION RATE PRIORITY MANAGEMENT TABLE

| MAXIMUM DATA TRANSMISSION RATE IN RELAY APPARATUS (Mbps) | TRANSMISSION RATE PRIORITY |
|---|---|
| 1000 ~ | 5 |
| 100 ~ 1000 | 3 |
| 10 ~ 100 | 1 |
| ~ 10 | 0 |

FIG.15

QUALITY MANAGEMENT TABLE

| DELAY TIME (ms) | IMAGE QUALITY (QUALITY OF IMAGE) OF IMAGE DATA |
|---|---|
| 0 ~ 100 | HIGH IMAGE QUALITY |
| 100 ~ 300 | MEDIUM IMAGE QUALITY |
| 300 ~ 500 | LOW IMAGE QUALITY |
| 500 ~ | (INTERRUPTION) |

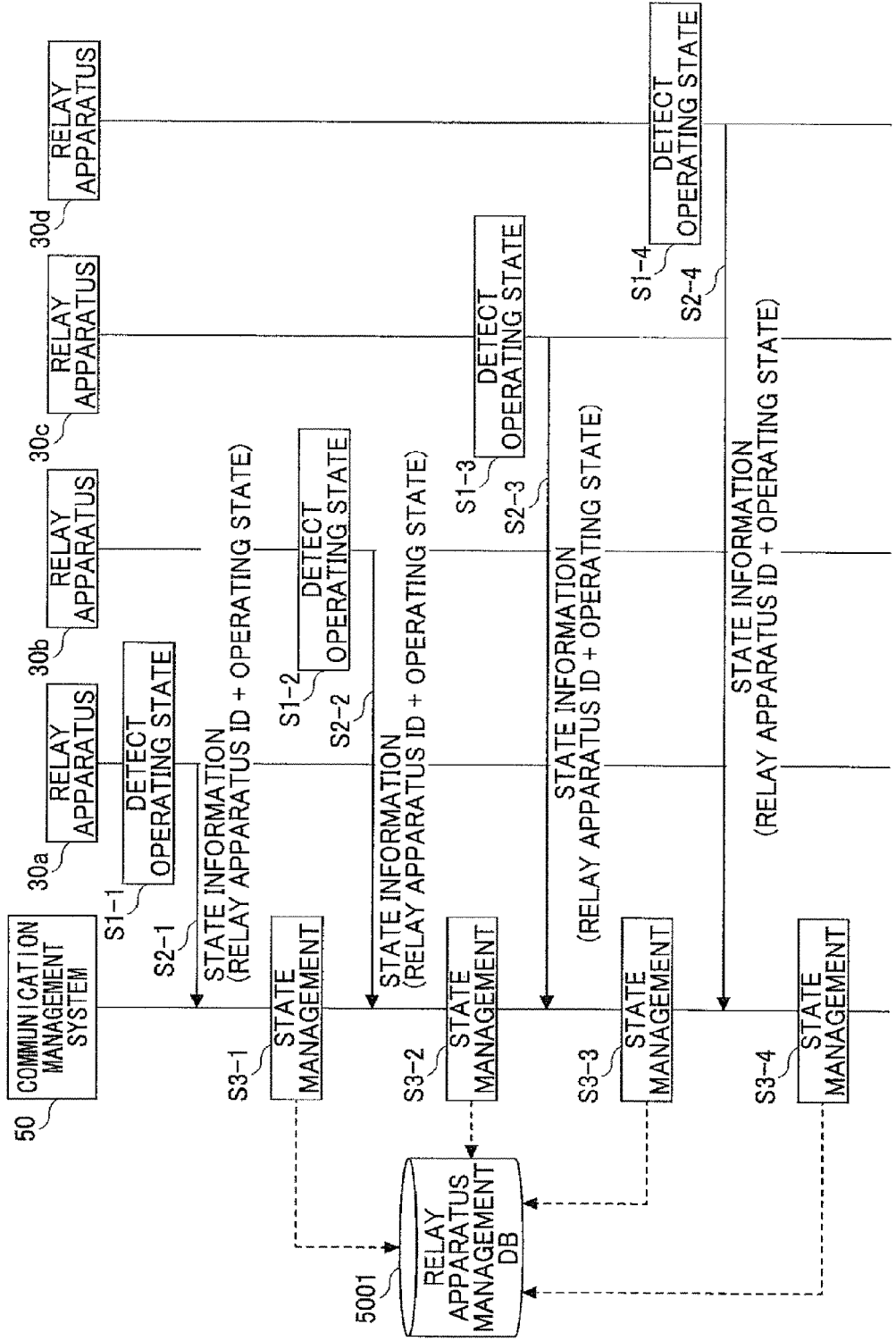

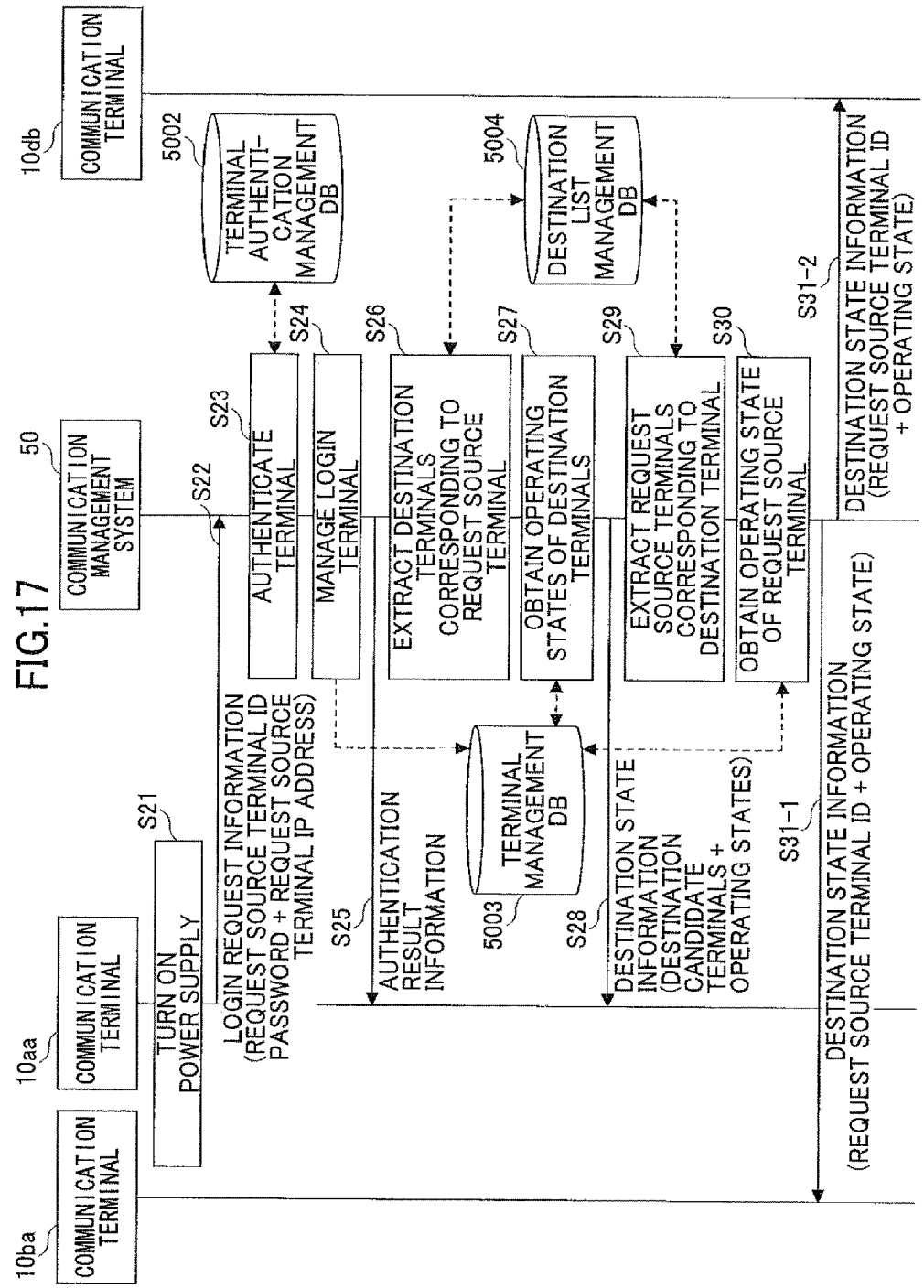

FIG.20

| RELAY APPARATUS ID | ADDRESS PRIORITY | | POINT FOR TRANSMISSION RATE PRIORITY | TOTAL POINT |
|---|---|---|---|---|
| | POINT FOR TERMINAL 10aa | POINT FOR TERMINAL 10bd | | |
| 111a | 5 | 1 | 3 | 8 |
| 111b | 3 | 1 | 5 | 8 |
| 111c | - | - | - | - |
| 111d | 1 | 5 | 1 | 6 |

FIG.24

| ARRANGEMENT INFORMATION No. | ARRANGEMENT INFORMATION | SHARE FLAG |
|---|---|---|
| 1 | VIEW_MULTI | UNSHARED |
| 2 | SHARED_MULTI | SHARED |

FIG.25

| ARRANGEMENT INFORMATION | AREA 1 | AREA 2 | AREA 3 |
|---|---|---|---|
| SHARED_MULTI | DISPLAY DATA | IMAGE DATA OF REMOTE COMMUNICATION TERMINAL 10aa | IMAGE DATA OF REMOTE COMMUNICATION TERMINAL 10db |
| VIEW_MULTI | IMAGE DATA OF REMOTE COMMUNICATION TERMINAL 10aa | IMAGE DATA OF REMOTE COMMUNICATION TERMINAL 10db | — |

FIG.28

| MATERIAL NAME | SIZE | APPLICATION NAME | UPDATED TIME AND DATE | MATERIAL DATA |
|---|---|---|---|---|
| ××PROJECT BOOK | 182KB | DOCUMENT COMPOSITION SOFTWARE | 2010/03/19 | ××MATERIAL DATA.doc |
| △△PROCESS SCHEME | 65KB | SPREADSHEET SOFTWARE | 2010/03/20 | △△PROCESS SCHEME.xls |
| OPERATING INSTRUCTIONS | 2,311KB | PRESENTATION SOFTWARE | 2010/03/21 | OPERATING INSTRUCTIONS.ppt |
| ... | ... | ... | ... | ... |

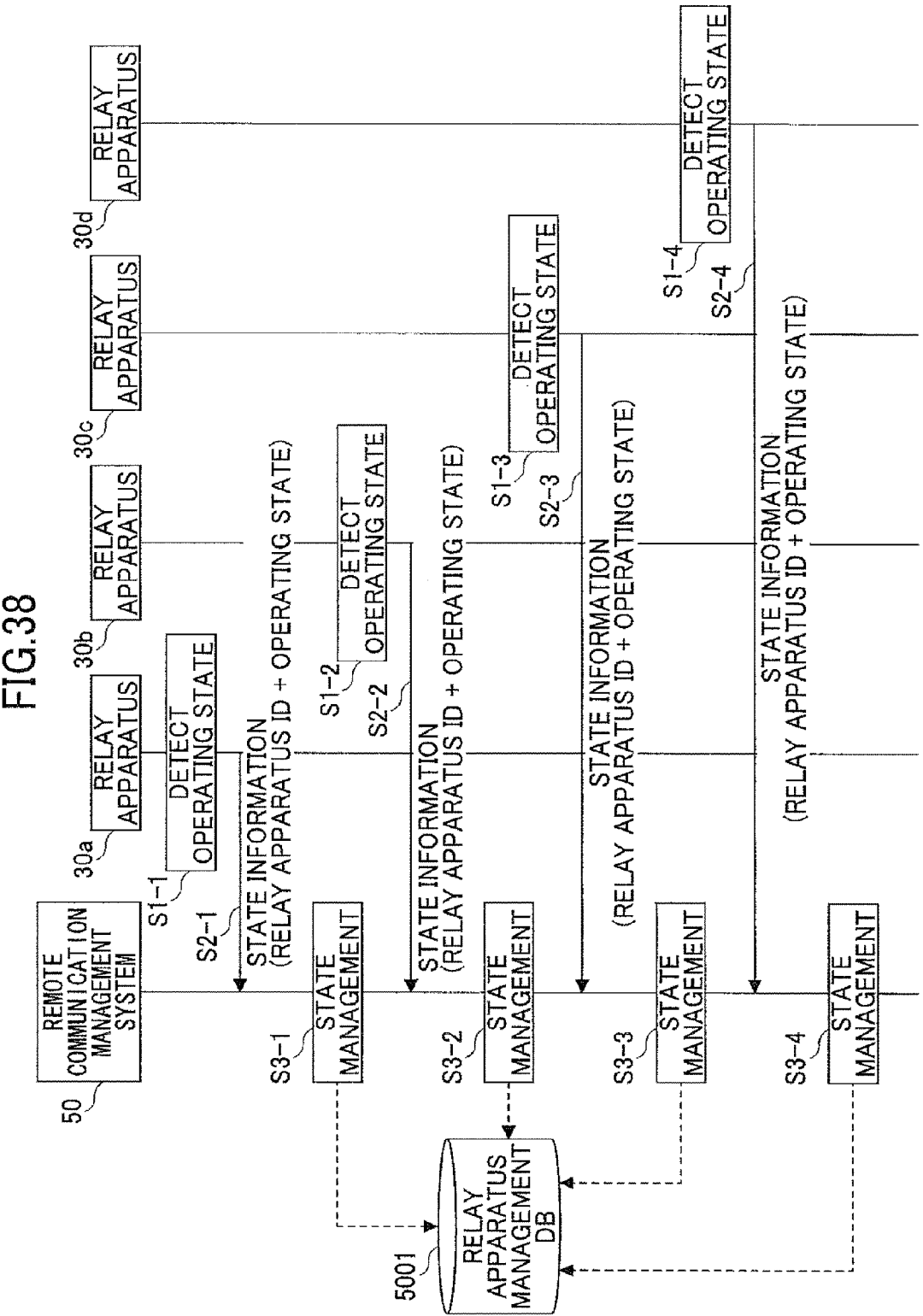

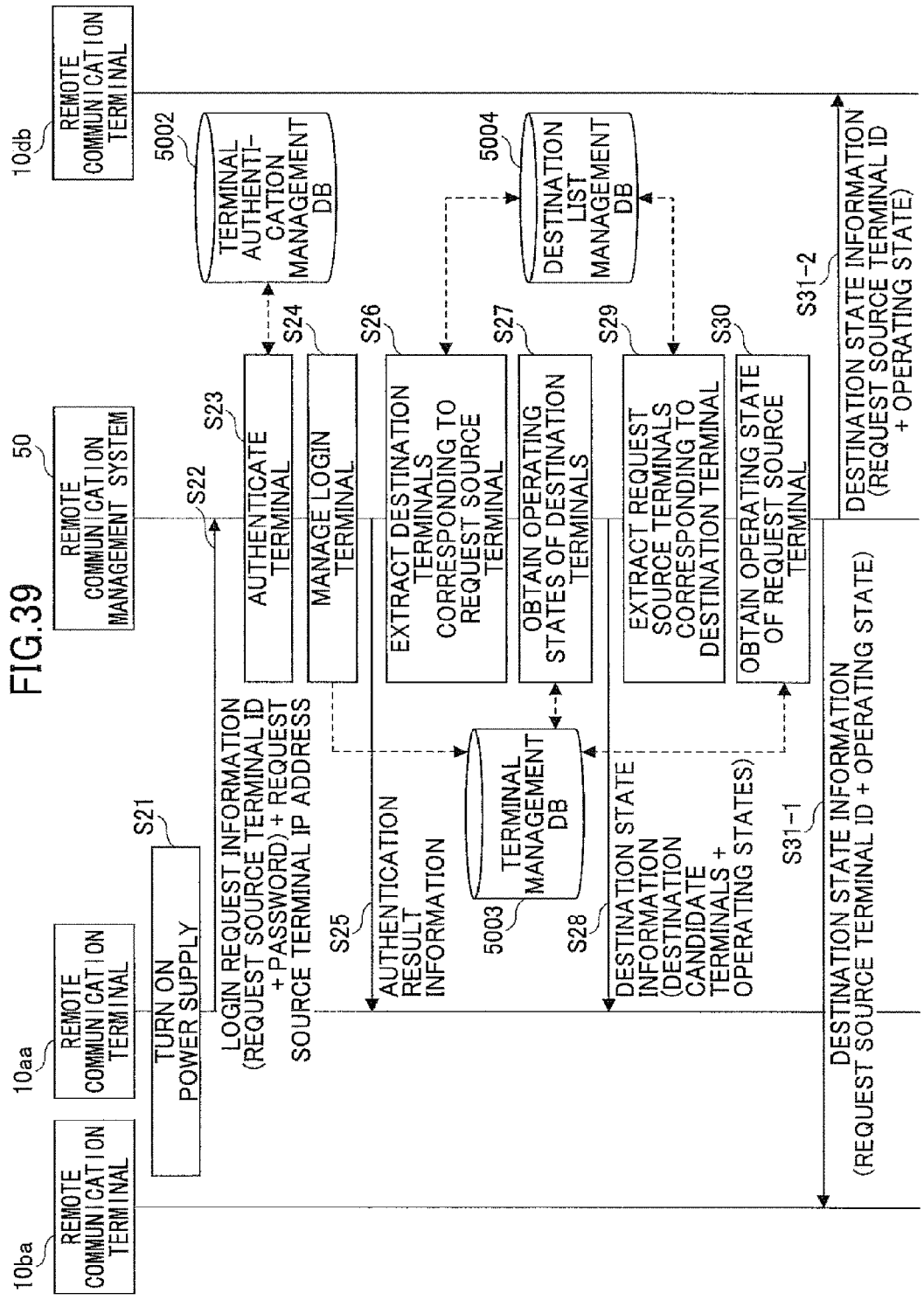

FIG.45

ARRANGEMENT INFORMATION MANAGEMENT TABLE

| RECEPTION INFORMATION | AREA 1 | AREA 2 | AREA 3 |
|---|---|---|---|
| RECEIVED | DISPLAY DATA | IMAGE DATA OF REMOTE COMMUNICATION TERMINAL 10aa | IMAGE DATA OF REMOTE COMMUNICATION TERMINAL 10db |
| NOT RECEIVED | IMAGE DATA OF REMOTE COMMUNICATION TERMINAL 10aa | IMAGE DATA OF REMOTE COMMUNICATION TERMINAL 10db | — |

# COMMUNICATION TERMINAL, COMMUNICATION METHOD AND COMPUTER READABLE INFORMATION RECORDING MEDIUM

CROSS-REFERENCE TO RELATED APPLICATIONS

The present patent application is a continuation of and claims the benefit of priority under 35 U.S.C. §120 from U.S. application Ser. No. 13/883,481, filed May 3, 2013, which is a national stage of International Application No. PCT/JP2011/075522, filed Oct. 28, 2011, which is based on and claims the benefit of priority under 35 U.S.C. §119 from Japanese Priority Patent Application No. 2010-247551, filed Nov. 4, 2010, Japanese Priority Patent Application No. 2010-267757, filed Nov. 30, 2010 and Japanese Priority Patent Application No. 2011-168464, filed Aug. 1, 2011, the entire contents of all of which are hereby incorporated by reference.

TECHNICAL FIELD

The disclosure relates to a communication terminal (or remote communication terminal) which is capable of receiving display data for displaying certain data on a screen of a display device and image data of an optical-to-electrical-converted image, from another communication terminal (or remote communication terminal) via a communication network (or remote communication network).

BACKGROUND ART

Recently, along with a demand to reduce business trip costs and business trip man hours, communication systems (or remote communication systems) carrying out a TV conference using a communication network (or remote communication network) such as the Internet have become widespread. In such a communication system, display data for displaying material data on a screen, image data and/or voice data are transmitted among plural communication terminals (or remote communication terminals), and thus a TV conference is achieved. Further, thanks to recent improvements of broadband environments, it becomes possible to transmit image data of high image quality and voice data of high voice quality. Therefore, it becomes possible to easily determine a situation of another person with whom a TV conference is being conducted, and it becomes possible to improve fullness of mutual understanding achieved by conversation during the TV conference.

Further, since a communication terminal (or remote communication terminal) becomes capable of transmitting and receiving a large amount of display data simultaneously, it becomes possible for each participant of a TV conference to read conference material while determining a situation of another participant, as a result of image data and the display data being displayed from a display device simultaneously (see U.S. Pat. No. 6,760,749).

However, there may be a case where no material is used in a TV conference. In such a case, nothing is displayed at an area prepared for displaying material data on a display device, and an area prepared for displaying image data of a participant of the TV conference is as is in the original state. It is possible to omit the area displaying nothing so that the area displaying image data is widened, and the image data becomes easier to watch. However, for this purpose, the areas on the display device are to be changed by manual operations.

Further, after the area displaying the image data is widened, there may be a case where during the TV conference, it becomes necessary to use material. Also in such a case, the areas on the display device are to be changed to widen the area displaying the material so that the material becomes easy to be seen, and thus, manual operations become necessary again. Such manual operations may be troublesome for the participants who are conducting the TV conference.

SUMMARY OF INVENTION

According to an embodiment of the present invention, a communication terminal (or remote communication terminal), which is capable of receiving display data for displaying certain data on a display device and image data of an optical-to-electrical-converted image, from another communication terminal (or remote communication terminal) via a communication network (or remote communication network), includes a storage part configured to store reception information indicating whether the display data has been received and arrangement information indicating at least one of a size and a position of an image based on the image data to be displayed on the display device in a manner of associating them together; a reception part configured to receive the display data and the image data; an extraction part configured to extract, based on the reception information, the corresponding arrangement information from the storage part; and a display control part configured to display, based on the arrangement information extracted by the extraction part, images according to the image data on the screen of the display device.

Other objects, features and advantages of the present invention will become more apparent from the following detailed description when read in conjunction with the accompanying drawings.

BRIEF DESCRIPTION OF DRAWINGS

FIG. 6A shows an example of image data of a low resolution for illustrating image quality according to the first and second embodiments;

FIG. 6B shows an example of image data of a medium resolution for illustrating image quality according to the first and second embodiments;

FIG. 6C shows an example of image data of a high resolution for illustrating image quality according to the first and second embodiments;

FIG. 7 shows a concept of an example of a change quality management table according to the first and second embodiments;

FIG. 8 shows a concept of an example of a relay apparatus management table according to the first and second embodiments;

FIG. 9 shows a concept of an example of a terminal authentication management table according to the first and second embodiments;

FIG. 10 shows a concept of an example of a terminal management table according to the first and second embodiments;

FIG. 11 shows a concept of an example of a destination list management table according to the first and second embodiments;

FIG. 12 shows a concept of an example of a session management table according to the first and second embodiments;

FIG. 13 shows a concept of an example of an address priority management table according to the first and second embodiments;

FIG. 14 shows a concept of an example of a transmission rate priority management table according to the first and second embodiments;

FIG. 15 shows a concept of an example of a quality management table according to the first and second embodiments;

FIG. 16 shows an example of a sequence diagram of a process of managing state information indicating an operating state of each of the relay apparatuses according to the first embodiment;

FIG. 17 shows an example of a sequence diagram of a process of a preparation step for starting communication between the communication terminals according to the first embodiment;

FIG. 20 shows a calculation state of point counts of priority when narrowing down the relay apparatuses according to the first and second embodiments;

FIG. 24 shows a concept of an arrangement information management table stored by a storage part according to the first embodiment;

FIG. 25 shows a concept of an area management table stored by the storage part according to the first embodiment;

FIG. 28 shows a concept of a material management table according to the first and second embodiments;

FIG. 38 shows an example of a sequence diagram of a process of managing state information indicating an operating state of each of the relay apparatuses according to the second embodiment;

FIG. 39 shows an example of a sequence diagram of a process of a preparation step for starting remote communication between the remote communication terminals according to the second embodiment;

FIG. 45 shows a concept of an arrangement information management table stored by a storage part according to the second embodiment;

DESCRIPTION OF EMBODIMENTS

According to embodiments of the present invention, using arrangement information extracted from a storage part based on whether a communication terminal (or remote communication terminal) receives display data displayed on an external input apparatus of another participant of a TV conference, a screen of a display device is efficiently used, and thereby, it is possible to avoid troublesomeness which may otherwise occur for the participants of the TV conference.

First Embodiment

With reference to FIGS. 1 through 33, a first embodiment of the present invention will be described.

Overall Configuration of First Embodiment

Figure 1:
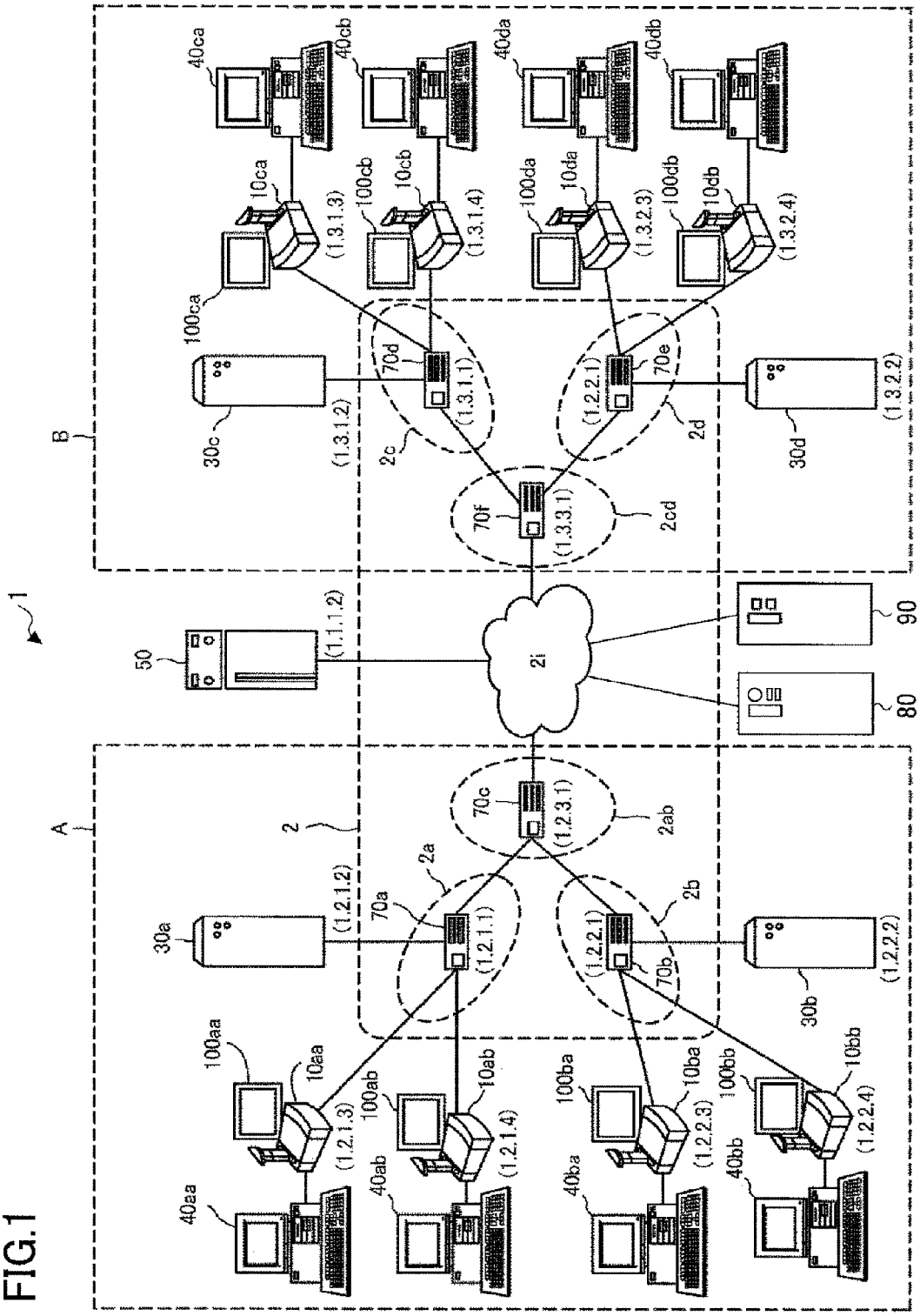
FIG. 1 shows a general configuration of an example of a communication system according to a first embodiment of the present invention.

FIG. 1 is a general configuration of a communication system 1 used for a TV conference according to the first embodiment. Using FIG. 1, a general configuration of the first embodiment will now be described. It is noted that the term "TV conference" means also one generally called "video conference".

First, the communication system 1 shown in FIG. 1 includes plural communication terminals (10aa, 10ab, . . . , 10db), display devices (100aa, 100ab, . . . , 100db) for the respective communication terminals (10aa, 10ab, . . . , 10db), plural relay apparatuses (30a, 30b, 30c and 30d), a communication management system 50, an arrangement information providing system 80 and a program providing system 90.

It is noted that in a case of indicating any communication terminal of the plural communication terminals (10aa, 10ab, . . . , 10db), "communication terminal 10" is used. In a case of indicting any display device of the plural display devices (100aa, 100ab, . . . , 100db), "display device 100" is used. In a case of indicating any one of the plural relay apparatuses (30a, 30b, 30c and 30d), "relay apparatus 30" is used.

The communication terminal 10 transmits and receives image data, voice data and so forth to and from another communication terminal 10. Although a case will be described where images of image data (obtained by a camera 112, for example) is video (moving images), images of image data may be static images. Further, images of image data may include both video (moving images) and static images. The relay apparatus 30 relays image data and voice data between plural communication terminals 10. The communication management system 50 manages, in a unifying manner, the communication terminals 10 and the relay apparatuses 30. The arrangement information providing system 80 provides, to the communication terminal 10, arrangement information used for arranging image data and material data (which will be described later) on the screen of the communication terminal 10.

The external input apparatus 40 is connected with the communication terminal 10, and transmits display data, obtained when obtaining a screen page that displays material data, to the communication terminal 10. The material data means, for example, data produced using document composition software, spreadsheet software, presentation software or such. "Obtaining a screen page" means storing a static image or an animation displayed on a display device of a computer.

Plural routers (70a, 70b, . . . , 70g) shown in FIG. 1 select optimum paths for the image data and voice data. It is noted that hereinafter, in a case of indicating any one of the plural routers (70a, 70b, . . . , 70g), a "router 70" is used. A program providing system 90 includes a HD (Hard Disk) (not shown), stores a program for each of the communication terminals 10 to carry out various functions or causing each of the communication terminals 10 to function as various functional parts, and is capable of transmitting the program to each of the communication terminals 10. Further, the HD of the program providing system 90 also stores a program for each of the relay apparatuses 30 to carry out various functions or causing each of the relay apparatuses 30 to function as various functional parts, and capable of transmitting the program to each of the relay apparatuses 30. Further, the HD of the program providing system 90 also stores a program for communication management to carry out various functions or causing the communication management apparatus 50 to function as various functional parts, and is capable of transmitting the program to the communication management apparatus 50.

The communication terminals 10aa, 10ab, the relay apparatuses 30a and the router 70a are connected together by a LAN 2a in such a manner that they can carry out mutual communication. The communication terminals 10ba, 10bb, the relay apparatus 30b and the router 70b are connected together by a LAN 2b in such a manner that they can carry out mutual communication. The LAN 2a and the LAN 2b are connected together by a private line 2ab including the router 70c in such a manner that they can carry out mutual communication, and are built in a certain area A. For example, the area A is Japan, the LAN 2a is built in any company in Tokyo, and the LAN 2b is built in any company in Osaka.

On the other hand, the communication terminals 10ca, 10cb, the relay apparatus 30c and the router 70d are connected together by a LAN 2c in such a manner that they can carry out mutual communication. The communication terminals 10da, 10db, the relay apparatuses 30d and the router 70e are connected together by a LAN 2d in such a manner that they can carry out mutual communication. The LAN 2c and the LAN 2d are connected together by a private line 2cd including the router 70f in such a manner that they can carry out mutual communication, and are built in a certain area B. For example, the area B is the USA, the LAN 2c is built in any company in New York, and the LAN 2d is built in any company in Washington, D.C. The area A and the area B are connected together in such a manner that they can carry out mutual communication by the Internet 2i from the routers (70c and 70f), respectively.

Further, the communication management system 50, the arrangement information providing system 80 and the program providing system 90 are connected with the communication terminals 10 and the relay apparatuses 30 in such a manner that they can carry out mutual communication by the Internet 2i. The communication management system 50, the arrangement information providing system 80 and the program providing system 90 may be installed in the area A or the area B, or may be installed in another area.

It is noted that in the first embodiment, the communication network 2 includes the LAN 2a, the LAN 2b, the private line tab, the Internet 2i, the private line 2cd, the LAN 2c and the LAN 2d.

Further, in FIG. 1, four numerals below each of the communication terminals 10, the relay apparatuses 30, the communication management system 50 and the routers 70 show an IP address according to the common IPv4 in a simplified manner. For example, the IP address of the communication terminal 10aa is "1.2.1.3". IPv6 may be used instead of IPv4. However, for the purpose of simplifying the description, the description will be made using IPv4.

Hardware Configuration of First Embodiment

Next, a hardware configuration of the first embodiment will be described. A case will be described where in a situation where a delay occurs in reception of image data by the communication terminal 10 acting as a relay destination, the relay apparatus 30 changes the resolution of the image of the image data, and then, the image data is transmitted to the communication terminal 10 acting as the relay destination.

Figure 2:
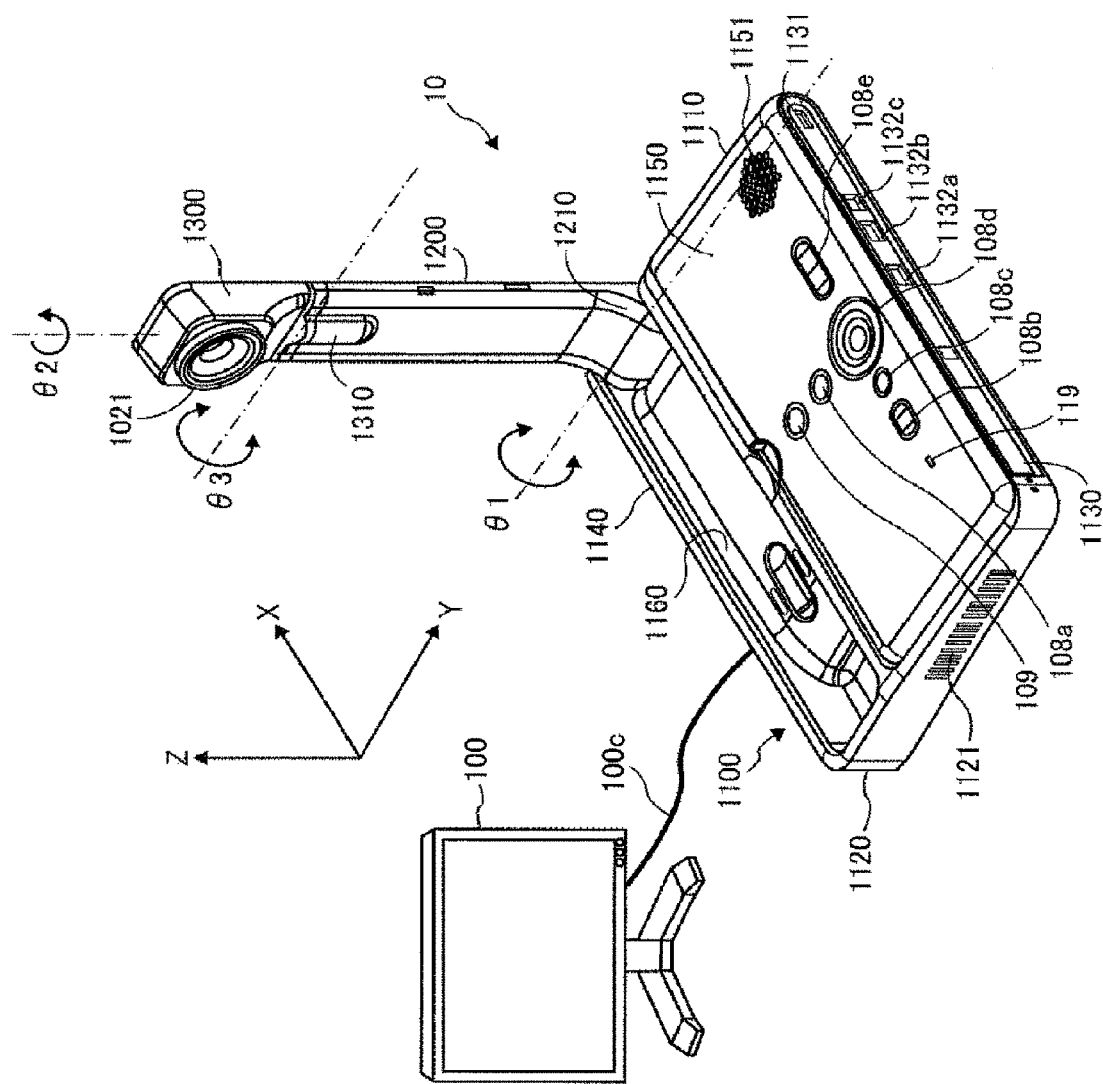
FIG. 2 shows an external appearance (perspective view) of an example of a communication terminal according to the first embodiment.

FIG. 2 shows an external appearance of the communication terminal 10 according to the first embodiment. Hereinafter, the longitudinal direction of the communication terminal 10 will be referred to as an X-axis direction, the direction perpendicular to the X-axis direction on a horizontal plane will be referred to as a Y-axis direction, and the direction (vertical direction) perpendicular to the X-axis direction and the Y-axis direction will be referred to as a Z-axis direction.

As shown in FIG. 2, the communication terminal 10 includes a housing 1100, an arm 1200 and a camera housing 1300. On a rear side wall 1110 of the housing 1100, an air suction surface (not shown) including plural air suction holes is provided. On a front side wall 1120 of the housing 1100, an air discharge surface 1121 including plural air discharge holes is provided. Thereby, as a result of a cooling fan (not shown) provided in the inside of the housing 1100 being driven, air behind the terminal 10 is taken in via the air suction surface, and the air is discharged to the front side of the communication terminal 10 via the air discharge surface 1121. On a right side wall 1130 of the housing 1100, a sound collecting hole 1131 is formed, and a voice, a sound, a noise or such is collected by means of a microphone 114 (described later) provided in the inside of the housing 1100.

On a top surface of the housing 1100 on an area near the right side wall 1130, an operations panel 1150 is provided. On the operations panel 1150, plural operating buttons (108a through 108e) described later, a power supply switch 109 described later and an alarm lamp 119 described later are provided. Also, on the operations panel 1150, a sound output surface 1151 including plural sound output holes formed for passing through an output sound from a speaker 115 provided in the inside of the housing 1100 described later is provided. Further, on the top surface of the housing 1100 on an area near a left side wall 1140, a holding hole 1160 as a depression for receiving the arm 1200 and the camera housing 1300 is provided. On the right side wall 1130 of the housing 1100, plural connection holes (1132a through 1132c) are provided for electrically connecting cables to an external apparatus connecting I/F 118 described later. On the other hand, on the left side wall 1140 of the housing 1100, a connection hole (not shown) is provided for electrically connecting a cable 100c for the display device 100 to the external apparatus connecting I/F 118.

It is noted that hereinafter, in a case where any operating button of the operating buttons (108a through 108e) is referred to, this will be referred to as an "operating button 108". Similarly, in a case where any connection hole of the connection holes (1132a through 1132e) is referred to, this will be referred to as a "connection hole" 1132.

The arm 1200 is mounted on the housing 1100 via a torque hinge 1210, and is configured to be able to rotate vertically in a range of a tilt angle θ1 of 135° with respect to the housing 1100. FIG. 2 shows a state where the tilt angle θ1 is 90°.

The camera 112 is provided in the inside of the camera housing 1300, and the user, a document, a room and so forth can be photographed. Further, a torque hinge 1310 is formed in the camera housing 1300. The camera housing 1300 is mounted on the arm 1200 via the torque hinge 1310, and thus a configuration is provided such that the camera housing 1300 can be rotated up and down (vertically), and left and right (horizontally), in a range of a pan angle θ2 of ±180° and in a range of a tilt angle θ3 of ±45°, where FIG. 2 shows a state of 0°.

It is noted that each of the relay apparatuses 30, the communication management system 50, the arrangement information providing system 80 and the program providing system 90 has an external appearance the same as that of a common server computer. Therefore, description of the external appearances thereof will be omitted.

Figure 3:
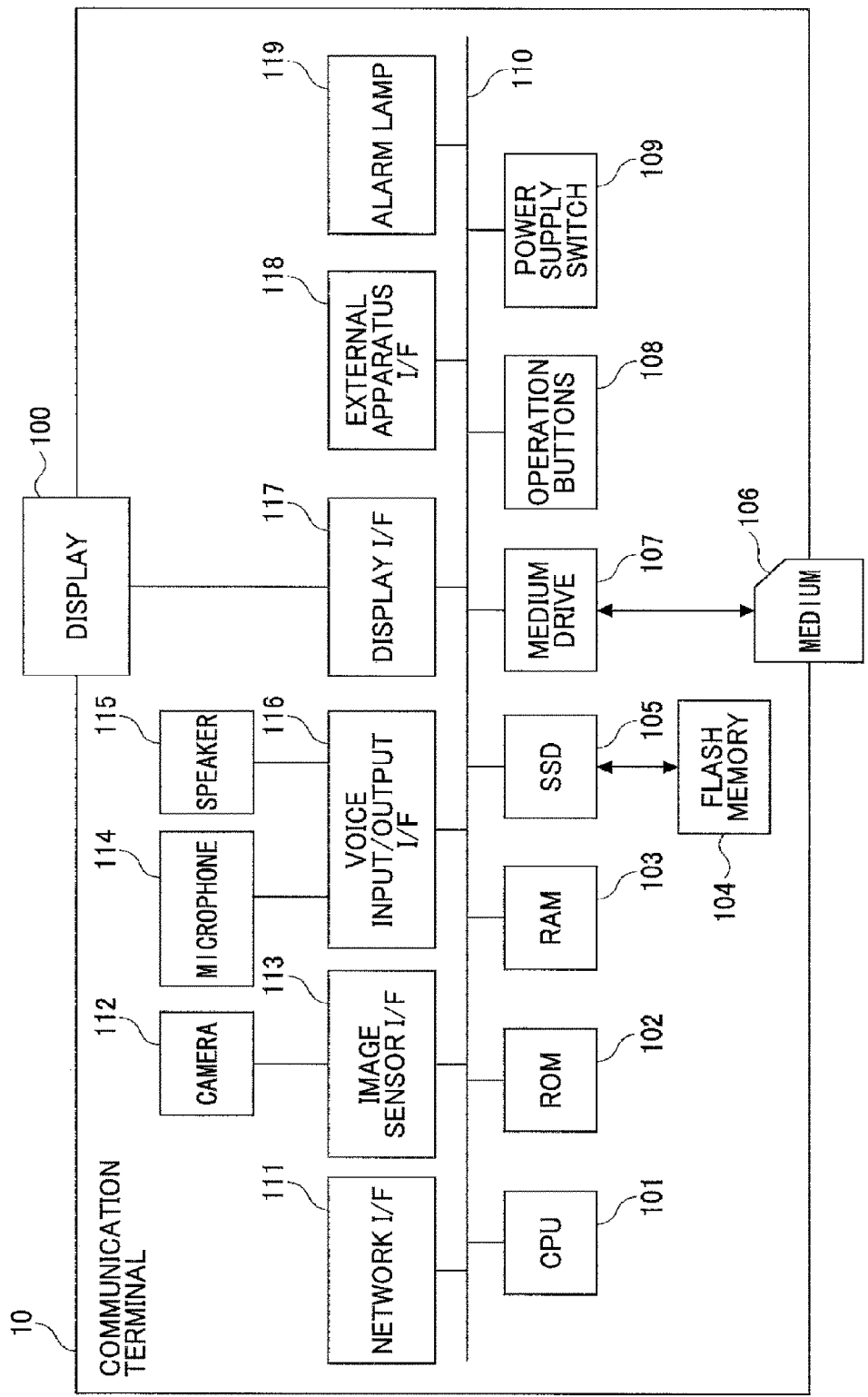
FIG. 3 shows a hardware configuration of an example of the communication terminal according to the first embodiment.

FIG. 3 shows a hardware configuration of the communication terminal 10 according to the first embodiment. As shown in FIG. 3, the communication terminal 10 according to the first embodiment includes a CPU (Central Processing Unit) 101 controlling operations of the entirety of the communication terminal 10; a ROM (Read Only Memory) 102 storing a program for the communication terminal 10; a RAM (Random Access Memory) 103 used as a work area of the CPU 101; and a flash memory 104 storing a program for the communication terminal and various data such as image data and voice data. The communication terminal 10 according to the first embodiment further includes a SSD (Solid State Drive) 105 controlling reading and writing various data from and to the flash memory 104 according to the control of the CPU 101; a medium drive 107 controlling reading and writing (recording) data from and to a recording medium 106 such as a flash memory; the operating buttons 108 operated by the user in a case where the user selects a destination of the communication terminal 10 or so; a power supply switch 109 for switching on and off of the power supply in the communication terminal 10; a network I/F (InterFace) 111 for transmitting data using the communication network 2; the camera 112 photographing an object and obtaining image data according to the control of the CPU 101; an imaging device I/F 113 controlling driving the camera 112; the microphone 114 inputting a voice; the speaker 115 outputting a voice; a voice input/output I/F 116 processing input and output of voice signals from the microphone 114 and to the speaker 115 according to the control of the CPU 101; a display I/F 117 transmitting image data to the display device 100 provided in the outside according to the control of the CPU 101; the external apparatus connecting I/F 118 for connecting various types of external apparatuses; the alarm lamp 119 reporting unusual conditions of various functions of the communication terminal 10; and a bus line 110 such as an address bus, a data bus and so forth for electrically connecting the above-mentioned various elements/components as shown in FIG. 3.

It is noted that the recording medium 106 is configured to be detachable with respect to the communication terminal 10. Further, as long as it is a non-volatile memory for which reading and writing are carried out according to the control of the CPU 101, the flash memory 104 is not limiting, and instead, an EEPROM (Electrically Erasable Programmable ROM) or such may be used. Further, the camera 112 is a solid state image sensing device which converts light into electric charges, and obtains an electronic signal from an image of an object. As the camera 112, a CCD (Charge Coupled Device), a CMOS (Complementary Metal Oxide Semiconductor) device or such may be used. Further, the display device 100 is made of a liquid crystal or an organic electroluminescence (EL) material or such displaying an image of an object, icons used for operations by the user or such.

Further, the program for the communication terminal 10 may be recorded in a form of a file in an installable or executable type in a computer readable information recording medium, such as the recording medium 106, and may then be circulated.

Figure 4:
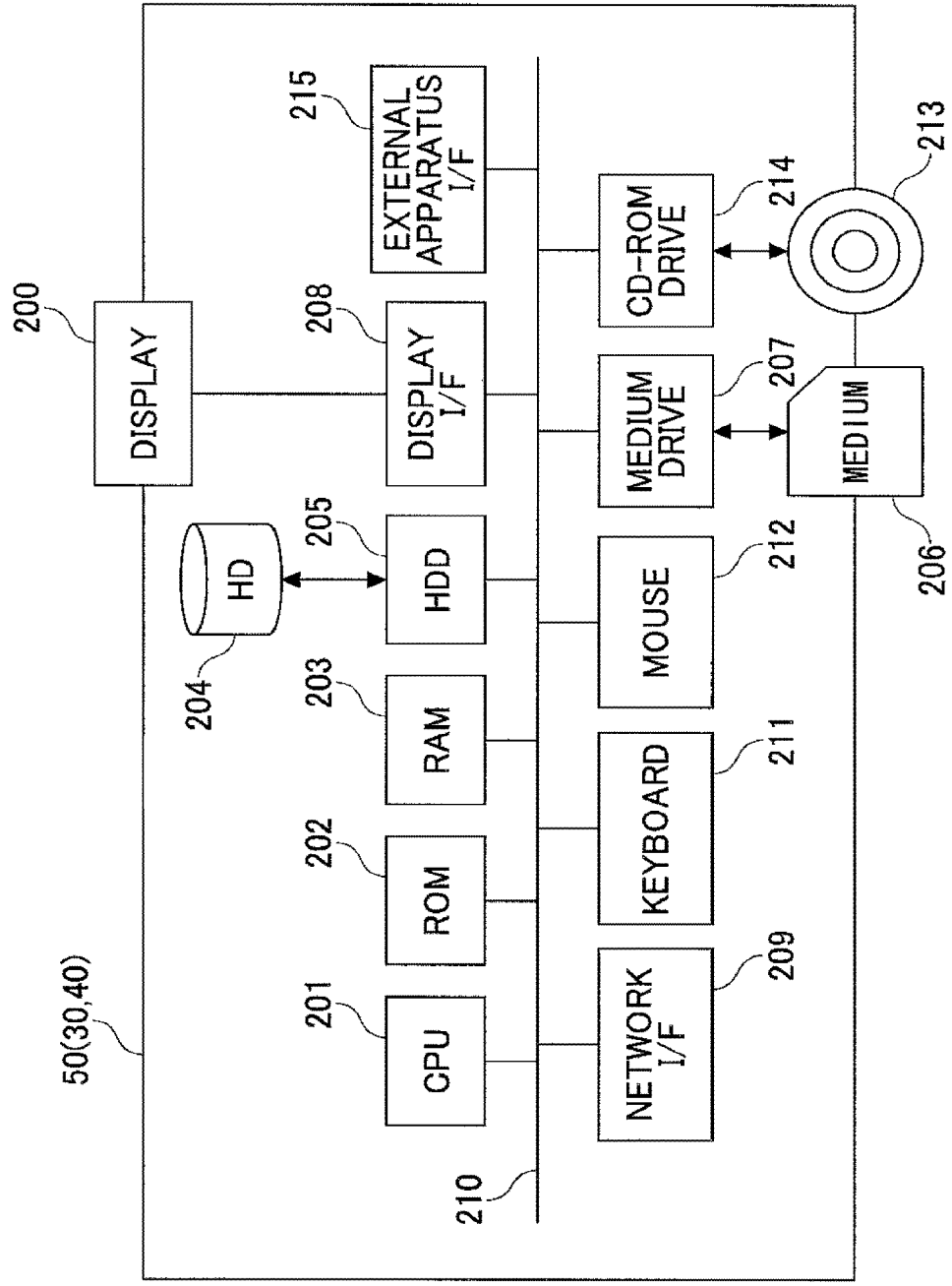
FIG. 4 shows a hardware configuration of an example of each of a communication management system, a relay apparatus and an external input apparatus according to the first embodiment.

FIG. 4 shows a hardware configuration of the communication management system 50 according to the first embodiment. The communication management system 50 includes a CPU 201 controlling operations of the entirety of the communication management system 50; a ROM 202 storing a program for communication management (i.e., for the communication management system 50); a RAM 203 used as a work area of the CPU 201; a HD (hard disk) 204 storing various data; an HDD (Hard Disk Drive) 205 controlling reading and writing of the various data from and to the HD 204 according to the control of the CPU 201; a medium drive 207 controlling reading and writing (recording) of data from and to a recording medium 206 such as a flash memory; a display device 200 displaying various sorts of information such as a cursor, a menu, a window, characters/letters (text) or images; a display device I/F 208; a network I/F 209 for carrying out data transmission using the communication network 2; a keyboard 211 including plural keys for the user to input characters/letters, numerical values, various instructions and so forth; a mouse 212 for the user to select or start execution of various instructions, select a target to process, move the cursor or so; a CD-ROM drive 214 controlling reading various data from a CD-ROM (Compact Disc Read Only Memory) 213 as an example of a detachable recording medium; an external apparatus I/F 215 transmitting and receiving various sorts of data to and from an external apparatus; and a bus line 210 such as an address bus, a data bus and so forth electrically connecting the above-mentioned respective elements/components together as shown in FIG. 4.

It is noted that the program for communication management may be recorded in a computer readable recording medium such as the above-mentioned recording medium 206, CD-ROM 213 or such in a form of a file of an installable type or an executable type, and then be circulated.

Further, the relay apparatus 30 has the same hardware configuration as that of the communication management apparatus 50, and therefore, the description thereof will be omitted. However, in the ROM 202 of the relay apparatus 30, a program for the relay apparatus for controlling the relay apparatus 30 is recorded. Also in this case, the program for the relay apparatus may be recorded in a computer readable recording medium such as the recording medium 206, a CD-ROM 213 or such in a form of a file of an installable type or an executable type, and be circulated.

The external input apparatus 40 has the same hardware configuration as that of the communication management apparatus 50, and therefore, the description thereof will be omitted. However, in the ROM 202 of the external input apparatus 40, a program for material management for controlling the external input apparatus 40 is recorded. Also in this case, the program for material management may be recorded in a computer readable recording medium such as the recording medium 206 or the CD-ROM 213 in a form of a file of an installable type or an executable type, and be circulated.

Further, each of the arrangement information providing system 80 and the program providing system 90 has the same hardware configuration as that of the communication management apparatus 50, and therefore, the description thereof will be omitted. However, in the ROM 202 of the arrangement information providing system 80, a program for providing arrangement information is recorded. Similarly, in the ROM 202 of the program providing system 90, a program for providing programs is recorded. Also in this case, each of these programs for providing arrangement information and providing programs may be recorded in a computer readable recording medium such as the recording medium 206, the CD-ROM 213 or such in a form of a file of an installable type or an executable type, and be circulated.

It is noted that each of the above-mentioned programs may be recorded in a computer readable recording medium such as a CD-R (Compact Disc Recordable), a DVD (Digital Versatile Disk) or a Blu-ray Disc as another example of the above-mentioned detachable recording medium, and then be provided.

Functional Configuration of First Embodiment

Figure 5A:
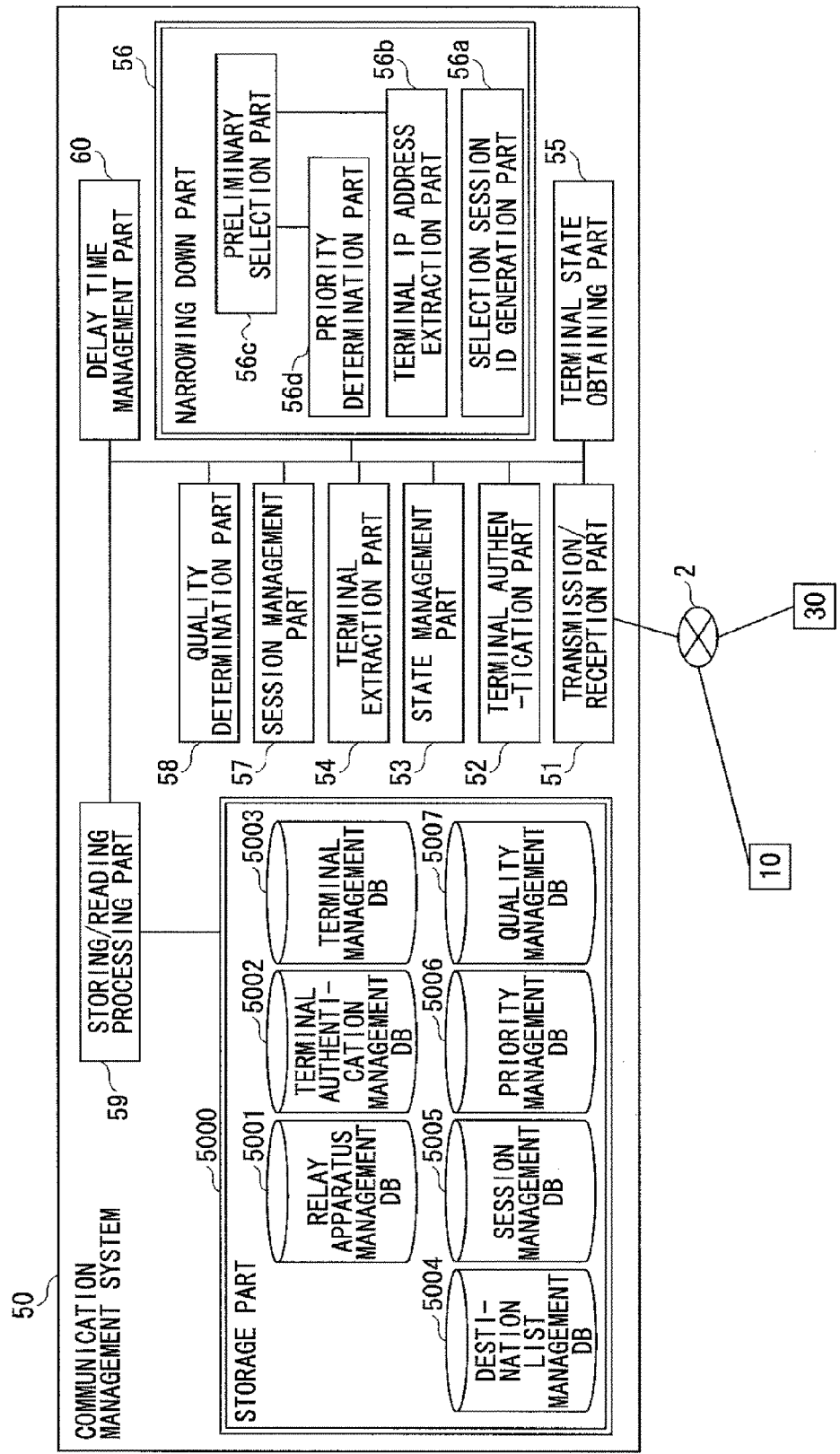
FIGS. 5A and 5B show a block diagram of an example of each of the terminals, the apparatuses and the system included in the communication system according to the first embodiment.
Figure 5B:
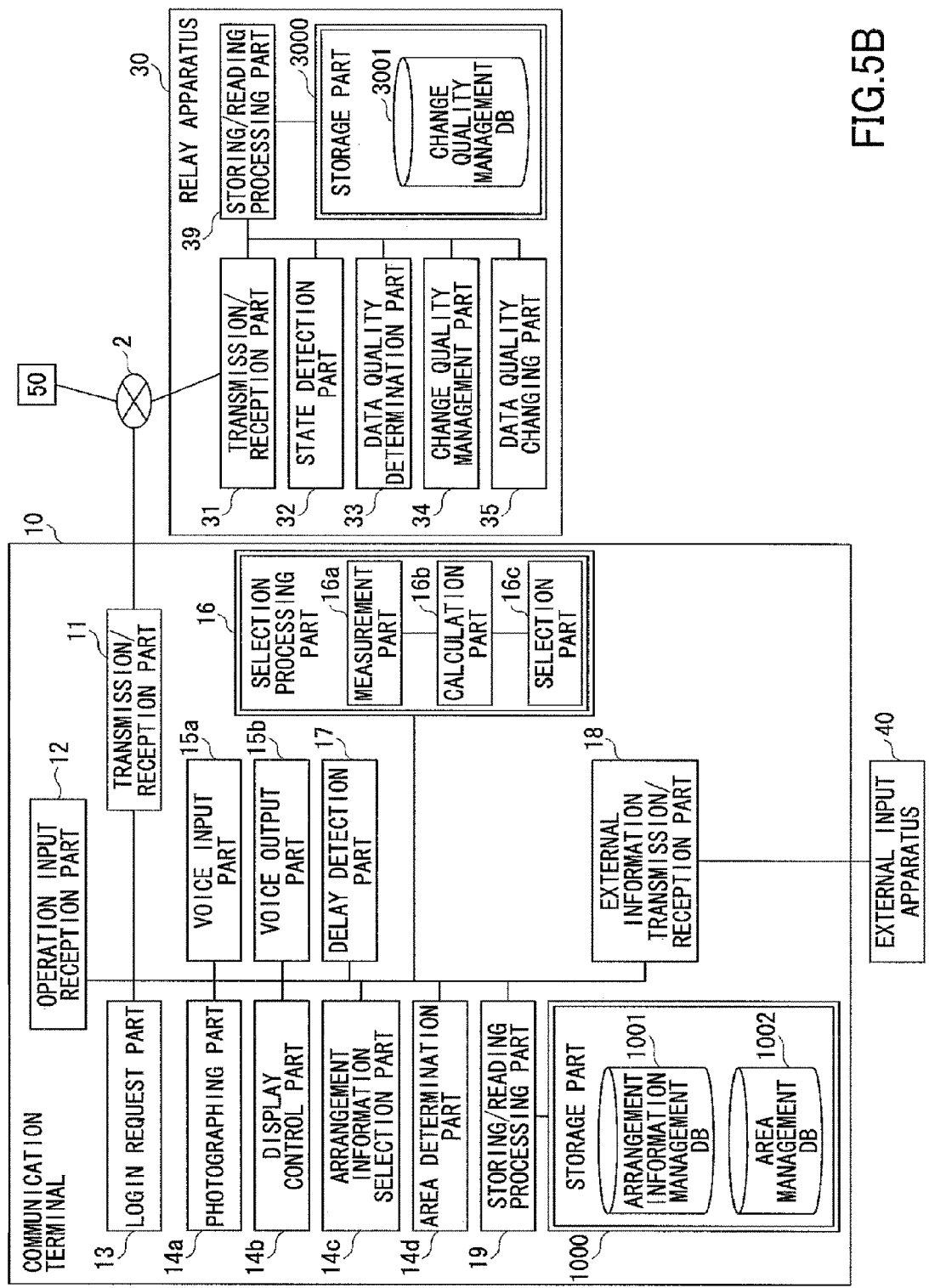
Figure 26A:
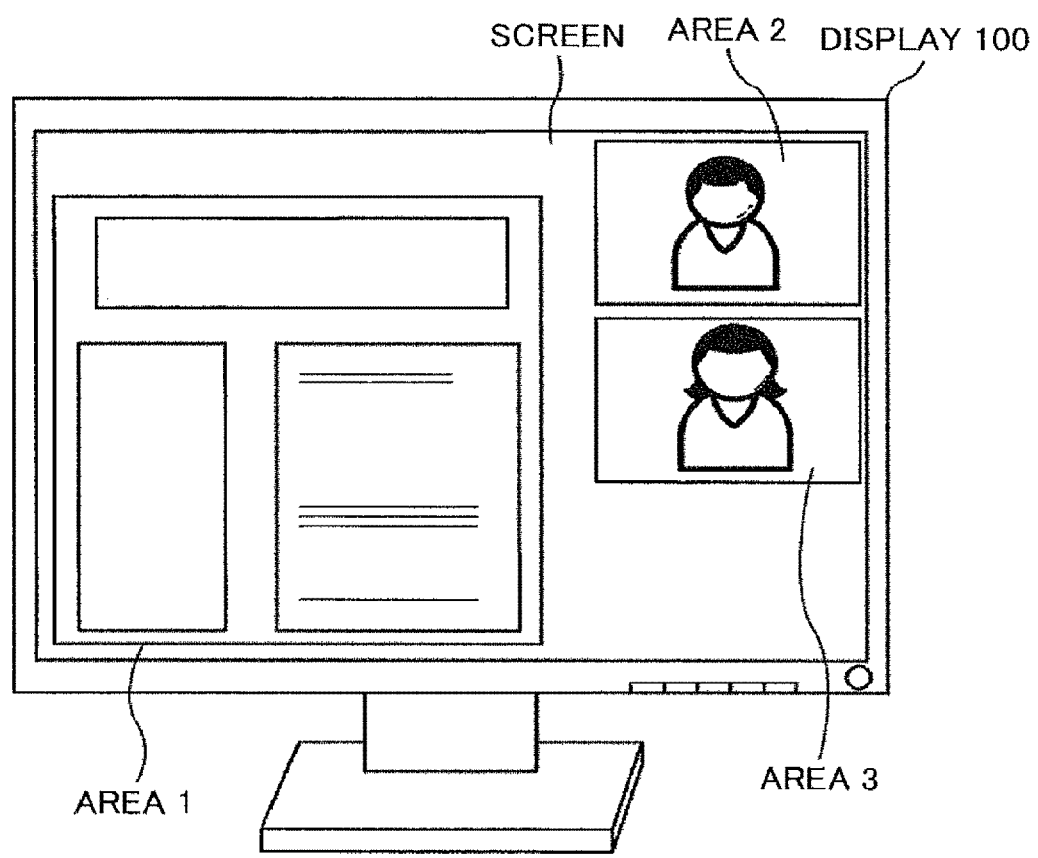
FIGS. 26A and 26B show examples of screen pages displayed based on arrangement information according to the first embodiment.
Figure 26B:
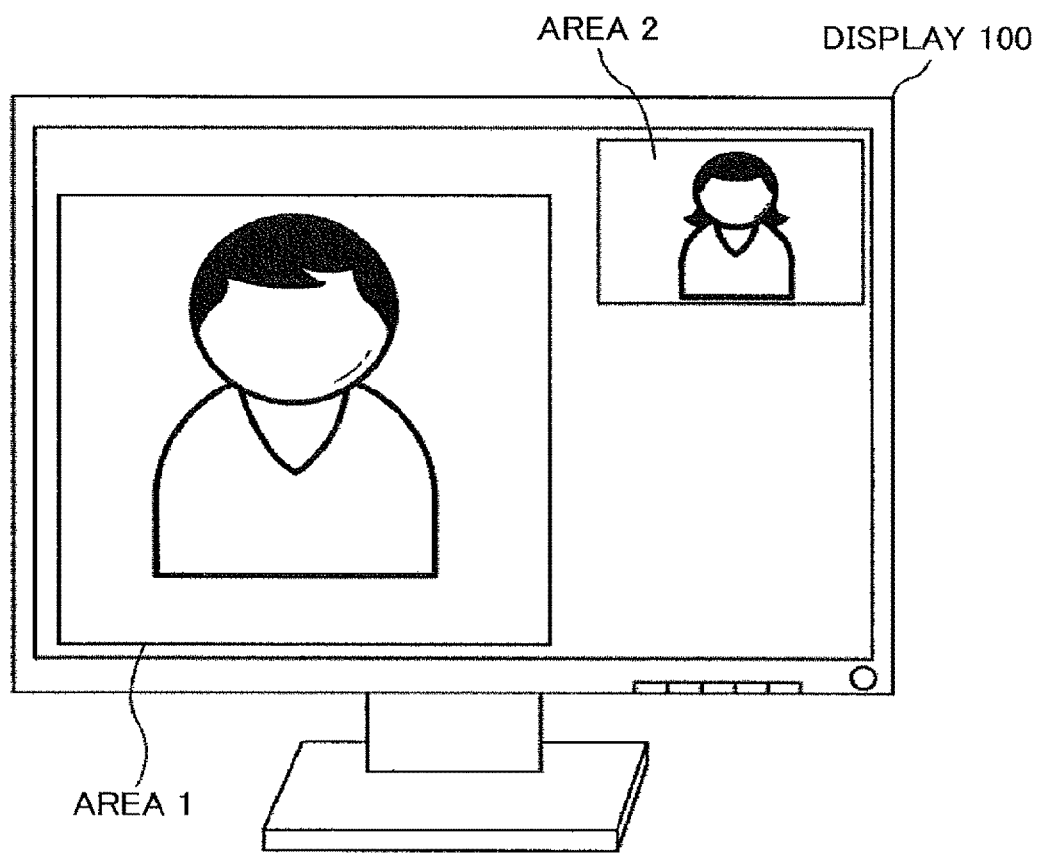
Figure 27:
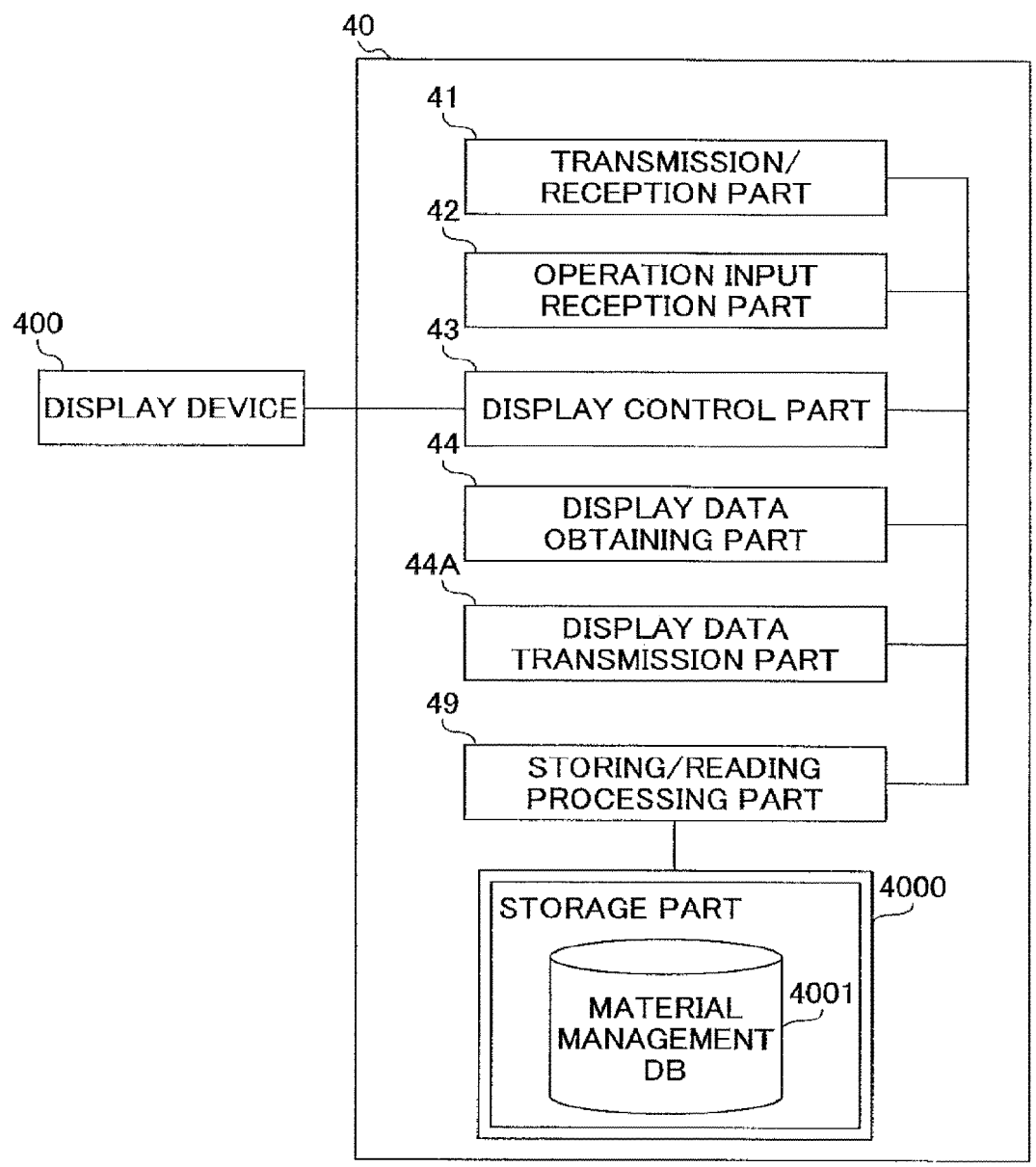
FIG. 27 shows a functional block diagram of an external input apparatus according to the first embodiment.

Next, a functional configuration of the first embodiment will be described. FIGS. 5A and 5B show a functional block diagram of each of the terminals, the apparatuses and the system included in the communication system 1 according to the first embodiment. In FIGS. 5A and 5B, the communication terminal 10, the relay apparatus 30 and the communication management system 50 are connected together by the communication network 2 in such a manner that data communication can be mutually carried out. The external input apparatus 40 is connected with the communication terminal 10 in such a manner that data communication can be mutually carried out. FIGS. 6A, 6B and 6C illustrate image quality according to the first embodiment. FIG. 7 shows a concept of an example of a change quality management table. FIG. 8 shows a concept of an example of a relay apparatus management table. FIG. 9 shows a concept of an example of a terminal authentication management table. FIG. 10 shows a concept of an example of a terminal management table. FIG. 11 shows a concept of an example of a destination list management table. FIG. 12 shows a concept of an example of a session management table. FIG. 13 shows a concept of an example of an address priority management table. FIG. 14 shows a concept of an example of a transmission rate priority management table. FIG. 15 shows a concept of an example of a quality management table. FIG. 24 shows a concept of an arrangement information management table stored by a storage part. FIG. 25 shows a concept of an area management table stored by the storage part. FIGS. 26A and 26B show examples of screen pages displayed based on arrangement information. FIG. 27 shows a functional block diagram of the external input apparatus 40. FIG. 28 shows a concept of a material management table.

<Functional Configuration of Communication Terminal>

The communication terminal 10 includes a transmission/reception part 11, an operation input reception part 12, a login request part 13, a photographing part 14a, a display control part 14b, an arrangement information selection part 14c, an area determination part 14d, a voice input part 15a, a voice output part 15b, a finally narrowing down part (or selection processing part) 16, a delay detection part 17, an external information transmission/reception part 18, and a storing/reading processing part 19. The respective parts correspond to functions or functioning parts realized as a result of the respective elements/components shown in FIG. 3 operating according to instructions given by the CPU 101 that operates according to the program for the communication terminal stored in the ROM 102. Further, the communication terminal 10 has a storage part 1000 built by any one of the ROM 102, RAM 103 and the SSD 105 shown in FIG. 3.

(Arrangement Information Management Table)

In the storage part 1000, an arrangement information management DB (DataBase) 1001 including an arrangement information management table such as that shown in FIG. 24 is stored. In the arrangement information management table, in association with an arrangement information No., arrangement information indicating data (information) to be displayed at each area on the screen and a share flag that is reception information indicating whether the transmission/reception part 11 has received display data are stored. As shown in the example of FIG. 24, with respect to the arrangement information No. "1", the arrangement information "VIEW_MULTI" and the share flag "UNSHARED" are stored.

(Area Management Table)

In the storage part 1000, an area management DB 1002 including an area management table such as that shown in FIG. 25 is stored. In the area management table, in association with the arrangement information, data to be displayed at each area on the screen is stored. As shown in the example of FIG. 25, the area management table shows that in a case where the arrangement information is "SHARED_MULTI", received display data is displayed at an "area 1"; image data obtained from photographing by the photographing part 14a of the communication terminal 10aa which is a communication terminal at the other end of the communication is displayed at an "area 2"; and image data obtained from photographing by the photographing part 14a of the communication terminal 10db which is the own terminal is displayed at an "area 3". Further, the area management table shows that in a case where the arrangement information is "VIEW_MULTI", image data obtained from photographing by the photographing part 14a of the communication terminal 10aa which is the communication terminal at the other end of the communication is displayed at the "area 1"; image data obtained from photographing by the photographing part 14a of the communication terminal 10db which is the own terminal is displayed at the "area 2"; and nothing is displayed at the "area 3". The areas 1, 2 and 3 are determined by sizes and positions on the screen, respectively. Examples shown in FIGS. 26A and 26B show information defining areas on the screen to display respective items of information. In FIG. 26A, the screen in the case where the arrangement information is "SHARED_MULTI" is shown, and in FIG. 26B, the screen in the case where the arrangement information is "VIEW_MULTI" is shown. As shown in FIGS. 26A and 26B, the area at the left side is referred to as the area 1, the area at the top right is referred to as the area 2, and the area at the meddle right is referred to as the area 3.

It is noted that in the case of the arrangement information "VIEW_MULTI", at the area 1, image data to which the participant is to pay attention may be displayed, and, thus, image data photographed by the communication terminal on the speaking side may be displayed. In order to determine this image data, in a case where the voice input part 15a of each communication terminal 10 has detected "speaking" based on the voice level, the display control part 14b transfers the terminal ID of the corresponding communication terminal 10 to the relay apparatus 30. The relay apparatus 30 delivers the transferred terminal ID to the respective communication terminals 10 in a broadcast manner, and thus, each of the delivered-to communication terminals can determine image data to be display at the area 1. It is noted that the display control part 14b may transmit the terminal ID of the corresponding communication terminal 10 to the communication management system 50 instead of the relay apparatus 30. Further, in this case, image data on the not-speaking side is displayed at the area 2 (see FIG. 26B).

The display data means information indicating a screen page displayed on the display device 400 of the external input apparatus 40 connected to the communication terminal 10. It is noted that this screen page is a screen page that displays material data created by using document composition software, spreadsheet software or such and managed, and thus, is distinguished from image data obtained from photographing by the camera 112 shown in FIG. 3.

(Detailed Functional Configuration of Communication Terminal)

Next, the respective parts of the communication terminal 10 will be described in detail. The transmission/reception part 11 of the communication terminal 10 is realized by the network I/F 111 shown in FIG. 3, and carries out transmission and reception of various sorts of data (information) with another communication terminal, apparatus or system via the communication network 2. The operation input reception part 12 is realized by the operating buttons 108 and the power supply switch 109 shown in FIG. 3, and receives various sorts of input operations carried out by the user. For example, when the user turns on the power supply switch 109, the operation input reception part 12 shown in FIG. 5B turns on the power supply in the communication terminal 10 by receiving the user's operation of turning on the power supply switch 109. The login request part 13 is realized by instructions from the CPU 101 shown in FIG. 3, and automatically transmits login request information indicating to request login and an IP address of the communication terminal 10 at the current time to the communication management system 50 via the communication network 2 from the transmission/reception part 11 in response to receiving the user's operation of turning on the power supply switch 109.

The photographing part 14a is realized by the camera 112 and the imaging device I/F 113 shown in FIG. 3, photographs an object, and outputs image data thus obtained from the photographing. The display control part 14b is realized by the display I/F 117 shown in FIG. 3, and carries out control to display image data and display data on the display device 100 provided on the outside of the communication terminal 10.

The arrangement information selection part 14c selects arrangement information based on the reception information indicating whether the transmission/reception part 11 has received the display data. The area determination part 14d determines areas to display each image data set and the display data based on the arrangement information selected by the arrangement information selection part 14c.

The voice input part 15a is realized by the microphone 114 and the voice input/output I/F 116 shown in FIG. 3, inputs a voice sound of the user, and converts the input voice sound into a voice signal to obtain voice data corresponding to the voice signal. The voice output part 15b is realized by the speaker 115 and the voice input/output I/F 116 shown in FIG. 3, converts a voice signal corresponding to voice data into a voice, and outputs the voice.

The finally narrowing down part (or selection processing part) 16 carries out a finally narrowing down process of finally narrowing down plural relay apparatuses 30 to select a single relay apparatus 30, and for this purpose, according to instructions from the CPU 101 shown in FIG. 3, realizes a measurement part 16a, a calculation part 16b and a final selection part (or selection part) 16c. The measurement part 16a measures a reception date and time when advance transmission information (described later) is received by the transmission/reception part 11 for each of advance transmission information sets received by the transmission/reception part 11. The calculation part 16b calculates, for each of the advance transmission information sets for which the measurement part 16a has measured the reception date and time, a required time (T) from the transmission of the advance transmission information to the reception thereof based on the difference between the measured reception date and time and the transmission date and time included in each of the received advance transmission information sets. The final selection part 16c selects the relay apparatus 30 by which the advance transmission information has been relayed having the shortest required time (T) from among the required times (T) calculated by the calculation part 16b, and thus, finally selects the single relay apparatus 30.

The delay detection part 17 is realized by instructions from the CPU 101 shown in FIG. 3, and detects a delay time (ms) of image data, voice data or display data sent from another communication terminal 10 via the relay apparatus 30. Further, the external information transmission/reception part 18 transmits and receives data to and from an external apparatus such as the external input apparatus 40 using the external input apparatus I/F 215.

The storing/reading processing part 19 is realized by the SSD 105 shown in FIG. 3, stores various sorts of data in the storage part 1000, and reads various sorts of data stored in the storage part 1000. In the storage part 1000, terminal IDs (Identifications) for identifying the communication terminals 10, passwords, image data, voice data and so forth are stored.

It is noted that each of the terminal ID and a relay apparatus ID described later according to the first embodiment indicates identification information such as a language, a character/letter, a sign or various sorts of marks used for uniquely identifying a respective one of the communication terminal 10 and the relay apparatus 30. Further, each of the terminal ID and the relay apparatus ID may be identification information that is a combination of at least two of the above-mentioned language, character/letter, sign and various sorts of marks. Further, hereinafter, the communication terminal 10 as a request source which request a start of a TV conference will be referred to as a "request source terminal 10A" and the communication terminal 10 as a destination as a request destination will be referred to as a "destination terminal 10B".

<Functional Configuration of Relay Apparatus>

Functions and respective parts of the relay apparatus 30 will now be described. The relay apparatus 30 includes a transmission/reception part 31, a state detection part 32, a data quality determination part 33, a change quality management part 34, a data quality changing part 35 and a storing/reading processing part 39 (see FIG. 5B). These respective parts correspond to functions or functioning parts realized as a result of the respective elements/components shown in FIG. 4 operating according to instructions given by the CPU 201 that operates according to the program stored in the ROM 202. Further, the relay apparatus 30 has a storage part 3000 comprising any one of the ROM 202, the RAM 203 and the HDD 205 shown in FIG. 4.

(Change Quality Management Table)

In the storage part 3000, a change quality management DB (DataBase) 3001 including the change quality management table such as that shown in FIG. 7 is stored. In the change quality management table, the IP address of the communication terminal 10 as a relay destination (or simply a destination) of image data and the image quality of the image relayed by the relay apparatus 30 to the relay destination are associated with one another and are managed.

Resolution of image data used in the first embodiment will now be described. As shown in FIG. 6A, an image of low resolution as a base image has a configuration of 160 pixels (in a horizontal direction) by 120 pixels (in a vertical direction). As shown in FIG. 6B, an image of medium resolution has a configuration of 320 pixels (in the horizontal direction) by 240 pixels (in the vertical direction). As shown in FIG. 6C, an image of high resolution has a configuration of 640 pixels (in the horizontal direction) by 480 pixels (in the vertical direction). In a case where a narrow band path is used, image data of low image quality including only image data of low resolution as a base image is relayed. In a case where a band is relatively wide, image data of medium image quality including image data of low resolution as a base image and image data of medium resolution is relayed. In a case where a band is very wide, image data of high image quality including image data of low resolution as a base image, image data of medium resolution and image data of high resolution is relayed. For example, in the change quality management table shown in FIG. 7, in a case where the relay apparatus 30 relays image data to the destination terminal 10db of the IP address "1.3.2.4", the image quality (quality of an image) of the image data is "high quality" (high image quality).

(Detailed Functional Configuration of Relay Apparatus)

Next, the functional configuration of the relay apparatus 30 will be described in detail. It is noted that below, along with describing the functional configuration of the relay apparatus 30, relationships with main elements/components, from among those shown in FIG. 4, used for realizing the functional configuration of the relay apparatus 30 will be also described.

The transmission/reception part 31 of the relay apparatus 30 shown in FIG. 5B is realized by the network I/F 209 shown in FIG. 4, and carries out transmission and reception of various sorts of data (information) with another communication terminal, apparatus or system via the communication network 2. The state detection part 32 is realized by instructions from the CPU 201, and detects an operating state of the relay apparatus 30 having this state detection part 32. The operating state may be a state of "on-line", "off-line", or "in failure".

The data quality determination part 33 is realized by instructions from the CPU 201, searches the change quality management DB 3001 (see FIG. 7) using the IP address of the destination terminal 10B as a search key, extracts the image quality of the corresponding image data to be relayed, and thus recognizes the image quality of the image data to be relayed. The change quality management part 34 is realized by instructions from the CPU 201, and changes the contents of the change quality management DB 3001, if necessary, based on quality information (described later) which is sent from the communication management system 50. For example, a case is supposed in which a TV conference is being conducted between a request source terminal (10aa) having the terminal ID "01aa" and a destination terminal (10db) having the terminal ID "01db" where image data of high image quality is mutually transmitted, and a delay in receiving the image data occurs in the destination terminal (10db) because another request source terminal (10bb) and another destination terminal (10ca) have started another TV conference using the communication network 2, for example. In such a case, the relay apparatus 30 needs to reduce the image quality of the image data, being relayed by the relay apparatus 30 itself, from the high image quality to the medium image quality. In such a case, based on the quality information indicating this medium image quality, the contents of the change quality management DB 3001 are changed so that the image quality of the image data which the relay apparatus 30 is relaying is reduced from the high image quality to the medium image quality.

The data quality changing part 35 is realized by instructions from the CPU 201, and changes the image quality of the image data sent from the transmission source terminal 10 based on the contents of the change quality management DB 3001 changed as mentioned above. The storing/reading processing part 39 is realized by the HDD 205 shown in FIG. 4, and carries out processing of recording various sorts of data in the storage part 3000 and reading various sorts of data stored in the storage part 3000.

<Functional Configuration of External Input Apparatus>

The external input apparatus 40 includes, as shown in FIG. 27, a transmission/reception part 41, an operation input reception part 42, a display control part 43, a display data obtaining part 44, a display data transmission part 44A and a storing/reading processing part 49. These respective parts are functions or functional parts shown in FIG. 4 realized as a result of the CPU 201 operating according to the program stored in the ROM 202. Further, the external input apparatus 40 has a storage part 4000 comprising any one of the ROM 202, the RAM 203 and the HDD 205.

(Material Management Table)

In the storage part 4000, a material management DB (DataBase) 4001 including a material management table such as that shown in FIG. 28 is stored. In the material management table, a material name that is a name of material; a size indicating a size of the material; an application name indicating a name of application software used for creating the material; an updated date and time at which the material has been updated most recently; and material data are associated with each other and are managed. For example, in the material management table shown in FIG. 28, it is shown that material name "x x project book", size "182 kB", application name "document composition software", updated date and time "2010/03/19" and material data "x x project book.xls" are associated with each other.

<Detailed Functional Configuration of External Input Apparatus>

Next, each part of the external input apparatus 40 will be described in detail. The transmission/reception part 41 of the external input apparatus 40 is realized by the external input apparatus I/F 215 shown in FIG. 4, and transmits and receives various sorts of data (information) to and from the communication terminal 10. The operation input reception part 42 receives an operation of the user for inputting an instruction or such. The display control part 43 displays on the display device 400 an image read out by the storing/reading processing part 49 described later. The display data obtaining part 44 obtains display data of a screen page which is displayed by the external input apparatus 40. The display data transmission part 44A transmits the display data obtained by the display data obtaining part 44 to the communication terminal 10.

The storing/reading processing part 49 is realized by the HDD 205 shown in FIG. 4, stores various sorts of data in the storage part 4000 and reads the various sorts of data stored in the storage part 4000. In the storage part 4000, the material data and so forth to be shared by participants of a TV conference is stored.

<Functional Configuration of Communication Management System>

Next, functions or functional parts of the communication management system 50 will be described. As shown in FIG. 5A, the communication management system 50 includes a transmission/reception part 51, a terminal authentication part 52, a state management part 53, a terminal extraction part 54, a terminal state obtaining part 55, a narrowing down part 56, a session management part 57, a quality determination part 58, a storing/reading processing part 59 and a delay time management part 60. These respective parts correspond to functions or functioning parts realized as a result of the respective elements/components shown in FIG. 4 operating according to instructions given by the CPU 201 that operates according to the program for communication management stored in the ROM 202. Further, the communication management system 50 has a storage part 5000 comprising any one of the ROM 202, the RAM 203 and the HD 204 shown in FIG. 4.

(Relay Apparatus Management Table)

In the storage part 5000, a relay apparatus management DB 5001 including the relay apparatus management table such as that shown in FIG. 8 is stored. In the relay apparatus management table, for each of the relay apparatuses 30, the relay apparatus ID of the relay apparatus 30, the operating state of the relay apparatus 30, the reception date and time when the state information indicating the operating state has been received by the communication management system 50, the IP address of the relay apparatus 30 and the maximum data transmission rate (Mbps) in the relay apparatus 30 are associated with each other and are managed. For example, in the relay apparatus management table shown in FIG. 8, it is indicated that the relay apparatus 30a having the relay apparatus ID "111a" has the operating state of "on-line", the date and time when the state information has been received in the communication management system 50 are "Nov. 10, 2009, 13:00", the IP address of the relay apparatus 30a is "1.2.1.2", and the maximum data transmission rate in the relay apparatus 30a is 100 Mbps.

(Terminal Authentication Management Table)

Further, in the storage part 5000, a terminal authentication management DB 5002 including the terminal authentication management table such as that shown in FIG. 9 is stored. In the terminal authentication management table, respective passwords are associated with the terminal IDs of all the terminals 10 managed by the communication management system 50 and are managed. For example, in the terminal authentication management table shown in FIG. 9, it is indicated that the terminal ID of the terminal 10aa is "01aa", and the password is "aaaa".

(Terminal Management Table)

Further, in the storage part 5000, a terminal management DB 5003 including the terminal management table such as that shown in FIG. 10 is stored. In the terminal management table, for the terminal ID of each of the communication terminals 10, the operating state of the communication terminal 10, the reception date and time when login request information (described later) has been received by the communication management system 50, and the IP address of the communication terminal 10 are associated with each other and are managed. For example, in the terminal management table shown in FIG. 10, it is indicated that the communication terminal 10aa having the terminal ID "01aa" has the operating state "on-line (telephone call possible)", the reception date and time when the login request information has been received in the communication management system 50 is "Nov. 10, 2009, 13:40", and the IP address of the communication terminal 10aa is "1.2.1.3".

(Destination List Management Table)

Further, in the storage part 5000, a destination list management DB 5004 including the destination list management table such as that shown in FIG. 11 is stored. In the destination list management table, for the terminal ID of a request source terminal 10A which requests to start a TV conference, all of the terminal IDs of the destination terminals 10B registered as candidates for a destination terminal 10B are associated and are managed. For example, in the destination list management table shown in FIG. 11, it is indicated that the candidates for a destination terminal 10B for which the request source terminal (10aa) can request to start of a TV conference are three, i.e., the terminal 10ab having the terminal ID "01ab", the terminal 10ba having the terminal ID "01ba" and the terminal 10db having the terminal ID "01db". The candidates for a destination terminal 10B are updated as a result of addition or deletion according to a request of addition or deletion from any request source terminal to the communication management system 50.

(Session Management Table)

Further, in the storage part 5000, a session management DB 5005 including the session management table such as that shown in FIG. 12 is stored. In the session management table, for each of selection session IDs used for carrying out a session (selection session) for selecting the relay apparatus 30, the relay apparatus ID of the relay apparatus 30 (used for relaying image data and voice data), the terminal ID of the request source terminal 10A, the terminal ID of the destination terminal 10B, a delay time (ms) (of reception when the image data is received at the destination terminal 10B), and the reception date and time (at which delay information indicating the delay time has been transmitted from the destination terminal 10B and received by the communication management system 50) are associated with each other and managed. It is noted that the delay time (ms) means a delay time of reception when image data is received at the destination terminal 10B. The reception date and time means reception date and time when delay information indicating the delay time has been sent from the destination terminal 10B and received in the communication management system 50.

For example, in the session management table shown in FIG. 12, it is indicated that the relay apparatus 30a (the relay apparatus ID "111a") selected by the session executed using the selection session ID "se1" is relaying image data and voice data between the request source terminal (10aa) of the terminal ID "01aa" and the destination terminal (10db) of the terminal ID "01db", and the delay time of the image data is 200 ms at the time of "Nov. 10, 2009, 14:00" at the destination terminal (the terminal 10db).

It is noted that in a case where a TV conference is carried out between two communication terminals 10, the reception date and time of the delay information may be managed based on the delay information sent from the request source terminal 10A instead of the destination terminal 10B. However, in a case where a TV conference is conducted between three or more communication terminals 10, the reception date and time of the delay information is managed based on the delay information sent from the communication terminal which is receiving the image data and the voice data.

(Address Priority Management Table)

Further, in the storage part 5000, a priority management DB 5006 including an address priority management table such as that shown in FIG. 13 is stored. In the address priority management table, differences in four values included in dot addresses of an IP address according to the common IPv4 are associated with a point count of address priority in such a manner that the point count of address priority becomes higher as the number of same dot addresses is larger. For example, in the address priority management table shown in FIG. 13, in a case (on first line) where the IP address has three values of the dot addresses from the highest order toward the lowest order which are the same as each other (i.e., "same.same.same.diff" in FIG. 13), the point count of the address priority is "5". In a case (on second line) where the IP address has two values of the dot addresses from the highest order toward the lowest order which are the same as each other (i.e., "same.same.diff.-"), the point count of the address priority is "3". In this case, whether the value at the lowest order is the same or different is not relevant to the priority. In a case (on third line) where the IP address has the value of the dot address at the highest order is the same and the second order value is different (i.e., "same.diff.-.-"), the point count of the address priority is "1". In this case, whether the values at the third and last orders from the highest order are the same or different is not relevant to the priority. In a case (on last line) where the IP address has the value of the dot address at the highest order is different (i.e., "diff.-.-.-"), the point count of the address priority is "0". In this case, whether the values at the second, third and last orders from the highest order are the same or different is not relevant to the priority.

(Transmission Rate Priority Management Table)

Further, in the priority management DB 5006 stored in the storage part 5000, a transmission rate management table such as that shown in FIG. 14 is also included. In the transmission rate priority management table, the maximum data transmission rate (Mbps) in the relay apparatus 30 is associated with the point count of priority in such a manner that as the maximum transmission rate is larger, the point count of transmission rate priority becomes higher. For example, in the transmission rate priority management table shown in FIG. 14, in a case (on first line) where the maximum transmission rate is equal to 1000 Mbps or more, the point count of the transmission rate priority is "5". In a case (on second line) where the maximum transmission rate is equal to more than 100 Mbps and less than 1000 Mbps, the point count of the transmission rate priority is "3". In a case (on third line) where the maximum transmission rate is equal to more than 10 Mbps and less than 100 Mbps, the point count of the transmission rate priority is "1". In a case (on last line) where the maximum transmission rate is less than 10 Mbps, the point count of the transmission rate priority is "0".

(Quality Management Table)

Further, in the storage part 5000, a quality management DB 5007 including a quality management table such as that shown in FIG. 15 is stored. In the quality management table, image quality (quality of an image) of the image data to be relayed by the relay apparatus 30 is associated with the delay time (ms) of the image data in the request source terminal 10A or the destination terminal 10B and is managed. It is noted that, as shown in FIG. 15, in a case where the delay time is more than "500 ms", the communication is considered to be interrupted ("INTERRUPTION") since the delay is too much.

(Detailed Functional Configuration of Communication Management System)

Next, the functional configuration of the communication management system 50 will be described in detail. It is noted that below along with describing the functional configuration of the communication management system 50, relationships with main elements/components, from among those shown in FIG. 5A, used for realizing the functional configuration of the communication management system 50 will be also described.

The transmission/reception part 51 is realized by the network I/F 209 shown in FIG. 4, and carries out transmission and reception of various sorts of data (information) with another terminal, apparatus or system via the communication network 2. The terminal authentication part 52 searches the terminal authentication management DB 5002 of the storage part 5000 using the terminal ID and the password included in the login request information received via the transmission/reception part 51 as search keys, and carries out authentication of the communication terminal 10 by determining whether the same terminal ID and password are managed in the terminal authentication management DB 5002. The state management part 53, for the purpose of managing the operating state of a request source terminal 10A which has requested to login, stores the terminal ID of the request source terminal 10A, the operating state of the request source terminal 10A, the reception date and time when the login request information has been received in the communication management system 50 and the IP address of the request source terminal in the terminal management DB 5003 (i.e., the terminal management table) (see FIG. 11) in a manner of associating them with each other and manages them.

The terminal extraction part 54 searches the destination list management DB 5004 (i.e., the destination list management table) (see FIG. 11) using the terminal ID of a request source terminal 10A which has requested to login as a search key, reads the terminal IDs as candidates for a destination terminal 10B which can carry out communication (or remote communication) with the request source terminal 10A, and extracts the terminal IDs. Further, the terminal extraction part 54 searches the destination list management DB 5004 (i.e., the destination list management table) using the terminal ID of a request source terminal 10A which has requested to login as a search key, and extracts also the terminal IDs of the other request source terminals 10A each of which has registered the terminal ID of the request source terminal 10A as a candidate for a destination terminal 10B.

The terminal state obtaining part 55 searches the terminal management DB 5003 (i.e., the terminal management table) (see FIG. 10) using the terminal IDs of candidates for a destination terminal 10B extracted by the terminal extraction part 54 as search keys, and reads the operating state for each of the terminal IDs extracted by the terminal extraction part 54. Thereby, the terminal state obtaining part 55 can obtain the operating states of the candidates for a destination terminal 10B which can carry out communication (or remote communication) with the request source terminal 10A having requested to login. Further, the terminal state obtaining part 55 searches the terminal management DB 5003 (i.e., the terminal management table) (see FIG. 10) using the terminal ID of the request source terminal having requested to login, and obtains the operating state of the request source terminal 10A having requested to login.

The narrowing down part (or preliminary narrowing down part) 56, for the purpose of assisting in a finally narrowing down process of finally narrowing down plural relay apparatuses 30 to select a single relay apparatus 30, and for carrying out a preliminary narrowing down process before the finally narrowing down process, has a selection session ID generation part 56*a*, a terminal ID obtaining part 56*b*, a preliminary selection part 56*c*, and a priority determination part 56*d*. Thereamong, the selection session ID generation part 56*a* generates a selection session ID to be used for carrying out a session (selection session) for selecting relay apparatuses 30. The terminal ID obtaining part 56*b* searches the terminal management table (of the terminal management DB 5003) (see FIG. 10) based on the terminal ID of the request source terminal 10A and the terminal ID of the destination terminal 10B from start request information sent from the request source terminal 10A, and extracts the corresponding IP addresses of the respective communication terminals 10. The preliminary selection part 56*c* selects the relay apparatus IDs of the relay apparatuses having the operating states "on-line" from among the relay apparatuses 30 managed in the relay apparatus management DB 5001 (i.e., the relay apparatus management table) (see FIG. 8), and thus, selects the relay apparatuses 30.

Further, based on the terminal ID of the request source terminal 10A and the terminal ID of the destination terminal 10B obtained by the terminal ID obtaining part 56*b*, the preliminary selection part 56*c* searches the relay apparatus management table (of the relay apparatus management DB 5001) (see FIG. 8), and thus, determines whether for each of the dot addresses of the IP addresses of the thus-selected relay apparatuses 30, the respective values of each of the dot addresses of the IP addresses of the above-mentioned request source terminal 10A and the destination terminal 10B are the same. Further, the preliminary selection part 56*c* further selects the relay apparatuses 30 by selecting the top two relay apparatuses 30 having the highest and second highest point counts of priority, respectively, among total point counts obtained from totaling the points of the address priority and the point counts of the transmission rate priority. It is noted that as described later with reference to FIG. 19, each of the point counts of the address priority used for the totaling is one higher with respect to the corresponding communication terminals 10.

It is noted that according to the first embodiment, the top two relay apparatuses 30 having the highest and second highest point counts are selected as mentioned above. However, this way is not limiting, and it is also possible to select the top three or more relay apparatuses 30 having the highest, second highest and third highest point counts or more when the more relay apparatuses 30 are to be selected from narrowing down.

The priority determination part 56*d* reads the address priory management table (of the priority management DB 5006) (see FIG. 13) and determines the point counts of the address priority for each of the relay apparatuses 30 for which the preliminary selection part 56c has determined whether for the dot addresses of the IP addresses of the thus-selected relay apparatuses 30, the respective values of the dot addresses of the IP addresses of the above-mentioned request source terminal 10A and the destination terminal 10B are the same. Further, the priority determination part 56d searches the transmission rate priory management table (of the priority management table DB 5006) (see FIG. 14) based on the maximum data transmission rate of each of the relay apparatuses 30 managed in the relay apparatus management table (of the relay apparatus management DB 5001) (see FIG. 8), and determines the point count of the transmission rate priority for each of the relay apparatuses 30 having been selected as having the operating states of "on-line" as mentioned above.

The session management part 57 stores the selection session ID generated by the selection session ID generation part 56a, the terminal ID of the request source terminal 10A and the terminal ID of the destination terminal 10B in a manner of associating them with each other in the session management table (of the session management DB 5005) (see FIG. 12) of the storage part 5000, and manages them. Further, the session management part 57 stores for each of the selection session IDs, the relay apparatus ID of the relay apparatus 30 which has been finally narrowed down to one by the selection part 16c of the communication terminal 10 in the session management table (of the session management DB 5005) (see FIG. 12) and manages them.

The quality determination part 58 searches the quality management table (of the quality management DB 5007) (see FIG. 15) using the above-mentioned delay time as a search key, extracts the image quality of the corresponding image data, and determines the image quality of the image data to be relayed by the relay apparatus 30. The storing/reading processing part 59 is realized by the HDD 205 shown in FIG. 4, stores various sorts of data in the storage part 5000 and reads various sorts of data stored in the storage part 5000. The delay time management part 60 searches the terminal management table (of the terminal management DB 5003) (see FIG. 10) using the IP address of the above-mentioned destination terminal 10B, extracts the corresponding terminal ID, and further stores the delay time indicated by the above-mentioned delay information at the field of delay time in the record including the thus-extracted terminal ID in the session management table (of the session management DB 5005) (see FIG. 12), and manages it.

Processing/Operations of First Embodiment

Figure 18:
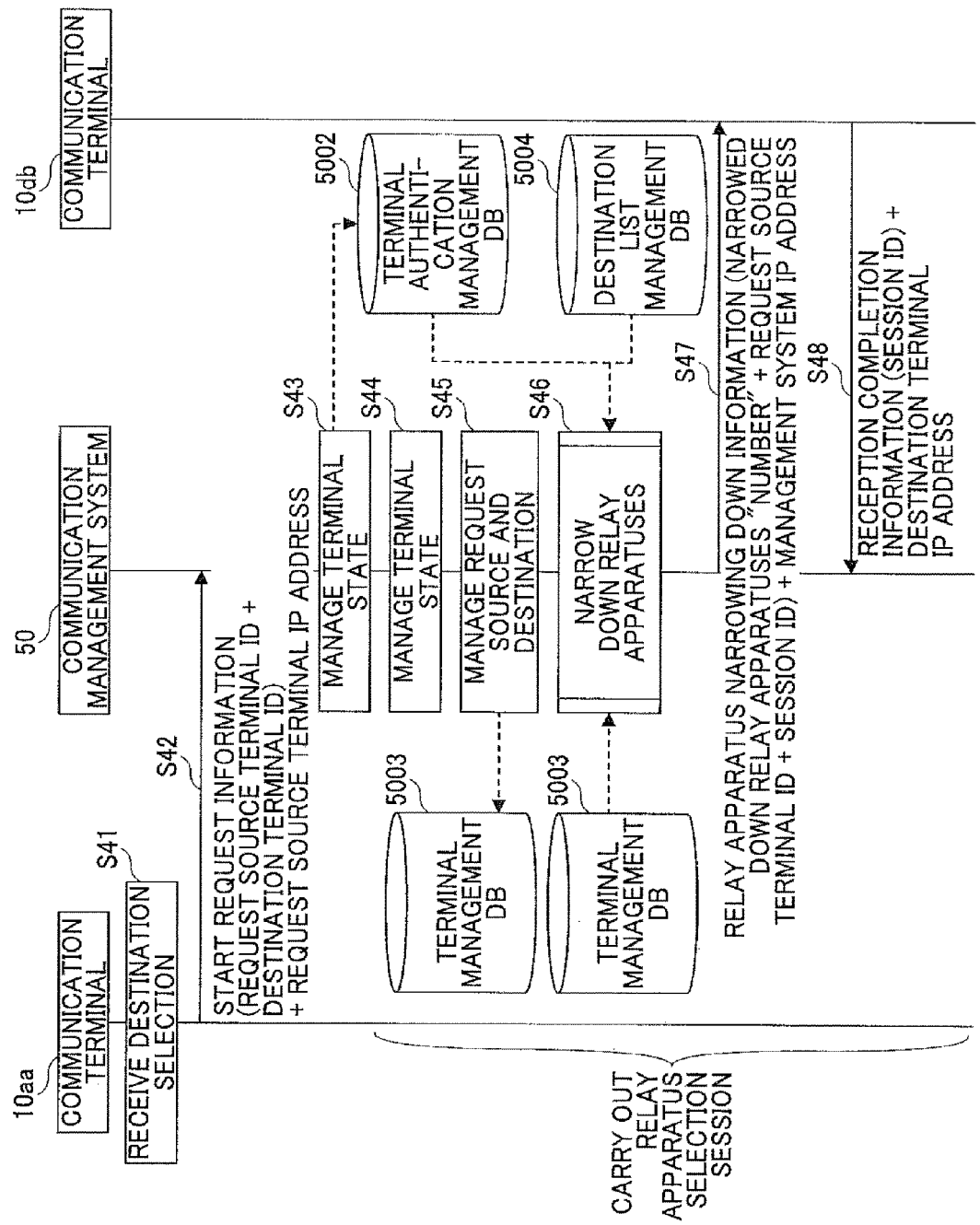
FIG. 18 shows an example of a sequence diagram of a process of narrowing down the relay apparatuses according to the first embodiment.
Figure 19:
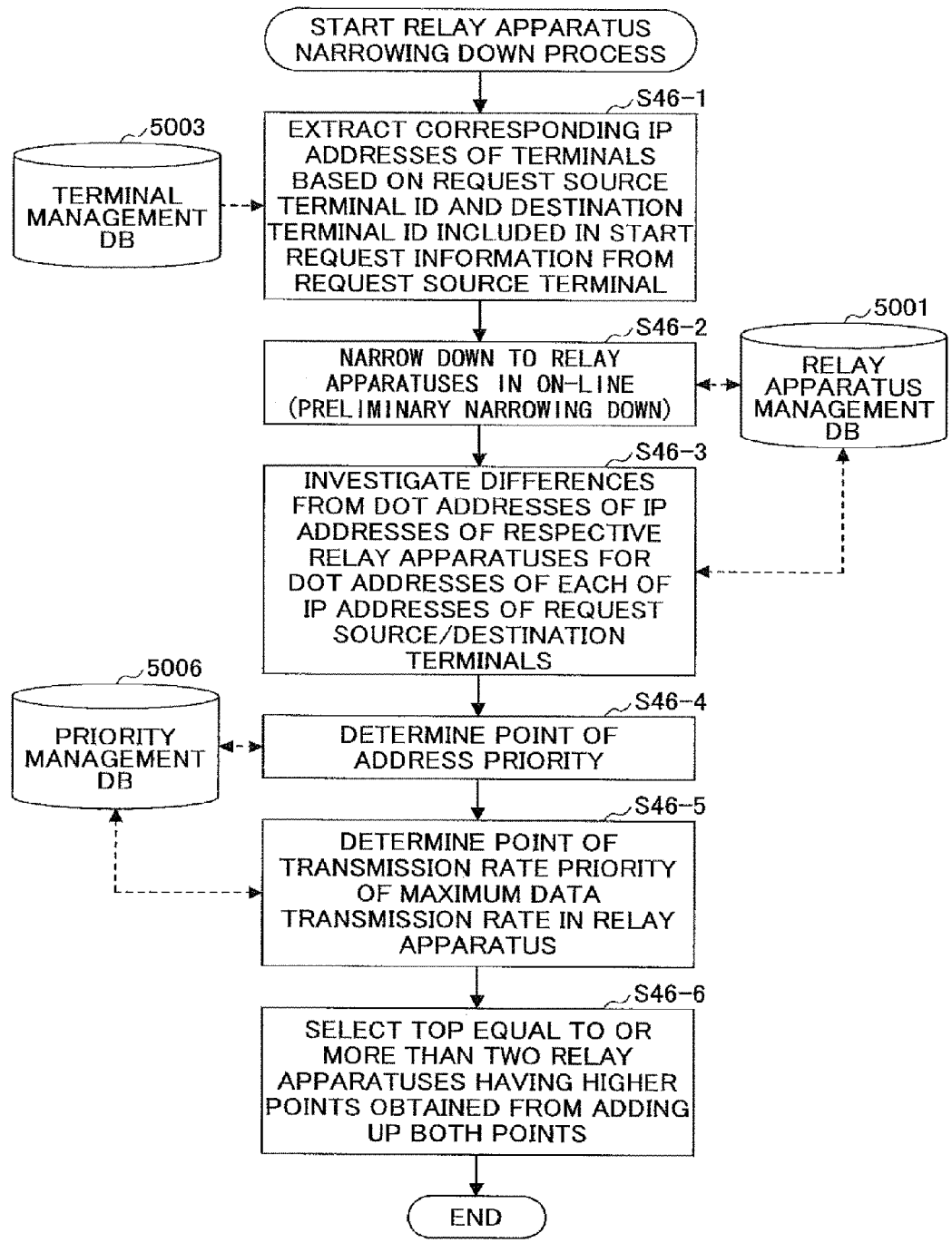
FIG. 19 shows an example of a flowchart of a process of narrowing down the relay apparatuses according to the first embodiment.
Figure 21:
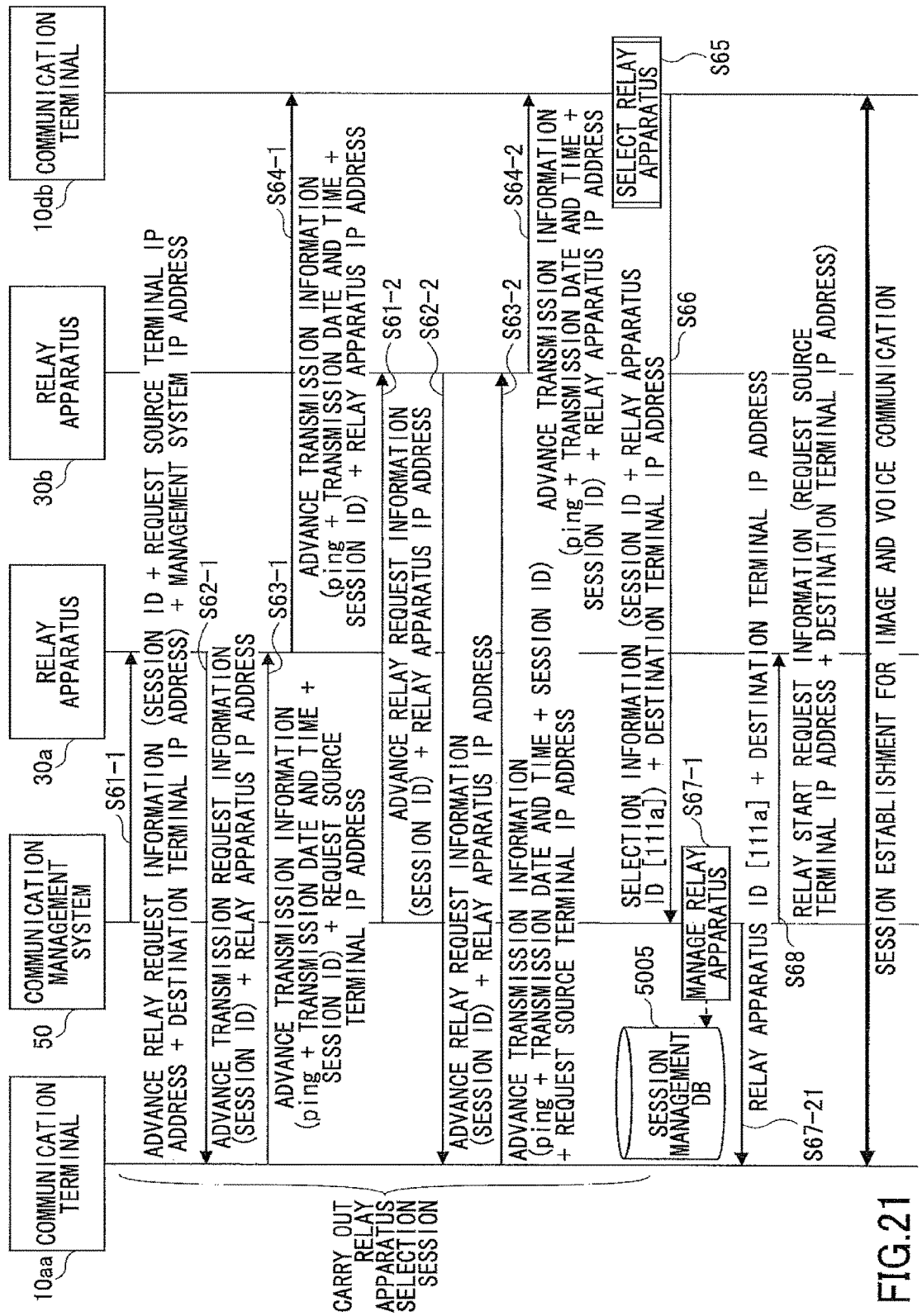
FIG. 21 shows an example of a sequence diagram of a process of selecting the relay apparatus by the communication terminal according to the first embodiment.
Figure 22:
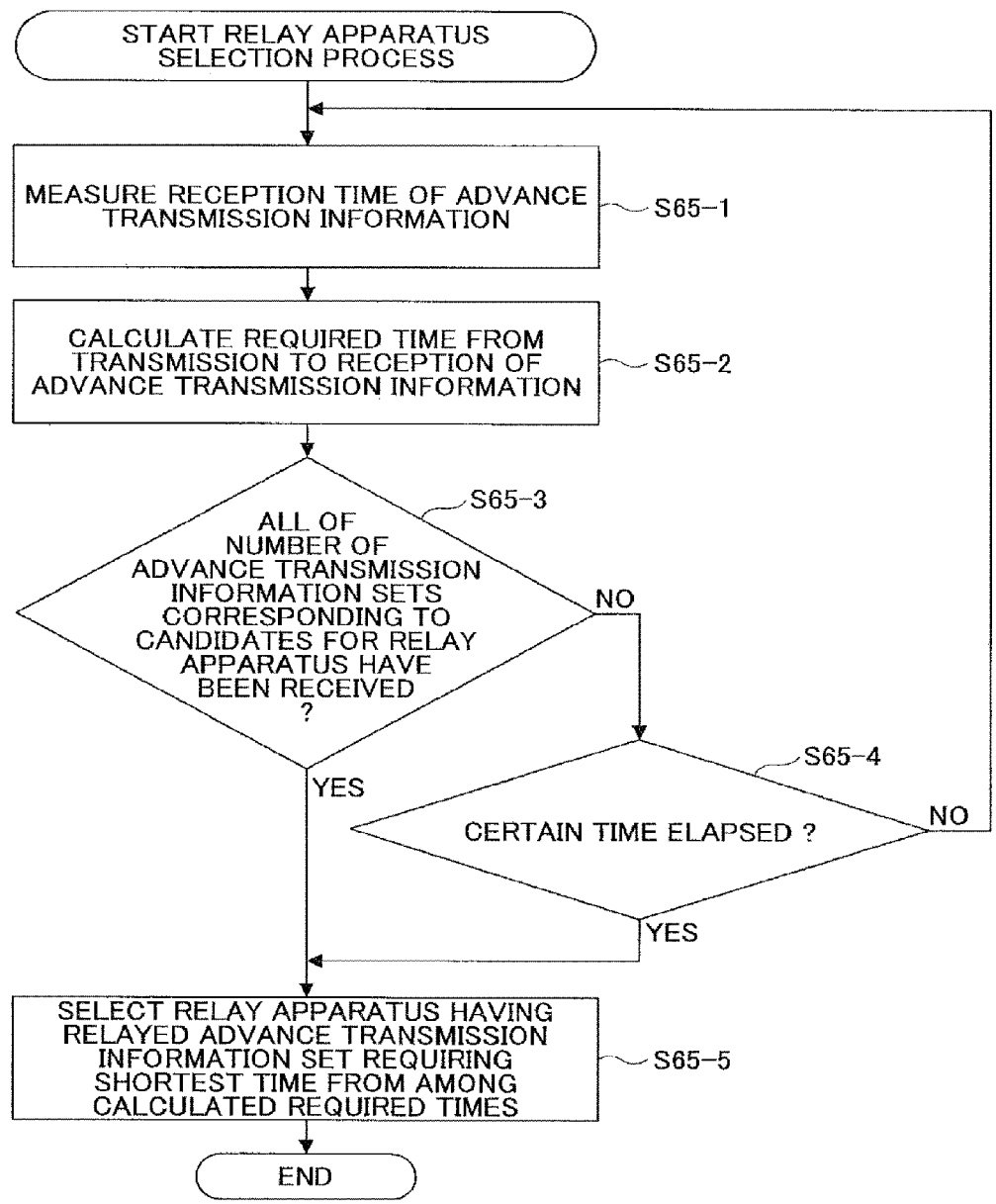
FIG. 22 shows an example of a flowchart of a process of selecting the relay apparatus by the communication terminal according to the first embodiment.
Figure 23:
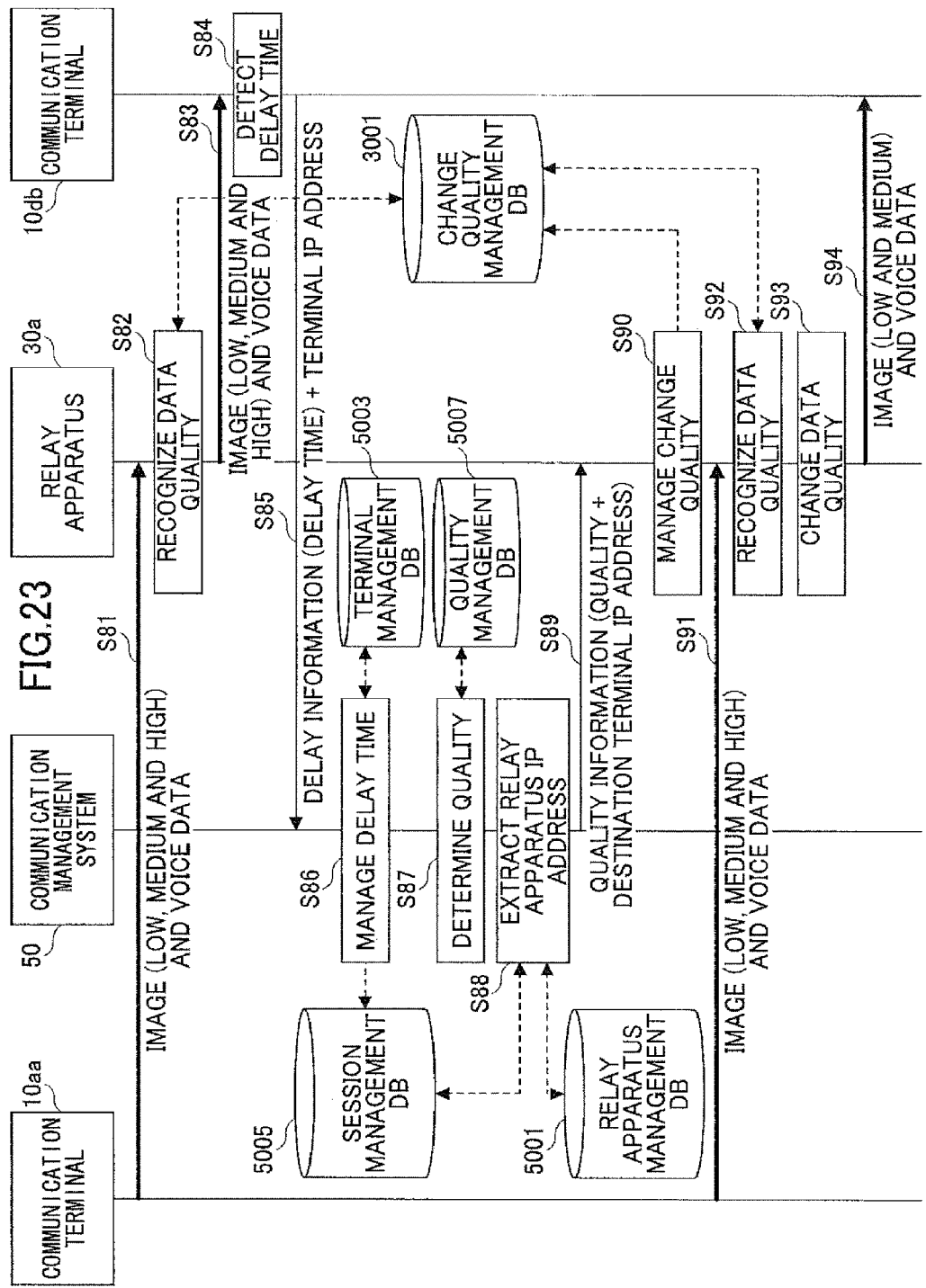
FIG. 23 shows an example of a sequence diagram of a process of transmitting image data and voice data between the communication terminals according to the first embodiment.
Figure 29:
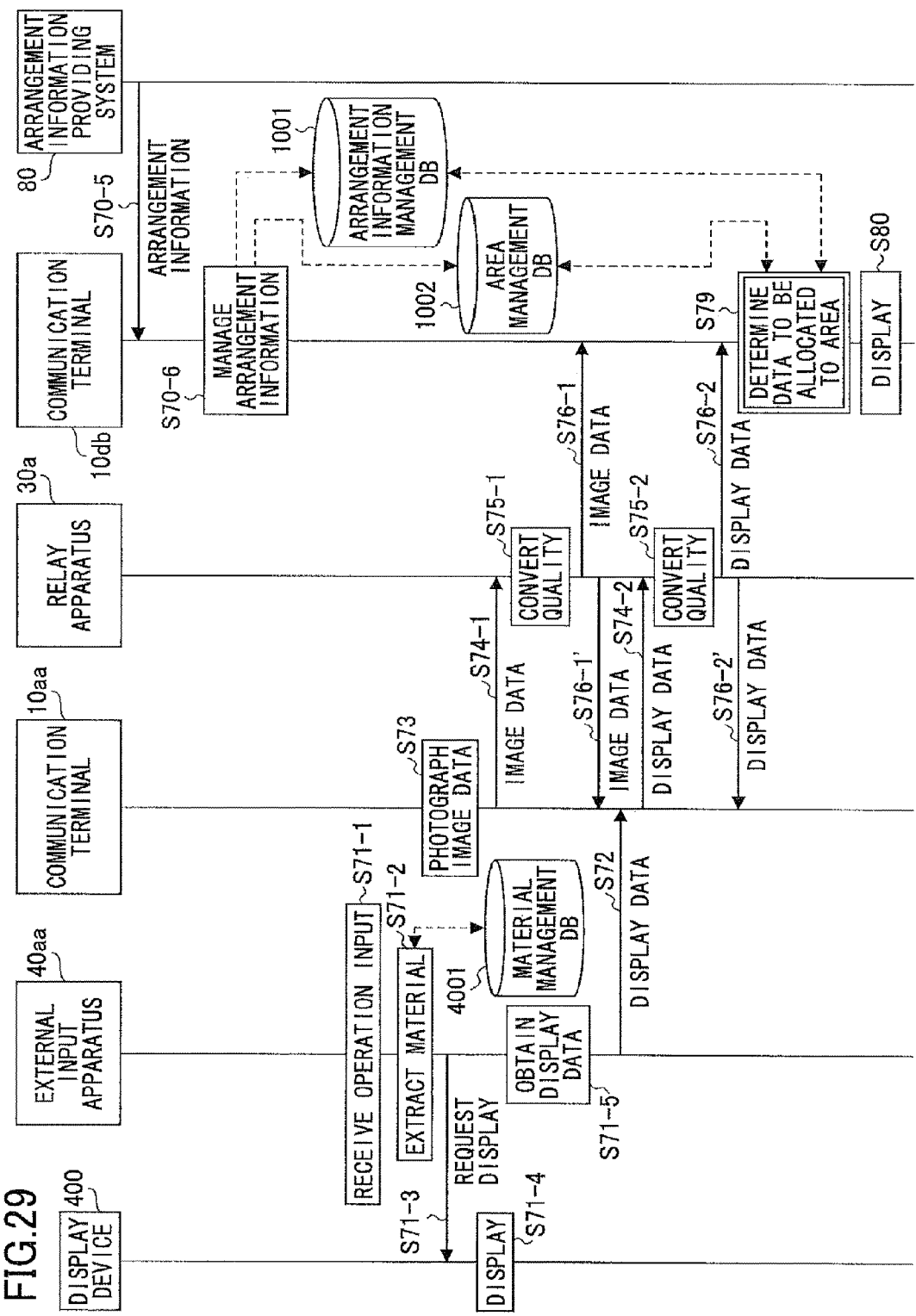
FIG. 29 is a sequence diagram showing a process of displaying image data and display data by the communication terminal according to the first embodiment.
Figure 30:
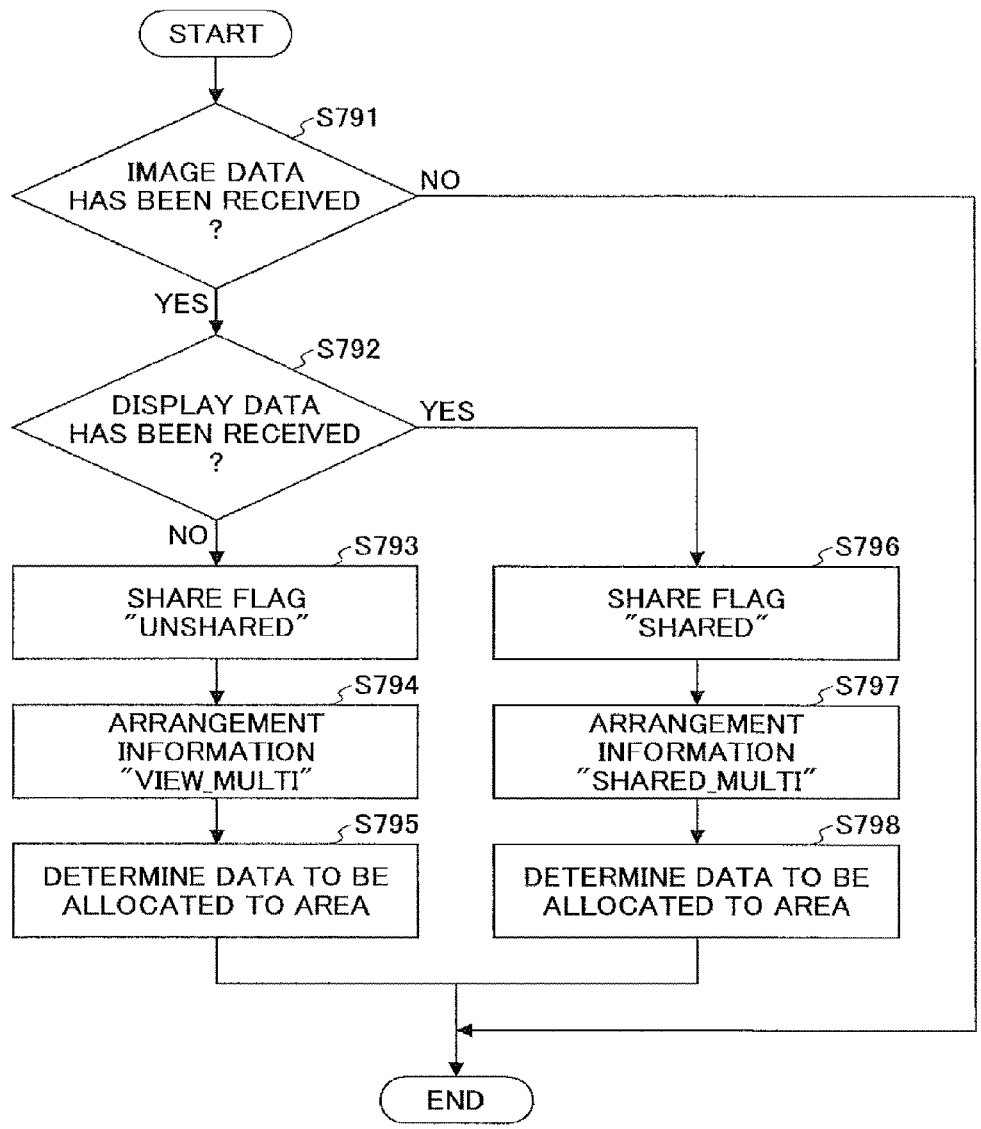
FIG. 30 is a flowchart showing a process of determining, by the communication terminal, arrangement information used for displaying image data and display data according to the first embodiment.
Figure 31:
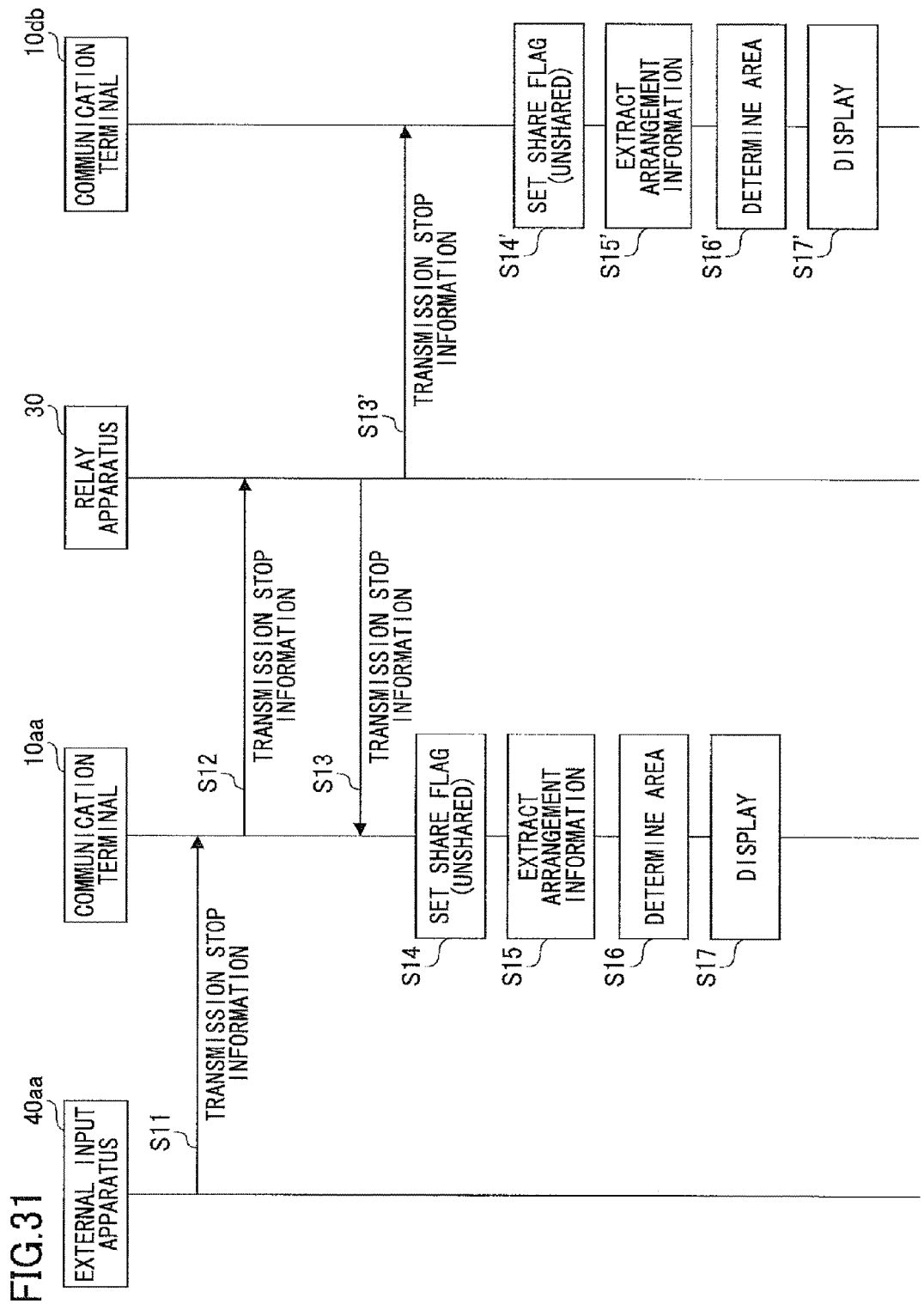
FIG. 31 is a sequence diagram showing a process of stopping transmission of display data according to the first embodiment.
Figure 32:
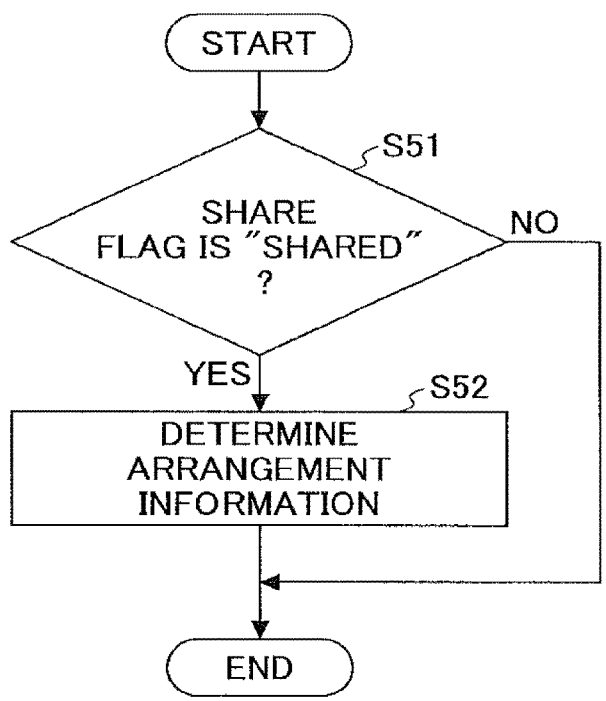
FIG. 32 is a flowchart showing a process of determining arrangement information based on operations carried out by a user according to the first embodiment.
Figure 33:
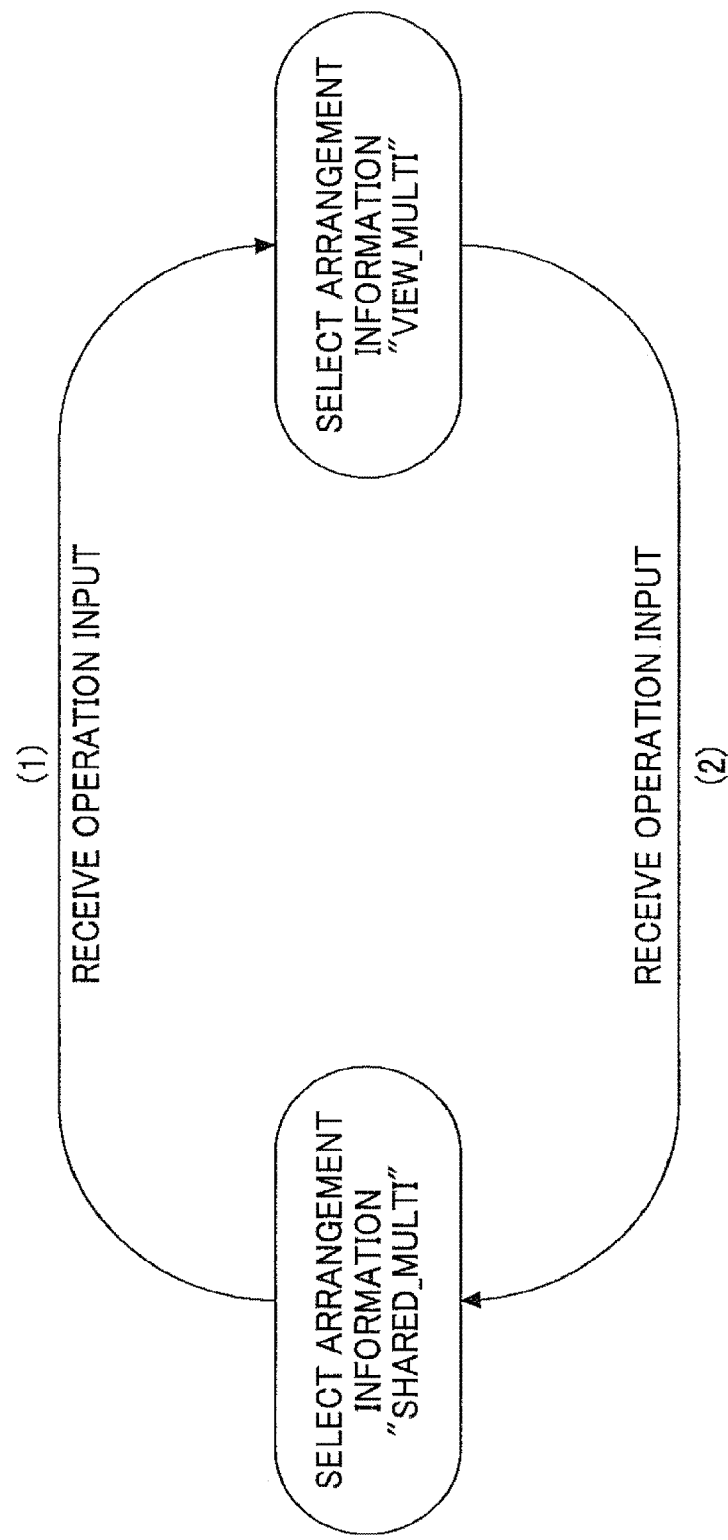
FIG. 33 is a state transition diagram showing a state transition of arrangement information based on operations carried out by a user according to the first embodiment.

Thus, the configuration and functions or functional parts of the communication system according to the first embodiment has been described. Next, with reference to FIGS. 16 through 23, and FIGS. 29 through 33, a processing method in the communication system 1 according to the first embodiment will be described. It is noted that FIG. 16 is a sequence diagram showing a process of managing the information indicating the states of the relay apparatuses 30 transmitted to the communication management system 50 from the corresponding relay apparatuses 30, respectively. FIG. 17 is a sequence diagram showing a process of a preparation stage for starting communication between plural communication terminals 10. FIG. 18 is a sequence diagram showing a process of narrowing down the relay apparatuses 30. FIG. 19 is a flowchart showing the process of narrowing down the relay apparatuses 30. FIG. 20 shows a state of calculation of point counts used when narrowing down the relay apparatuses 30. FIG. 21 is a sequence diagram showing the process of selecting a relay apparatus 30 by the communication terminal 10. FIG. 22 is a flowchart showing the process of selecting a relay apparatus 30 by the communication terminal 10. FIG. 23 is a sequence diagram showing a process of transmitting image data and voice data between the communication terminals 10. FIG. 29 is a sequence diagram showing a process of displaying the image data and the display data (material data) by the communication terminal. FIG. 30 is a flowchart showing a process of determining, by the communication terminal, arrangement information used for displaying the image data and the display data. FIG. 31 is a sequence diagram showing a process of stopping transmission of the display data. FIG. 32 is a flowchart showing a process of determining the arrangement information based on operations carried out by a user. FIG. 33 is a state transition diagram showing a state transition of the arrangement information based on operations carried out by the user.

First, with reference to FIG. 16, a process of managing the state information indicating the states of the respective relay apparatuses 30 transmitted to the communication management system 50 from the respective relay apparatuses 30 will be described. First, in each of the relay apparatuses 30, the state detection part 32 shown in FIG. 5B periodically detects the operating state of the relay apparatus 30 (own apparatus) (steps S1-1 through S1-4). Then, in order to cause the communication management system 50 to manage the operating states of the respective relay apparatuses 30 in a real-time manner, the transmission/reception part 31 of each of the relay apparatuses 30 periodically transmits the operating state of the own apparatus to the communication management system 50 via the communication network 2 (steps S2-1 through S2-4). The state information includes the relay apparatus ID of the corresponding relay apparatus 30, and the operating state detected by the state detection part 32 of the relay apparatus 30 corresponding to the relay apparatus ID. It is noted that a case will be supposed where the relay apparatuses 30a, 30b and 30d are operating normally and are in "on-line" states, respectively, while the relay apparatus 30c is operating but some failure has occurred in a program for carrying out a relay operation and is in a state of "off-line".

Next, in the communication management system 50, the transmission/reception part 51 receives the state information sent from each of the relay apparatuses 30, and the state information is stored and managed for each of the relay apparatus IDs in the relay apparatus management table (see FIG. 8) in the storage part 5000 via the storing/reading processing part 59 (steps S3-1 through S3-4). Thereby, as shown in FIG. 8, in the relay apparatus management table, for each of the relay apparatus IDs, one of operating states of "on-line", "off-line" and "in failure" is stored and managed. At this time, for each of the relay apparatus IDs, the reception date and time when the state information has been received in the communication management system 50 is stored and managed. It is noted that in a case where the state information has not been sent from the relay apparatus 30, the field area of operating state and the field area of reception date and time on the corresponding record in the relay apparatus management table shown in FIG. 8 become blank, or show the operating state and the reception date and time at the time of the preceding reception.

Next, with reference to FIG. 17, a process of transmission/reception of various sorts of management information at a preparation stage before starting communication (or remote communication) between the communication terminal 10*aa* and the terminal 10*db* will be described. First, when the user turns on the power supply switch 109 shown in FIG. 2, the operation input reception part 12 shown in FIG. 5B receives the power supply turning on operation, and turns on the power supply in the communication terminal 10 (step S21). Then, in response to reception of the above-mentioned power supply turning on operation, the login request part 13 automatically transmits login request information indicating a login request to the communication management system 50 via the communication network 2 from the transmission/reception part 11 (step S22). The login request information includes the terminal ID for identifying the own terminal (communication terminal 10*aa*) as the request source and the password. The terminal ID and password are data having been read out from the storage part 1000 via the storing/reading processing part 19 and having been sent to the transmission/reception processing part 11. It is noted that when the login request information is transmitted to the communication management system 50 from the communication terminal 10*aa*, the communication management system 50 that has received the login request information can obtain the IP address of the communication terminal 10*aa* that has sent the login request information.

Next, the terminal authentication part 52 in the communication management system 50 searches the terminal authentication management table stored in the terminal authentication management DB 5002 (see FIG. 9) of the storage part 5000 using the terminal ID and the password included in the login request information having been received from the transmission/reception part 51 as search keys, determines whether the same terminal ID and password are managed in the terminal authentication management table, and thus, carries out authentication of the communication terminal by determining whether the same terminal ID and password are managed (step S23). In a case where it has been determined by the terminal authentication part 52 that the login request is one sent from the communication terminal 10 having proper use authority since the same terminal ID and password are managed, the state management part 53 stores the terminal ID of the terminal 10*aa*, the operating state thereof, the reception date and time when the above-mentioned login request information has been received and the IP address of the terminal 10*aa* in the terminal management table stored in the terminal management DB 5003 (see FIG. 10) in a manner of associating them with each other (step S24). Thereby, in the terminal management table shown in FIG. 10, the operating state "on-line", the reception date and time "2009.11.10.13:40" and the IP address "1.2.1.3" are associated with the terminal ID "01aa" and are managed.

Then, the transmission/reception part 51 of the communication management system 50 transmits authentication result information indicating the result of the authentication obtained by the terminal authentication part 52 to the request source terminal (10*aa*), having carried out the above-mentioned login request, via the communication network 2 (step S25). Below, description will be carried out continuously for a case where the terminal authentication part 52 has determined that the terminal having carried out the above-mentioned login request has the proper use authority.

The terminal extraction part 54 of the communication management system 50 searches the destination list table stored in the destination list management DB 5004 (see FIG. 11) using the terminal ID "01aa" of the request source terminal (10*aa*) having carried out the login request as a search key, and reads out and extracts the terminal IDs as candidates for a destination terminal which can carry out communication with the request source terminal (10*aa*) (step S26). Here, the terminal IDs "01ab", "01ba" and "01db" of destination terminals (10*ab*, 10*ba* and 10*db*) corresponding to the terminal ID "01aa" of the request source terminal (10*aa*) are extracted.

Next, the terminal state obtaining part 55 searches the terminal management table stored in the terminal management DB 5003 (see FIG. 10) using these terminal IDs "01ab", "01ba" and "01db" of the candidates for a destination terminal extracted by the terminal extraction part 54 as search keys, reads the respective operating states "off-line", "on-line" and "on-line" for the above-mentioned respective terminal IDs extracted by the terminal extraction part 54, and obtains the respective operating states of the terminals 10*ab*, 10*ba* and 10*db* (step S27).

Next, the transmission/reception part 51 transmits destination state information including the terminal IDs "01ab", "01ba" and "01db" as the search keys used in step S27 and the operating states "off-line", "on-line" and "on-line" of the respective destination terminals (10*ab*, 10*ba* and 10*db*) to the request source terminal (10*aa*) via the communication network 2 (step S28). Thereby, the request source terminal (10*aa*) can obtain the respective operating states "off-line", "on-line" and "on-line" of the terminals 10*ab*, 10*ba* and 10*db* at the current time which are the candidates for a destination terminal 10B which can carry out communication (or remote communication) with the request source terminal (10*aa*).

Further, the terminal extraction part 54 of the communication management system 50 searches the destination list management table stored in the destination list management DB 5004 (see FIG. 11) using the terminal ID "01aa" of the request source terminal (10*aa*) having carried out the login request as a search key, and extracts the terminal IDs of the other request source terminals which have registered the above-mentioned request source terminal (10*aa*) as a candidate for a destination terminal 10B (step S29). In the destination list table shown in FIG. 11, the terminal IDs of the other request source terminals to be extracted are "01ab", "01ba" and "01db".

Next, the terminal state obtaining part 55 of the communication management system 50 searches the terminal state management table stored in the terminal state management DB 5003 (see FIG. 10) using the terminal ID "01aa" of the request source terminal (10*aa*) having carried out the above-mentioned login request, and obtains the operating state of the request source terminal (10*aa*) having carried out the login request (step S30).

Then, the transmission/reception part 51 transmits destination state information including the terminal ID "01aa" of the request source terminal (10*aa*) and the operating state "on-line" thereof obtained in step S30 to the terminals 10*ba* and 10*db* which have the operating state of "on-line" in the terminal management table stored in the terminal management DB 5003 (see FIG. 10) among the terminals 10*ab*, 10*ba* and 10*db* having the terminal IDs 01ab, 01ba and 01db extracted in step S29 (step S31-1, S31-2). It is noted that when the transmission/reception part 51 is to transmit the destination state information to the terminals 10*ba* and 10*db*, the transmission/reception part 51 reads the IP addresses of these terminals managed in the terminal management table shown in FIG. 10 based on the respective terminal IDs "01ba" and "01db". Thereby, it is possible to inform the respective destination terminals (10*ba* and 10*db*) which can carry out communication (or remote communication) with the request source terminal (10*aa*) having carried out the login request regarded as the destination, of the terminal ID "01aa" and the operating state "on-line" of the request source terminal (10aa) having carried out the above-mentioned login request.

On the other hand, also in each of the other communication terminals 10, the same as the above-mentioned step S21, when the user turns on the power supply switch 109 shown in FIG. 4, the operation input reception part 12 shown in FIG. 5B receives the power supply turning on operation, and the processes the same as those of steps S22 through S31-1 and S31-2 mentioned above are carried out. Therefore, the description therefor will be omitted.

Next, with reference to FIG. 18, the process of narrowing down the relay apparatuses 30 will be described. It is noted that according to the first embodiment, the request source terminal (10aa) can carry out communication (or remote communication) with at least one of the communication terminals (10ba and 10db) having the operating state of "on-line" among the communication terminals 10 of the candidates for a destination. Therefore, below, description will be carried out for a case where the user of the request source terminal (10aa) has selected to carry out communication (or remote communication) with the destination terminal (10db).

First, when the user presses the operating button 108 to select the communication terminal 10db, the operation input reception part 12 shown in FIG. 5B receives the selection of the destination terminal as the communication terminal 10db or receives a request to start communication (or remote communication) with the communication terminal 10db (step S41). Then, the transmission/reception part 11 of the request source terminal (10aa) transmits start request information including the terminal ID "01aa" of the terminal 10aa and the terminal ID "01db" of the destination terminal (10db) and indicating an intention to start communication (or remote communication) to the communication management system 50 (step S42). Thereby, the transmission/reception part 51 of the communication management system 50 receives the start request information, and can obtain the IP address "1.2.1.3" of the request source terminal (10aa) (transmission source). Then, the state management part 53 changes the field area of operating state in each of the records of the above-mentioned terminal ID "01aa" and terminal ID "01db", respectively, in the terminal management table stored in the terminal management table 5003 (see FIG. 10), into "on a telephone call", based on the terminal ID "01aa" of the request source terminal (10aa) and the terminal ID "01db" of the destination terminal (10db) included in the start request information (step S43). It is noted that in this state, although communication (or remote communication) (a telephone call) has not yet been started between the request source terminal (10aa) and the destination terminal (10db), the request source terminal (10aa) and the destination terminal (10db) thus enter the state of "on a telephone call". Therefore, when another communication terminal 10 intends to carry out a telephone call with the request source terminal (10aa) or the destination terminal (10db), a notification sound or display indicating the "on a telephone call" state is output.

Next, a process of carrying out a session for selecting a relay apparatus 30 will be described with reference to steps S44 through S48 (FIG. 18) and steps S61-1 through S66 (FIG. 21). First, the selection session ID generating part 56a generates a selection session ID used to carry out a session for selecting a relay apparatus 30 (step S44). Then, the session management part 57 stores the selection session ID "se1" generated in step S44, the terminal ID "01aa" of the request source terminal (10aa) and the terminal ID "01db" of the destination terminal (10db) in a manner of associating them with each other in the session management table stored in the session management DB 5005 (see FIG. 12) of the storage part 5000 and manages them (step S45).

Next, the narrowing down part (or preliminary narrowing down part) 56 of the communication management system 50 carries out preliminary narrowing down the relay apparatuses 30 for relaying communication between the request source terminal (10aa) and the destination terminal (10db) based on the relay apparatus management DB 5001, the terminal management DB 5003 and the priority management DB 5006 (step S46).

With reference to FIG. 19, the process in step S46 will now be described in detail. First, the terminal IP address extraction part 56b searches the terminal management table stored in the terminal management DB 5003 (see FIG. 10) based on the terminal ID "01aa" of the request source terminal 10aa and the terminal ID "01db" of the destination terminal 10db included in the start request information sent from the request source terminal 10aa, and extracts the IP addresses ("1.2.1.3" and "1.3.2.4") of the corresponding communication terminals (10aa, 10db) (step S46-1). Next, the preliminary selection part 56c selects the respective relay apparatus IDs (111a, 111b, 111d) of the relay apparatuses (30a, 30b, 30d) which are "on-line" from among the operating states of the relay apparatuses 30 managed in the relay apparatus management table stored in the relay apparatus management DB 5001 (see FIG. 8). Further, the preliminary selection part 56c searches the relay apparatus management table stored in the relay apparatus management DB 5001 (see FIG. 8) based on the IP address "1.2.1.3" of the request source terminal 10aa and the IP address "1.3.2.4" of the destination terminal 10db extracted in step S46-1, and determines whether for the dot addresses of the respective IP addresses ("1.2.1.2", "1.2.2.2", "1.3.2.2") of the relay apparatuses (30a, 30b, 30d) selected in step S46-2, the dot address is the same as the dot addresses of the IP addresses ("1.2.1.3" and "1.3.2.4") of the request source terminal 10aa and the destination terminal 10db (step S46-3).

Next, the priority determination part 56d reads the priority management table stored in the priority management DB 5006 (see FIG. 13) and determines the point count of the address priority for each of the relay apparatuses (30a, 30b, 30d) determined in step S46-3 (step S46-4). FIG. 20 shows a result of the determination. It is noted that FIG. 20 shows a calculation state for the point counts of the priority used when the process of narrowing down the relay apparatuses 30 is carried out. In FIG. 20, for each of the relay apparatus IDs, the point counts of the address priority, the point counts of the transmission rate priority and the total point counts are shown. Further, the point counts of the address priority include the point count with respect to the request source terminal 10aa and the point count with respect to the destination terminal 10db. The total point count is obtained from totaling the higher one of these two point counts of the address priority and the point count of the transmission rate priority.

According to the first embodiment, the IP address "1.2.1.2" of the relay apparatus 30a is "same.same.same.diff" with respect to the IP address "1.2.1.3" of the request source terminal 10aa, and therefore, in FIG. 20, the point count of the address priority is "5". The IP address "1.2.1.2" of the relay apparatus 30a is "same.diff.diff.diff" with respect to the IP address "1.3.2.4" of the destination terminal 10db, and therefore, in FIG. 20, the point count of the address priority is "1" (i.e., "same.diff.-.-"). The IP address "1.2.2.2" of the relay apparatus 30*b* is "same.same.diff. diff" with respect to the IP address "1.2.1.3" of the request source terminal 10*aa*, and therefore, in FIG. 20, the point count of the address priority is "3" (i.e., "same.same.diff.-"). The IP address "1.2.2.2" of the relay apparatus 30*b* is "same.diff.same.diff" with respect to the IP address "1.3.2.4" of the destination terminal 10*db*, and therefore, in FIG. 20, the point count of the address priority is "1" (i.e., "same.diff.-.-"). The IP address "1.3.2.2" of the relay apparatus 30*d* is "same.diff.diff.diff" with respect to the IP address "1.2.1.3" of the request source terminal 10*aa*, and therefore, in FIG. 20, the point count of the address priority is "1" (i.e., "same.diff.-.-"). The IP address "1.3.2.2" of the relay apparatus 30*d* is "same.same.same.diff" with respect to the IP address "1.3.2.4" of the destination terminal 10*db*, and therefore, in FIG. 20, the point count of the address priority is "5".

Next, returning to FIG. 19, the priority determination part 56*d* searches the priority management table stored in the priority management DB 5006 (see FIG. 14) based on the maximal transmission rate of each of the relay apparatuses 30 managed in the relay apparatus management table stored in the relay apparatus management DB 5001 (see FIG. 8), and determines, for each of the relay apparatuses (30*a*, 30*b*, 30*d*) having been narrowed down in the preliminary narrowing down process, the point count of the transmission rate priority (step S46-5). According to the first embodiment, since the maximum transmission rate of the relay apparatus 30*a* is 100 (Mbps) as shown in FIG. 8, the point count of the transmission rate priority is "3" when reading the transmission rate priority shown in FIG. 14. Similarly, since the maximum transmission rate of the relay apparatus 30*b* is 1000 Mbps as shown in FIG. 8, the point count of the transmission rate priority is "5". Similarly, since the maximum transmission rate of the relay apparatus 30*d* is 10 Mbps as shown in FIG. 8, the point count of the transmission rate priority is "1".

Next, in step S46-6, the top two relay apparatuses 30 having the highest and second highest point counts from among the total point counts obtained from totaling the higher point counts of the address priority with respect to the communication terminals (10*aa*, 10*db*) and the point counts of the transmission rate priority, respectively, are selected by the preliminary selection part 56*c*. According to the example of FIG. 20, since the relay apparatuses IDs (111a, 111b, 111d) have the total point counts of "8", "8", "6", respectively, the relay apparatus 30*a* having the relay apparatus ID "111a" and the relay apparatus 30*b* having the relay apparatus ID "111b" are thus selected as the top two relay apparatuses 30.

When the narrowing down process in step S46 is thus finished, the transmission/reception part 51 shown in FIG. 5A transmits relay apparatus narrowing down information, for informing the destination terminal (10*db*) via the communication network 2 of the narrowed down number of the relay apparatuses 30, to the destination terminal (10*db*) (step S47). The relay apparatus narrowing down information includes the number "2" of the relay apparatuses 30*a* and 30*b* thus narrowed down in step S46, the terminal ID "01aa" of the request source terminal (10*aa*) and the above-mentioned selection session ID "se1". Thereby, the communication terminal 10*db* can understand the number of the relay apparatuses 30 and the communication terminal from which the request for starting a TV conference has been carried out, in execution of the selection session of ID "se1", and also can understand the IP address "1.1.1.2" of the communication management system 50 that is the transmission source of the relay apparatus narrowing down information.

Then, the transmission/reception part 11 of the communication terminal 10*db* transmits reception completion information indicating that the above-mentioned relay apparatus narrowing down information has been received, to the communication management system 50 via the communication network 2 (step S48). The reception completion information includes the session ID "se1". Thereby, the communication management system 50 can understand that the transmission of the number of the relay apparatuses 30 carried out in the session ID "se1" has been finished, and can know the IP address "1.3.2.4" of the destination terminal (10*db*) that is the transmission source.

Next, with reference to FIG. 21, a process of the destination terminal (10*db*) selecting a relay apparatus 30 will be described. First, the communication management system 50 transmits advance relay request information that requests relaying in advance, to each of the relay apparatuses 30*a* and 30*b* narrowed down in step S46 (steps S61-1, S61-2), before a TV conference is started. The advance relay request information includes the session ID "se1", the IP address "1.2.1.3" of the request source terminal (10*aa*) and the IP address "1.3.2.4" of the destination terminal (10*db*). Thereby, each of the relay apparatuses 30*a* and 30*b* can understand which selection session is relevant, which is the request source terminal 10A and which is the destination terminal 10B, and also can know the IP address "1.1.1.2" of the communication management system 50 that is the transmission source of the advance relay request information.

Next, each of the relay apparatuses 30*a* and 30*b* transmits, from the transmission/reception part 31, advance transmission request information, indicating an intention of requesting the request source terminal (10*aa*) to transmit advance transmission information including a ping (Packet Internet Groper) described later to the respective one of the relay apparatuses 30*a* and 30*b* itself before a start of a TV conference, to the request source terminal (10*aa*) understood in steps S61-1 and S61-2, via the communication network 2 (steps S62-1, S62-2). The advance transmission request information includes the session ID "se1". Thereby, the request source terminal (10*aa*) can understand it is being requested to transmit the advance transmission information to each of the relay apparatuses 30*a* and 30*b* in the process of selecting a relay apparatus 30 carried out in the session ID "se1", and can know the IP addresses "1.2.1.2" and "1.2.2.2" of the relay apparatuses 30*a* and 30*b* that are the transmission sources of the advance transmission request information.

Thus, the IP address of the destination terminal 10*db* is not supplied to the request source terminal 10*aa* directly from the communication management system 50. For example, the IP address of the destination terminal 10*db* is supplied to the relay apparatus 30*a* as in step S61-1 and the relay apparatus 30*a* requests the request source terminal 10*aa* to transmit the advance transmission information to the own apparatus (the relay apparatus 30*a*) as in step S62-1. Not notifying one communication terminal 10 of the IP address of another communication terminal 10 is for ensuring security.

Next, the request source terminal (10*aa*) transmits the advance transmission information to each of the relay apparatuses 30*a* and 30*b* via the communication network 2 from the transmission/reception part 11 (steps S63-1, S63-2). The advance transmission information is information used for measuring a time required from a transmission by the request source terminal (10*aa*) to a reception by the destination terminal (10db), as a result of it being transmitted to the destination terminal (10db) via each of the relay apparatuses 30a and 30b instead of image data and voice data, in advance to transmission of the actual image data and voice data. Further, the advance transmission information includes ping, used to determine that the request source terminal (10aa), the relay apparatuses 30a and 30b and the destination terminal (10db) are connected in a manner of being able to carry out mutual communication, transmission date and time when the advance transmission information has been transmitted from the request source terminal (10aa) and the session ID "se1". Thereby, each of the relay apparatuses 30a and 30b can understand that in execution of the session of the selection session ID "se1", the advance transmission information has been transmitted, and also can understand the IP address "1.2.1.3" of the request source terminal (10aa) that is the transmission source of the advance transmission information.

Next, each of the relay apparatuses 30a, 30b relays the advance transmission information to the IP address "1.3.2.4" of the destination terminal (10db) included in the advance relay request information received in steps S61-1, S61-2 (steps S64-1, S64-2). Thereby, the destination terminal (10db) can understand that in execution of the session of the session ID "se1", the advance transmission information has been sent, and also can know the IP addresses "1.2.1.2" and "1.2.2.2" of the relay apparatuses 30a, 30b that are the transmission sources (relay sources) of the advance transmission information.

Next, the selection processing part 16 (or finally narrowing down part) of the destination terminal (10db) finally narrows down to and selects a single relay apparatus 30 which is to relay image data and voice data in a TV conference, based on the advance transmission information (step S65).

With reference to FIGS. 5 and 22, the process in step S65 will be descried in further detail. First, the measurement part 16a of the selection processing part 16 measures the reception dates and times when respective advance transmission information sets, relayed by the respective relay apparatuses 30a, 30b, have been received by the transmission/reception part 11 of the communication terminal 10db (step S65-1). Next, the calculation part 16b calculates the required times from the transmissions to the receptions of the respective advance transmission information sets, for which the reception dates and times have been measured as mentioned above, based on the differences between the reception dates and times and the transmission dates and times included in the respective advance transmission information sets (step S65-2). Next, the selection part 16c determines whether in execution of the session of the session ID "se1", all of the advance transmission information sets, corresponding to the number "2" of the relay apparatuses which are the candidates, have been received (step S65-3). When all of the advance transmission information sets have not yet been received (NO), the selection part 16c determines whether a certain time (here, 1 minute, for example) has elapsed from when the terminal 10db has received the advance transmission information set most recently (step S65-4). In a case where the certain time has not yet elapsed (NO), step S65-1 is returned to. On the other hand, in a case where all of the advance transmission information sets have been received (step S65-3 YES) or the certain time has elapsed (step S65-4 YES), the selection part 16c selects one of the relay apparatuses 30 which has relayed the advance transmission information set having the shortest required time among the required times calculated until now by the calculation part 16b (step S65-5). It is noted that description of the first embodiment will be carried out for a case where the relay apparatus 30a is selected as a result of it being determined that the advance transmission information set relayed by the relay apparatus 30a has the time required from the transmission to the reception shorter than that of the advance transmission information set relayed by the relay apparatus 30b.

It is noted that in the first embodiment, the destination terminal 10db narrows down the relay apparatuses 30. However, this way is not limiting, and it is also possible that the destination terminal 10db transmits all the required time information indicating the required time from the transmission to the reception of the advance transmission information to the request source terminal 10aa or the communication management system 50, which then finally narrows down the relay apparatuses 30 into the single relay apparatus 30a.

Next, the destination terminal (10db) transmits selection information indicating having thus selected the relay apparatus 30a to the communication management system 50 via the communication network 2 from the transmission/reception part 11 (step S66). The selection information includes the session ID "se1" and the relay apparatus ID "111a" of the thus-selected relay apparatus 30a. Thereby, the communication management system 50 can understand that in execution of the session of the session ID "se1", the relay apparatus 30a has been selected, and also can know the IP address "1.3.2.4" of the destination terminal (10db) that is a transmission source of the selection information.

Next, the session management part 57 of the communication management system 50 stores the relay apparatus ID "111a" of the finally selected single relay apparatus 30a in the field area of relay apparatus on the record including the session ID "se1" in the session management table of the session management DB 5005 (see FIG. 12) and manages it (step S67-1). The transmission/reception part 51 transmits the relay apparatus ID "111a" and the IP address "1.3.2.4" of the destination terminal 10db to the request source terminal 10aa (step S67-21). Then, the transmission/reception part 51 of the communication management system 50 transmits relay start request information to indicate an intention of starting relaying to the relay apparatus 30a via the communication network 2 (step S68). The relay start request information includes the respective IP addresses "1.2.1.3" and "1.3.2.4" of the request source terminal 10aa and the destination terminal 10db for which relaying is to be carried out. Thus, the relay apparatus 30a establishes a session for carrying out communication (or remote communication) of three sets of image data of low resolution, medium resolution and high resolution, and voice data (step S69). Thereby, the communication terminals 10aa and 10db can start a TV conference.

It is noted that in step S47 mentioned above, the communication management system 50 transmits the relay apparatus narrowing down information to the destination terminal (10db), and then, the destination terminal (10db) carries out the process of selecting the relay apparatus (step S65) through steps S48 through S64-1, S64-2. However, it is not necessary to be limited to this way. Instead, in step S47, the communication management system 50 may transmit the relay apparatus narrowing down information rather to the request source terminal (10aa), and thus, after that, up to steps S64-1 and S64-2, the transmission source and destination may be replaced with one another between the request source terminal (10aa) and the destination terminal (10db) for transmitting each information set. Thus, instead of step S65, the request source terminal (10aa) may carry out the process of selecting the relay apparatus. Further, instead of step S66, the request source terminal (10aa) may carry out transmission of the selection information.

Next, with reference to FIGS. 5 and 23, a process of transmitting image data and voice data between the request source terminal 10aa and the destination terminal 10db for the purpose of carrying out a TV conference will be described. First, the request source terminal (10aa) transmits image data of an object photographed by the photographing part 14a and voice data of a voice input by the voice input part 15a to the relay apparatus 30a via the communication network 2 from the transmission/reception part 11 through the image and voice data session "sed" shown in FIG. 2 (step S81). It is noted that according to the first embodiment, image data of high image quality including the three resolutions of the low resolution, the medium resolution and the high resolution, shown in FIGS. 6A, 6B and 6C, and the voice data, are transmitted. Thus, the relay apparatus 30a receives the image data of the three resolutions and the voice data from the transmission/reception part 31. Then, the data quality determination part 33 searches the change quality management table stored in the change quality management DB 3001 (see FIG. 7) using the IP address "1.3.2.4" of the destination terminal (10db), extracts the corresponding image quality of image data to relay, and thus, recognizes the image quality of image data to relay (step S82). In this case, supposing that the determined image quality of image data is "high image quality", it is the same as the image quality of the image data received by the transmission/reception part 31. Therefore, the relay apparatus 30a transfers the image data of the image quality, as it is, and the voice data of the voice quality, as it is, to the destination terminal (10db) through the image and voice data session "sed" (step S83). Thus, the destination terminal (10db) receives by the transmission/reception part 11 the image data and the voice data, the display control part 14b displays the image based on the received image data on the display device 100, and the voice output part 15b outputs the voice based on the received voice data.

Next, the delay detection part 17 of the terminal 10db detects a delay time of reception of the image data received by the transmission/reception part 11 at certain time intervals (for example, once a second) (step S84). It is noted that description will be carried out below for a case where the thus-detected delay time is 200 ms. The detection of a delay time of reception of the image data may be carried out by, for example, information indicating transmission date and time when the image data is transmitted from the transmission source terminal being attached to the image data, and the transmission destination terminal calculating the delay time based on the difference between the transmission and reception of the received image data, using the information indicating transmission date and time attached to the received image data and reception date and time when the received image data is received in the transmission destination terminal.

The transmission/reception part 11 of the destination terminal (10db) transmits delay information indicating the delay time "200 ms" to the communication management system 50 via the communication network 2 (step S85). Thereby, the communication management system 50 can know the delay time and also know the IP address "1.3.2.4" of the communication terminal 10db that is the transmission source of the delay information.

Next, the delay time management part 60 of the communication management system 50 searches the terminal management table stored in the terminal management DB 5003 (see FIG. 10) using the IP address "1.3.2.4" of the above-mentioned destination terminal (10db) as a search key, extracts the corresponding terminal ID "01db", stores the delay time "200 ms" indicated by the above-mentioned delay information at the field area of delay time on the record of the above-mentioned terminal ID "01db" in the session management table of the session management DB 5005 (see FIG. 12), and manages it (step S86)

Next, the quality determination part 58 searches the quality management table stored in the quality management DB 5007 (see FIG. 15) using the above-mentioned delay time "200 ms" as a search key, extracts the corresponding image quality "medium image quality" of image data, and thus determines the image quality to be "medium image quality" (step S87).

Next, the transmission/reception part 51 obtains the relay apparatus ID "111a" associated with the above-mentioned terminal ID "01db" from the session management table stored in the session management DB 5005 (see FIG. 12), searches the relay apparatus management table stored in the relay apparatus management DB 5001 (see FIG. 8) using the relay apparatus ID "111a" as a search key, and extracts the IP address "1.2.1.2" of the corresponding relay apparatus 30a (step S88). Then, the transmission/reception part 51 transmits the quality information indicating the image quality "medium image quality" determined in step S87 to the relay apparatus 30a via the communication network 2 (step S89). The quality information includes the IP address "1.3.2.4" of the destination terminal (10db) used as the search key in step S86. Thereby, the change quality management part 34 in the relay apparatus 30a stores the IP address "1.3.2.4" of the communication terminal 10 (here, the terminal 10db) as the transmission destination and the image quality "medium image quality" of image data to be relayed, in the change quality management table stored in the change quality management DB 3001 (see FIG. 7) in a manner of associating them with one another, and manages them (step S90).

Next, the communication terminal 10aa continuously transmits the image data of the high image quality including the three resolutions of the low resolution, medium resolution and high resolution and voice data to the relay apparatus 30a through the image and voice data session "sed", the same as step S81 mentioned above (step S91). Then, the same as step S82 mentioned above, the data quality determination part 33 of the relay apparatus 30a searches the change quality management table stored in the change quality management DB 3001 (see FIG. 7) using the IP address "1.3.2.4" of the destination terminal (10db) as a search key, extracts the corresponding image quality "medium image quality" to relay, and thus recognizes the quality of the image of the image data to relay (step S92). In this example, the determined image quality of image data is "medium image quality" which is lower than the image quality "high image quality" of the image data received by the transmission/reception part 31. Therefore, the data quality changing part 35 reduces the image quality of image data from "high image quality" to "medium image quality", and thus changes the quality of the image of the image data (step S93). Then, the transmission/reception part 31 transmits the image data for which the image quality has been thus changed to "medium image quality" and the voice data for which the voice quality has not been changed, to the communication terminal 10db via the communication network 2 (step S94). Thus, in the case where the delay in reception occurs in the destination terminal (10db) that receives the image data, the relay apparatus 30a changes (reduces) the quality of the image to reduce the delay, and thus, it is possible to prevent the persons participating in the TV conference from feeling that something is wrong.

Next, using FIG. 29, a process of displaying, at the communication terminal 10db, display data indicating a screen page of material data of the external input apparatus 40aa connected with the communication terminal 10aa and image data input at the communication terminal 10aa will be described.

Previously, the arrangement information, in which areas and sizes of image data and display data to be displayed on the screen of the communication terminal 10 are defined, is stored in the communication terminal 10. Specifically, from the arrangement information providing system 80, the transmission/reception part 11 of the communication terminal 10db receives the arrangement information via the Internet 2i, the private line 2cd and the LAN 2d (step S70-5), and the storing/reading processing part 19 stores the arrangement information in an area management DB 1002 stored in the storage part 1000 (step S70-6).

When a TV conference has been started, the photographing part 14a of the communication terminal 10aa takes the picture of the conference participant and so forth to obtain the image data (step S73). The image data obtained in step S73 is transmitted to the relay apparatus 30a by the transmission/reception part 11 (step S74-1). The relay apparatus 30a having received the image data converts the quality of the image, (step S75-1), and transmits the image data to the communication terminals 10aa and 10db (steps S76-1 and S76-1'). Then, the respective transmission/reception parts 11 of the communication terminals 10aa and 10db receive the transmitted image data.

Similarly, not shown in FIG. 29, the photographing part 14a of the communication terminal 10db takes the picture of the conference participant and so forth to obtain the image data. The image data obtained is transmitted to the relay apparatus 30a by the transmission/reception part 11. The relay apparatus 30a having received the image data converts the quality of the image, and transmits the image data to the communication terminals 10db and 10aa. Then, the respective transmission/reception parts 11 of the communication terminals 10aa and 10db receive the transmitted image data.

On the other hand, the operation input reception part 42 of the external input apparatus 40aa (see FIG. 27) receives information of at least one of a material name, a size, an application name and updated date and time from an operator (step S71-1). Then, the storing/readying processing part 49 searches the material management DB 4001 of the storage part 4000 using the information thus received by the operation input reception part 42 as a key, and extracts the corresponding material (step S71-2). Then, the display control part 43 carries out control to display the extracted material on the display device 400 (step S71-3), and the display device 400 displays the material data (step S71-4). Next, the display data obtaining part 44 obtains the display data (for displaying the material data that is thus displayed on the display device 400 in step S71-4) (step S71-5), and the transmission/reception part 41 transmits the obtained display data to the external information transmission/reception part 18 of the communication terminal 10aa (step S72).

It is noted that steps S71-1 through S71-4 may be omitted, and in a case of the omitting, the display data of the desktop screen page is transmitted in step S72. At this time, step S71-5 is carried out in response to a transmission starting instruction received from the operator. The operation input reception part 42 may receive the transmission starting instruction as a result of a button displayed on the display device 400 being pressed by the operator. Further, the step S71-5 may be carried out in response to the external input apparatus 40aa and the communication terminal 10aa being connected together by a cable or such.

The transmission/reception part 11 transmits the display data received from the external input apparatus 40aa in step S72 to the relay apparatus 30a (step S74-2). The relay apparatus 30a having received the display data converts the quality of the image of the display data (step S75-2), and transmits the display data to the communication terminals 10aa and 10db (steps S76-2, S76-2'). Thus, the transmission/reception part 11 of the communication terminal 10db receives the display data transmitted from the relay apparatus 30a, and the arrangement information selection part 14c determines the arrangement information (step S79).

Details of the process of converting the quality of the image in steps S75-1 and S75-2 are the same as those of the process of changing the quality of the image data described above (steps S81 through S94), and duplicate description thereof will be omitted.

Next, using FIG. 30, the process of determining the arrangement information carried out in step S79 will be described in detail.

First, the arrangement information selection part 14c determines whether the transmission/reception part 11 has received the image data (step S791). When the image data has not been received, the display control part 14b displays nothing and the process is finished. When the image data has been relieved in step S791, the arrangement information selection part 14c determines whether the transmission/reception part 11 has received the display data (step S792). When the display data has not been received in step S792, the storing/reading processing part 19 sets a share flag "UNSHARED" (step S793). Then, the arrangement information selection part 14b searches the arrangement information management table shown in FIG. 24 using the share flag "UNSHARED" as a search key, and selects the arrangement information "VIEW_MULTI" stored as being associated with the share flag (step S794). Next, the area determination part 14d searches the area management table shown in FIG. 25 using the arrangement information "VIEW_MULTI" selected in step S794 as a search key and determines the image data sets to be displayed at respective areas, the information of which is stored as being associated with the arrangement information in the area management table, as shown in FIG. 26B where the image data sets of the participants are displayed at the respective areas 1 and 2 (step S795).

Similarly, when the display data has been received in step S792, the storing/reading processing part 19 determines to select a share flag "SHARED" (step S796). Then, the arrangement information selection part 14b searches the arrangement information management table shown in FIG. 24 using the share flag "SHARED" as a search key, and selects the arrangement information "SHARED_MULTI" stored as being associated with the share flag (step S797). Next, the area determination part 14d searches the area management table shown in FIG. 25 using the arrangement information "SHARED_MULTI" selected in step S797 as a search key and determines the image data and the display data to be displayed at the respective areas, information of which is stored as being associated with the arrangement information in the area management table, as shown in FIG. 26A where the material data (i.e., the display data) is displayed at the area 1 and the image data sets of the participants are displayed at the respective areas 2 and 3 (step S798).

When the arrangement information has been thus determined in step S79, the display control part 14*b* displays the image data and the display data at the respective areas determined in step S79 (step S80).

Next, a process of stopping transmission of the display data from a state where the external input apparatus 40*aa* is transmitting the display data, will be described using FIG. 31.

First, the transmission/reception part 41 of the external input apparatus 40*aa* transmits transmission stopping information for the display data to the communication terminal 10*aa* (step S11). The transmission stopping information is thus transmitted as a result of the operation input reception part 11 receiving a transmission stopping instruction generated when the user presses a button or such. Further, the transmission stopping information may be thus transmitted as a result of the cable or such connecting the external input apparatus 40*aa* and the communication terminal 10*aa* together being removed.

When the transmission stopping information is received by the communication terminal 10*aa* in step S11, the transmission/reception part 11 of the communication terminal 10*aa* transmits the transmission stopping information to the relay apparatus 30 in step S12. The transmission/reception part 31 of the relay apparatus 30 then transmits the transmission stopping information to the communication terminals 10*aa* and 10*db* (step S13, S13').

When the transmission/reception part 11 of the communication terminal 10*aa* has received the transmission stopping information (step S13), the storing/reading processing part 19 sets the share flag "UNSHARED" (step S14).

Next, the arrangement information selection part 14*c* of the communication terminal 10*aa* uses the share flag "UNSHARED" as a search key to search the arrangement information management DB 1001, and extracts the corresponding arrangement information "VIEW_MULTI" (step S15). Then, the area determination part 14*d* uses the arrangement information "VIEW_MULTI" extracted in step S15 as a search key to search the area management DB 1002 (see FIG. 25), and determines at which area the image data is to be displayed, the information thereof being stored as being associated with the arrangement information in the area management DB 1002 (step S16). The display control part 14*b* displays the image data at the respective areas as shown in FIG. 26B where the image data of the participants are displayed at the respective areas 1 and 2 based on the determination (step S17).

Similarly, when the transmission/reception part 11 of the communication terminal 10*db* has received the transmission stopping information (step S13'), the storing/reading processing part 19 sets the share flag "UNSHARED" (step S14').

Next, the arrangement information selection part 14*c* of the communication terminal 10*db* uses the share flag "UNSHARED" as a search key to search the arrangement information management DB 1001, and extracts the corresponding arrangement information "VIEW_MULTI" (step S15'). Then, the area determination part 14*d* uses the arrangement information "VIEW_MULTI" extracted in step S15' as a search key to search the area management DB 1002, and determines at which area the image data is to be displayed, the information thereof being stored in the area management DB 1002 as being associated with the arrangement information (step S16'). The display control part 14*b* displays the image data at the respective areas shown in FIG. 26B where the image data of the participants are displayed at the respective areas 1 and 2 based on the determination (step S17').

Thus, the control of stopping the transmission from the state where the external input apparatus 40*aa* is transmitting the display data has been thus described. Control of stopping the transmission from the state where the external input apparatus 40*db* is transmitting the display data is the same as that, and duplicate description will be omitted.

In the first embodiment, based on the share flag which is reception information indicating whether the display data has been received from the external input apparatus 40, at which area the image data or the display data is to be displayed is determined. However, instead, at which area the image data or the display data is to be displayed may be determined according to operations of the user received by the operation input reception part 12 of the communication terminal 10. Specifically, as shown in FIG. 32, first, it is determined whether the share flag is "SHARED" (step S51). In a case where the share flag is not "SHARED", the process is finished. In a case where the share flag is "SHARED", the arrangement information to be selected next is determined (step S52) based on the arrangement information corresponding to the current displaying on the display device 100.

Using FIG. 33, details of determining the arrangement information based on the user's operations will now be described. First, when the operation input reception part 12 receives the user's operation input in a state where the share flag is "SHARED" (i.e., steps S796→S797 in FIG. 30, and thus, the arrangement information is "SHARED_MULTI") (in FIG. 33, (1)), the area management table is searched using the arrangement information "VIEW_MULTI" as a search key, and at which area the image data is to be displayed is determined, as shown in FIG. 26B where the image data of the participants are displayed at the respective areas 1 and 2. Thus, even when the communication terminal 10 has received the display data from the external input apparatus 40 (i.e., in FIG. 30, step S792 YES→step S796→S797→S798), the display control part 14*b* does not display the display data, and displays only the image data as shown in FIG. 26B. Further, when from this state, the operation input reception part 12 receives the user's operation input (FIG. 33, (2)), the area determination table is searched using the arrangement information "SHARED_MULTI" as a search key, and at which areas the image data and the display data are to be displayed are determined, as shown in FIG. 26A where the display data (material data) is displayed at the area 1, and the image data of the participants are displayed at the respective areas 2 and 3. Thus, the communication terminal 10 displays the display data and the image data as shown in FIG. 26A.

Thus, it is possible to control as to whether the display data is to be displayed according to a determination made by the user freely depending on a situation of the TV conference, even in a case where the communication terminal 10 has received the display data.

Main Advantageous Effects of First Embodiment

Thus, according to the first embodiment, when a TV conference participant considers to use material data (for example, data of presentation, word, spreadsheet or such) stored in the external input apparatus 40 in the TV conference, the participant may connect the external input apparatus 40 to the communication terminal 10, the material data may be displayed from the screen of the external input apparatus 40, and the display data thus being displayed from the screen of the external input apparatus 40 may be transmitted to the communication terminal 10. Thereby, it is possible to display the display data (material data) on the display device 100 of the communication terminal 10 in a large size without carrying out manual operation.

Further, when the usage of the material data becomes unnecessary, it is possible to display video data (i.e., the image data) in a large size on the display device 100 of the communication terminal 10 without carrying out manual operation, by stopping the transmission of the display data.

Therefore, operationality as to whether the material data is necessary is improved, and also, the TV conference participants can focus their attention on the data displayed in the large size, and thus, it is possible for the TV conference to smoothly progress.

Further, in the communication network 2 (see FIG. 1), it may be difficult to obtain information concerning the environment of the Internet 2i even if it may be possible to obtain information concerning the environment of the LAN 2 such as the IP addresses of the relay apparatuses 30 or such. Therefore, according to the first embodiment, the plural relay apparatuses 30 are narrowed down to two or more using the information concerning the environment of LAN 2 for relaying the image data and the voice data. Next, before the image data and the voice data are actually transmitted between plural communication terminals 10, advance transmission information is transmitted as a trial instead of the image data and the voice data. Thereby, it is possible to advantageously narrow down the relay apparatuses 30 into a single one which can relay fastest the advance transmission information.

That is, the top two or more relay apparatuses 30, to which the IP addresses close to any one of the IP addresses of the communication terminals 10 are allocated, respectively, are selected. Thereby, it is possible to select the two or more relay apparatuses 30 as candidates for a relay apparatus 30 which is finally used. Then, the advance transmission information is transmitted between a request source terminal 10A and a destination terminal 10B using these candidate relay apparatuses 30. Thereby, from among the two or more relay apparatuses 30 as the candidates, it is possible to narrow down to a single one which has relayed the advance transmission information with the shortest time required for the transmission. Thus, it is possible to advantageously achieve transmission of the image data and the voice data at high quality to the utmost limit under the current environment of the communication network 2.

Further, according to the first embodiment, when the relay apparatuses 30 are narrowed down, not only by preferentially selecting the relay apparatuses 30 having the IP addresses close to the IP addresses of the communication terminals 10 that are used for a TV conference, but also by considering the maximum transmission rates in the relay apparatuses 30, the two more relay apparatuses 30 are selected. Thereby, it is possible to advantageously narrow down candidates for the relay apparatus 30 suitable to the actual environment of the communication network 2.

Further, according to the first embodiment, the narrowing down is carried out from among the relay apparatuses 30 having the operating states of on-line. Therefore, it is possible to advantageously narrow down the candidates for the relay apparatus 30 further suitable to the actual environment of the communication network 2.

Further, according to the first embodiment, it is also possible to transmit the data via the previously determined relay apparatus 30 instead of carrying out the process of narrowing down the relay apparatuses 30.

Supplementation of First Embodiment

It is noted that as the conference system, the example of the conference between places distant from each other has been described. However, the conferences include not only one between distant places but also one between close places such as those in meeting rooms in one building, one between places in one room where a natural voice hardly reaches therebetween, and so forth. That is, the conference means a conference to be carried out using conference apparatuses without being carried out directly face to face. Further, the conferences include not only a case of three or more persons but also a case between one person and another person (total two persons).

Each of the communication management system 50 and the program providing system 90 according to the first embodiment may be realized by a single computer, or may be realized by plural computers where the respective functional parts (or functions) are divided and are arbitrarily allocated to the plural computers. Further, in a case where the program providing system 90 is realized by a single computer, a program to be transmitted by the program providing system 90 may be transmitted as having been divided into plural modules, or may be transmitted as not having been divided into plural modules. Further, in a case where the program providing system 90 is realized by plural computers, divided plural modules may be transmitted by the plural computers, respectively.

Further, recording media such as CD-ROMs storing the program for the communication terminal, the program for the relay apparatus and the program for communication management, the HD 204 storing these programs, and the program providing system 90 including the HD 204, are used in a case where the program for the communication terminal, the program for the relay apparatus and the program for communication management are, as program products, provided to users or such in the home country or abroad.

Further, in the above-mentioned first embodiment, the quality of the image data is managed in particular using the resolution of the image of the image data as one example of quality of the image of the image data relayed by the relay apparatus 30, using the change quality management table shown in FIG. 7 and the quality management table shown in FIG. 15. However, the quality of the data is not limited thereto, and as other examples of the quality of the data, the data may be managed in particular using depth (for example, color depth) of the image quality of the image data, the sampling frequency in the voice data, the bit length in the voice data, or such. Further, the voice data may be transmitted as having been divided into three resolutions (i.e., high resolution, medium resolution and low resolution).

Further, in FIGS. 8, 10 and 12, the reception dates and times are managed. However, it is not necessary to be limited thereto, and it may be sufficient to manage at least the reception times from among the reception dates and times.

Further, in the above-mentioned embodiments, the IP addresses of the relay apparatuses in FIG. 8 and the IP addresses of the communication terminals in FIG. 10 are managed. However, it is not necessary to be limited thereto, and as long as relay apparatus identification information for identifying the relay apparatus 30 in the communication network 2 and terminal identification information for identifying the communication terminal 10 in the communication network 2 are used, a FQDN (Fully Qualified Domain Name) thereof may be managed. In this case, the IP address corresponding to the FQDN will be obtained from a well-known DNS (Domain Name System) server. It is noted that "relay apparatus identification information for identifying the relay apparatus 30 in the communication network 2" may also be expressed as "relay apparatus connecting destination information indicating a connecting destination for the relay apparatus 30 in the communication network 2" or "relay apparatus destination information indicating a destination for the relay apparatus 30 in the communication network 2". Similarly, "terminal identification information for identifying the communication terminal 10 in the communication network 2" may also be expressed as "terminal connecting destination information indicating a connecting destination for the communication terminal 10 in the communication network 2" or "terminal destination information indicating a destination for the communication terminal 10 in the communication network 2".

Further, in the above-mentioned first embodiment, as an example of the communication system 1, the case of the TV conference system has been described. However, it is not necessary to be limited thereto, and an example of the communication system 1 may be a telephone system for IP (Internet Protocol) telephones, Internet telephones, or such. Further, the transmission system 1 may be an automotive navigation system. In this case, one of the communication terminals 10 corresponds to an automotive navigation apparatus mounted in one automobile, and another of the communication terminals 10 corresponds to a management terminal or a management server in a management center which manages the automotive navigation system, or an automotive navigation apparatus mounted in another automobile. Further, the communication system 1 may be a communication system for cellular phones. In this case, the terminals correspond to cellular phones.

Further, although the case has been described where the external input apparatus 40 displays the data from the display device 400, the display device 400 may be an apparatus separate from the external input apparatus 40, or may be provided to the external input apparatus 40.

Second Embodiment

With reference to FIGS. 34 through 51, a second embodiment of the present invention will be described.

Overall Configuration of Second Embodiment

Figure 34:
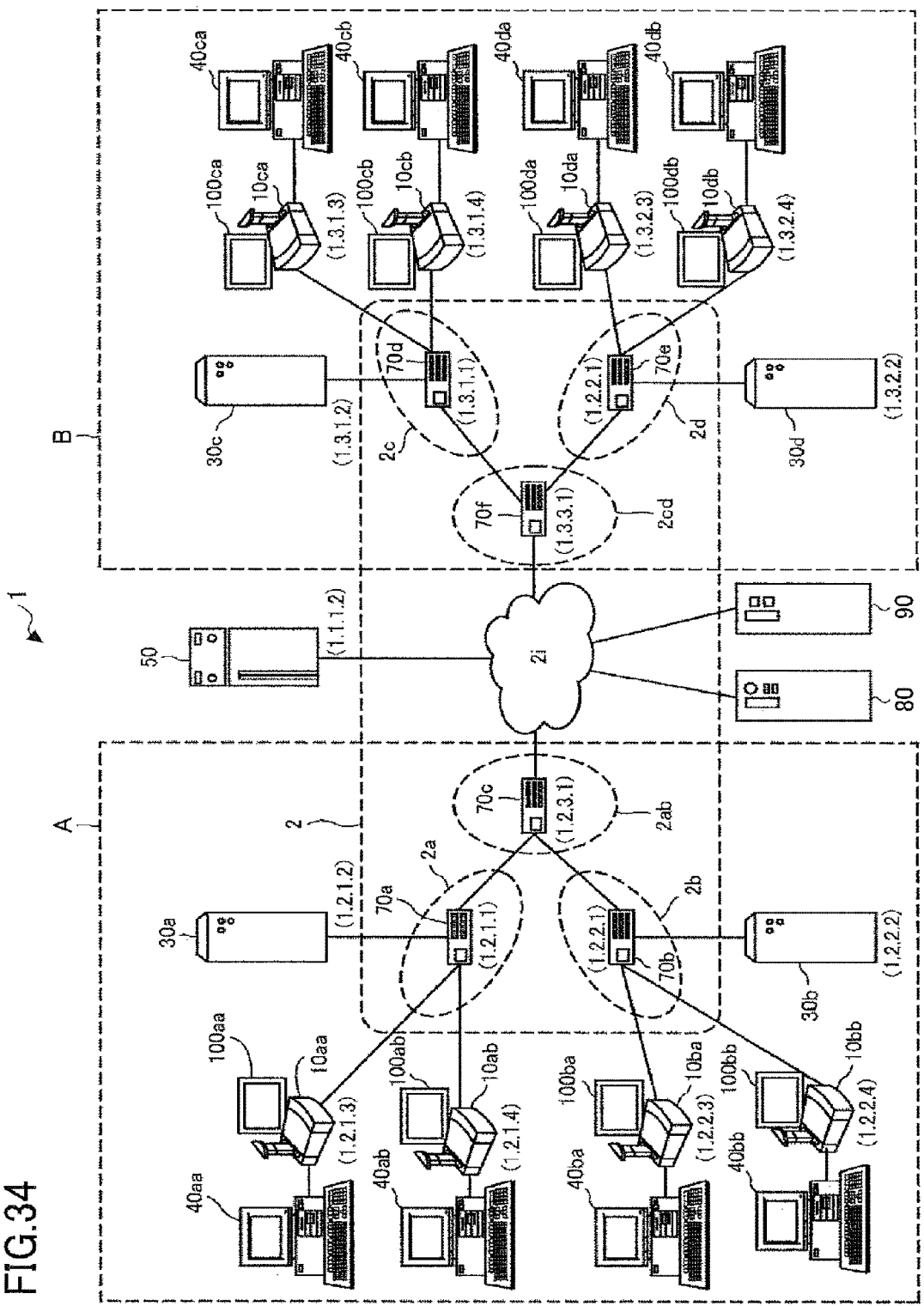
FIG. 34 shows a general configuration of an example of a remote communication system according to the second embodiment of the present invention.

FIG. 34 is a general configuration of a remote communication system 1 used for a TV conference according to the second embodiment.

The remote communication system 1 according to the second embodiment is approximately the same as the communication system 1 according to the first embodiment shown in FIG. 1 and described above, and therefore, the same reference numerals are given to the same or corresponding terminals, apparatuses, systems, routers and so forth, and duplicate description will be omitted.

According to the second embodiment, the communication terminals 10 in the first embodiment are replaced by remote communication terminals 10, respectively, the communication management system 50 in the first embodiment is replaced by a remote communication management system 50, and the communication network 2 in the first embodiment is replaced by a remote communication network 2.

However, the remote communication terminals 10 according to the second embodiment are approximately the same as the communication terminals 10 according to the first embodiment, and the remote communication management system 50 according to the second embodiment is approximately the same as the communication management system 50 according to the first embodiment. The remote communication network 2 according to the second embodiment may be the same as the communication network 2 according to the first embodiment. Therefore, and duplicate description will be omitted.

It is noted that the arrangement information providing system 80 may be omitted from the remote communication system 1 when the remote communication terminals 10 previously have the arrangement information.

The external input apparatus 40 transmits the display data, to be used for generating a screen page the same as that displayed on the display device 400 of the external input apparatus 40, to the remote communication terminal 10. The display data is, for example, image data created in a form of JPEG (Joint Photographic Experts Group), Bitmap or such, or rendering commands created in a form of GDI (Graphics Device Interface). Further, on the entirety or a part of the screen page corresponding to the display data, material data which may be used by using document composition software, spreadsheet software, presentation software (i.e., software used for presentation), or such, may be displayed.

Hardware Configuration of Second Embodiment

Next, a hardware configuration of the second embodiment will be described.

Figure 35:
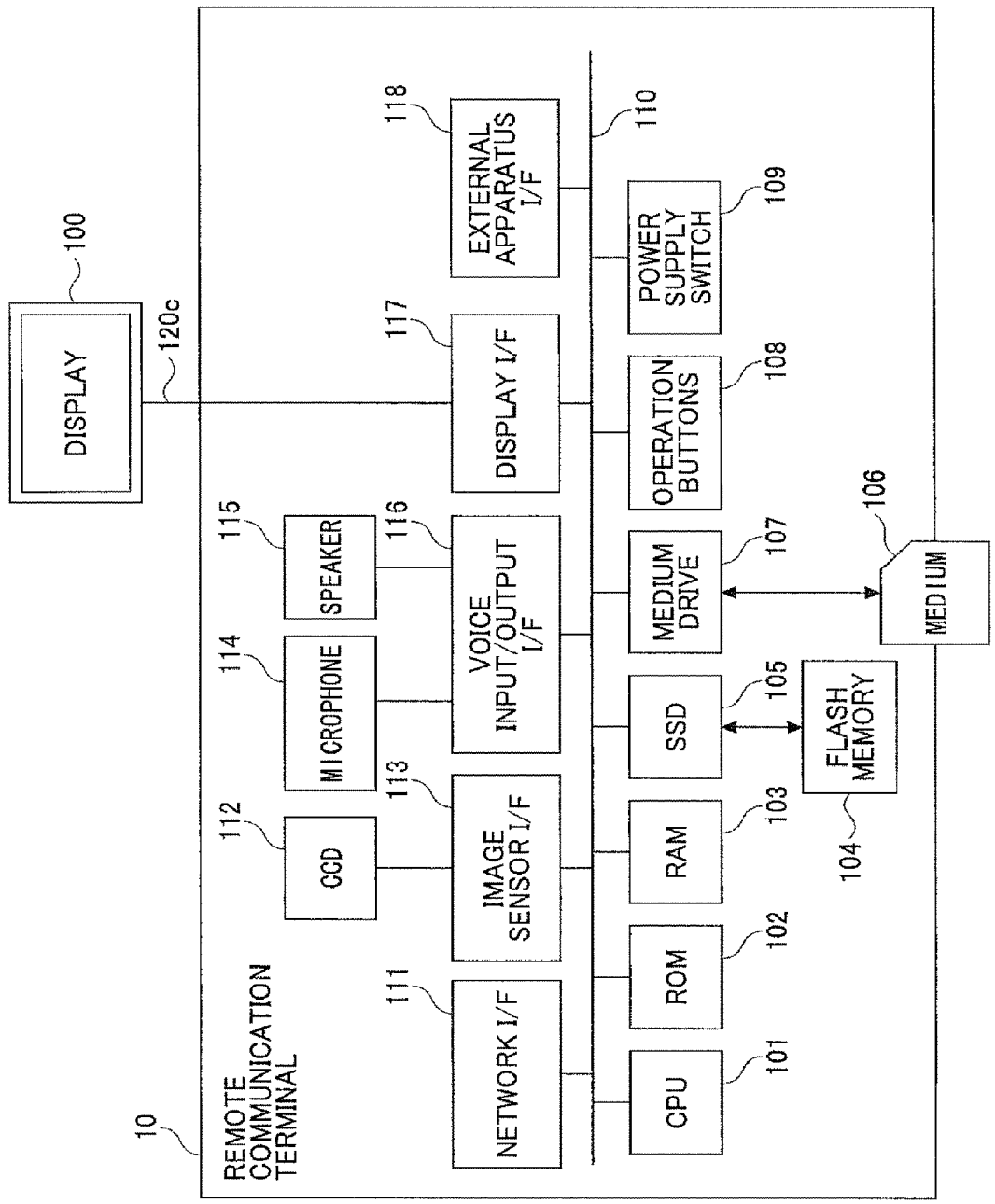
FIG. 35 shows a hardware configuration of an example of the remote communication terminal according to the second embodiment.

FIG. 35 shows a hardware configuration of the remote communication terminal 10 according to the second embodiment.

The hardware configuration of the remote communication terminal 10 according to the second embodiment is approximately the same as the hardware configuration of the communication terminal 10 according to the first embodiment described above with reference to FIG. 3, and therefore, the same reference numerals are given to the same or corresponding parts, and duplicate description will be omitted.

In the remote communication terminal 10 shown in FIG. 35, a CCD (Charge Coupled Device) 112 is shown as a specific example of the camera 112 shown in FIG. 3. Further, in the ROM 102, a program for the remote communication terminal 10 is stored.

The program for the remote communication terminal 10 may be recorded in a form of a file in an installable or executable type in a computer readable information recording medium such as the above-mentioned recording medium 106, and may then be circulated.

The CCD 112 is a solid state image sensing device which converts light into electric charges, and obtaining an electronic signal from an image of an object. As long as a device is capable of photographing an object, it is not necessary to be limited to the CCD, and a CMOS (Complementary Metal Oxide Semiconductor) device or such may be used instead.

Figure 36:
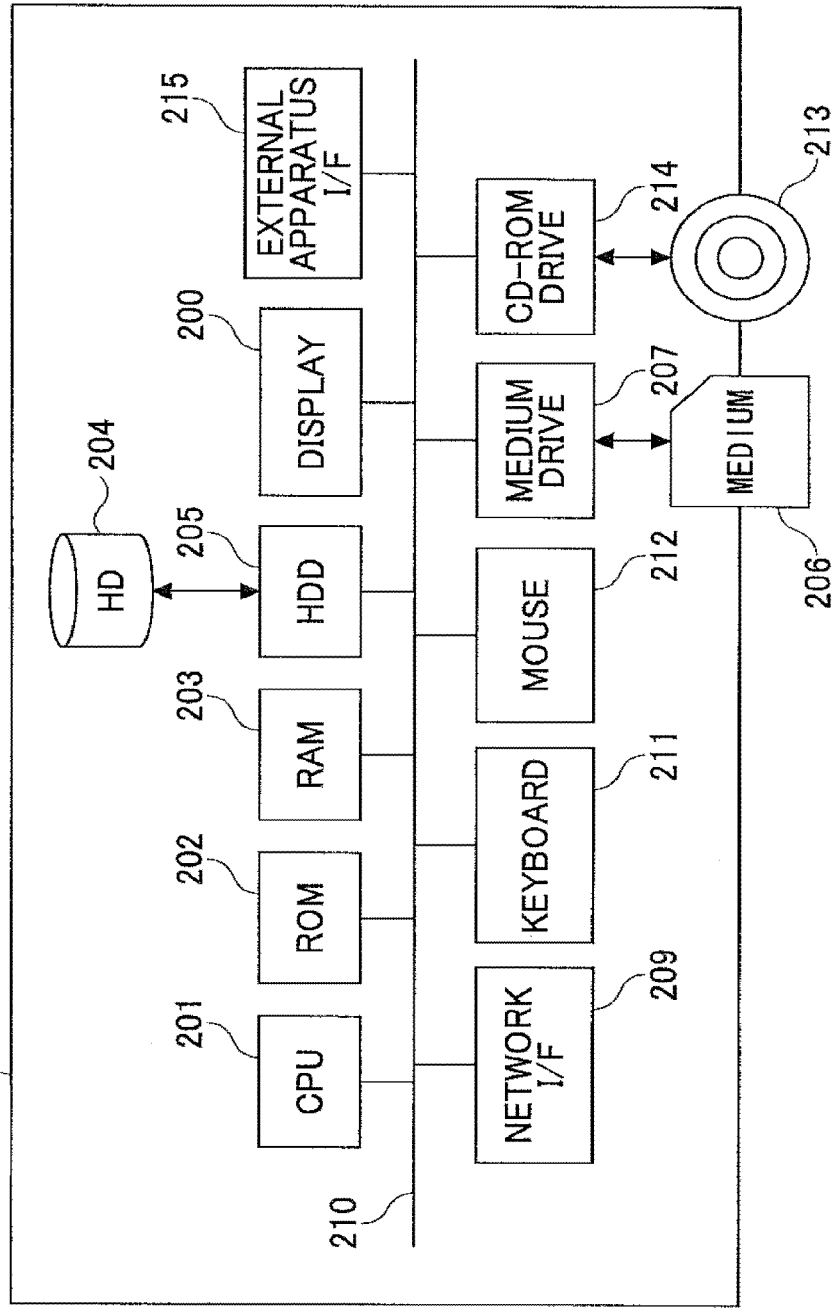
FIG. 36 shows a hardware configuration of an example of each of a remote communication management system, a relay apparatus and an external input apparatus according to the second embodiment.

FIG. 36 shows a hardware configuration of the remote communication management system 50 according to the second embodiment.

The hardware configuration of the remote communication management system 50 according to the second embodiment may be the same as the hardware configuration of the communication management system 50 according to the first embodiment described above with reference to FIG. 4, and duplicate descriptions will be omitted. It is noted that in the ROM 202, a program for remote communication management (i.e., for the remote communication management system 50) is stored.

It is noted that the program for remote communication management may be recorded in a computer readable recording medium such as the above-mentioned recording medium 206, CD-ROM 213 or such in a form of a file of an installable type or an executable type, and then be circulated.

Further, the relay apparatus 30 has the same hardware configuration as that of the remote communication management apparatus 50, and therefore, the description thereof will be omitted. In the ROM 202 of the relay apparatus 30, a program for the relay apparatus for controlling the relay apparatus 30 is recorded. Also in this case, the program for the relay apparatus may be recorded in a computer readable recording medium such as the above-mentioned recording medium 206, CD-ROM 213 or such in a form of a file of an installable type or an executable type, and be circulated.

The external input apparatus 40 has the same hardware configuration as that of the remote communication management apparatus 50, and therefore, the description thereof will be omitted. However, in the ROM 202 of the external input apparatus 40, a program for material management for controlling the external input apparatus 40 is recorded. Also in this case, the program for material management may be recorded in a computer readable recording medium such as the recording medium 206 in a form of a file of an installable type or an executable type, and be circulated.

Further, each of the arrangement information providing system 80 and the program providing system 90 has the same hardware configuration as that of the communication management apparatus 50, and therefore, the description thereof will be omitted. However, in the ROM 202 of the arrangement information providing system 80, a program for providing arrangement information is recorded. Similarly, in the ROM 202 of the program providing system 90, a program for providing programs is recorded. Also in this case, each of these programs for providing arrangement information and providing programs may be recorded in computer readable recording medium such as the recording medium 206 or the CD-ROM 213 in a form of a file of an installable type or an executable type, and be circulated.

It is noted that each of the above-mentioned programs may be recorded in a computer readable recording medium such as a CD-R (Compact Disc Recordable), a DVD (Digital Versatile Disk) or a Blu-ray Disc as another example of the above-mentioned detachable recording medium, and then be provided.

Functional Configuration of Second Embodiment

Figure 37A:
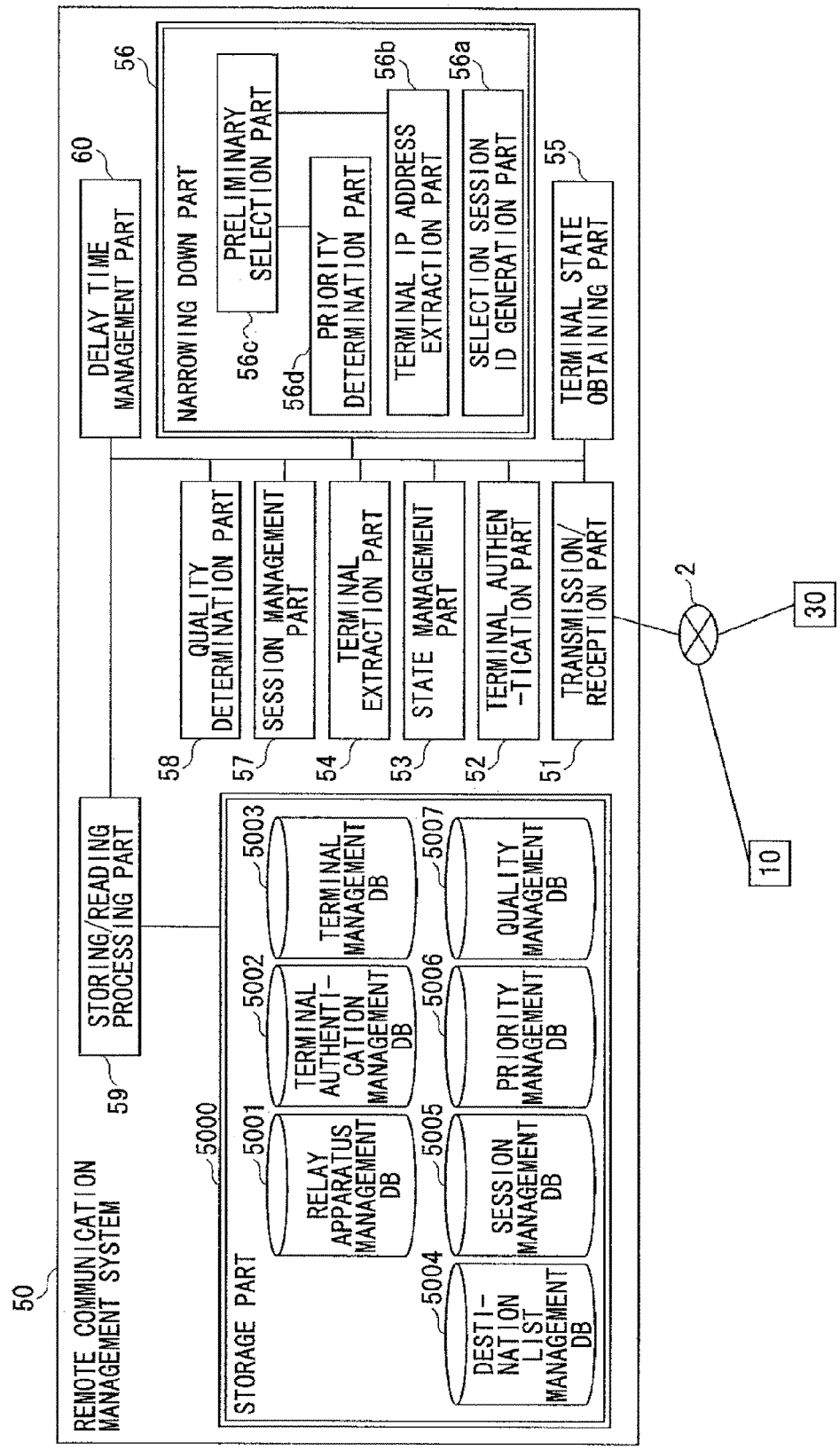
FIGS. 37A and 37B show a block diagram of an example of the terminals, the apparatuses and the system included in the remote communication system according to the second embodiment.
Figure 37B:
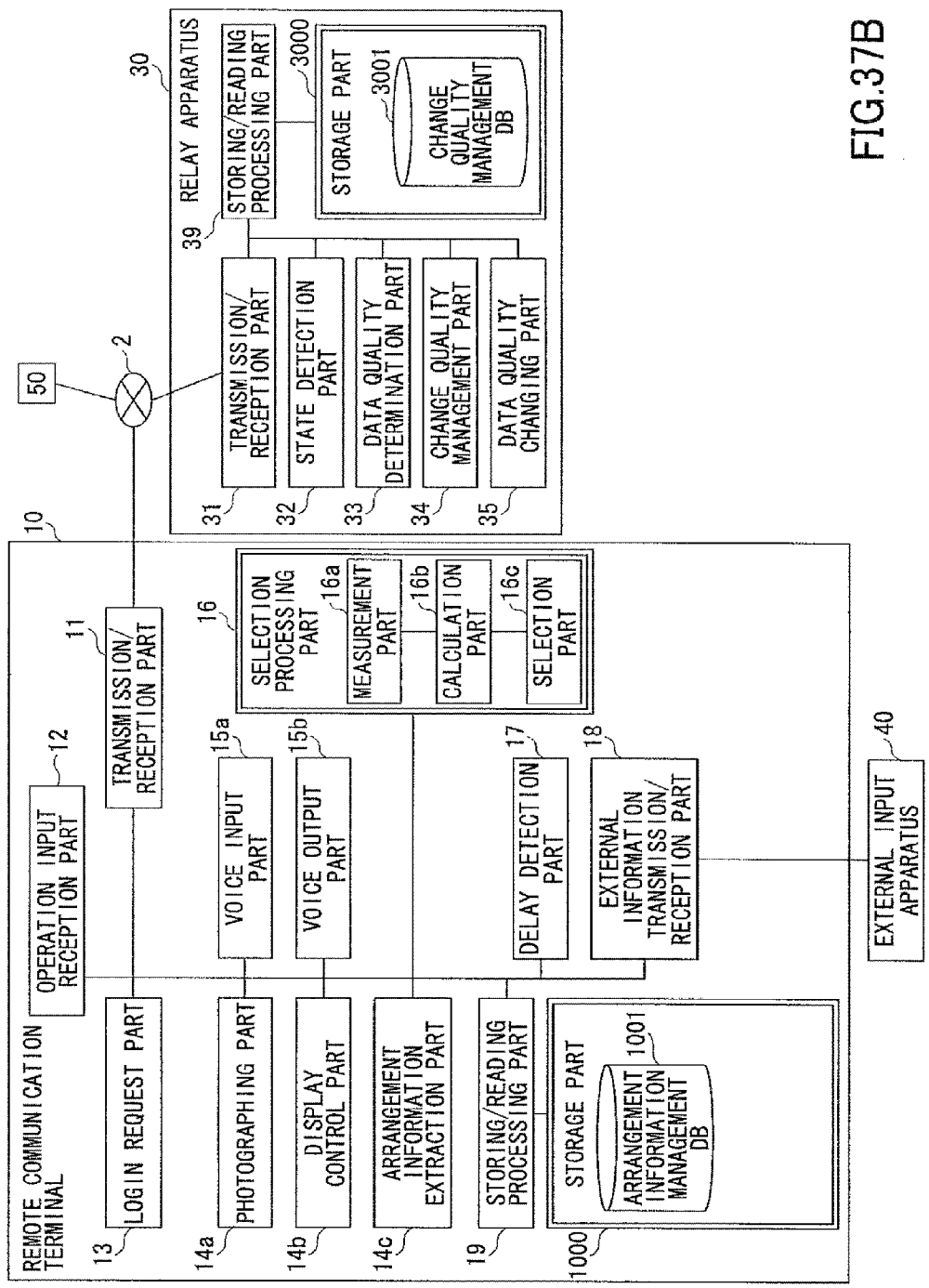
Figure 47:
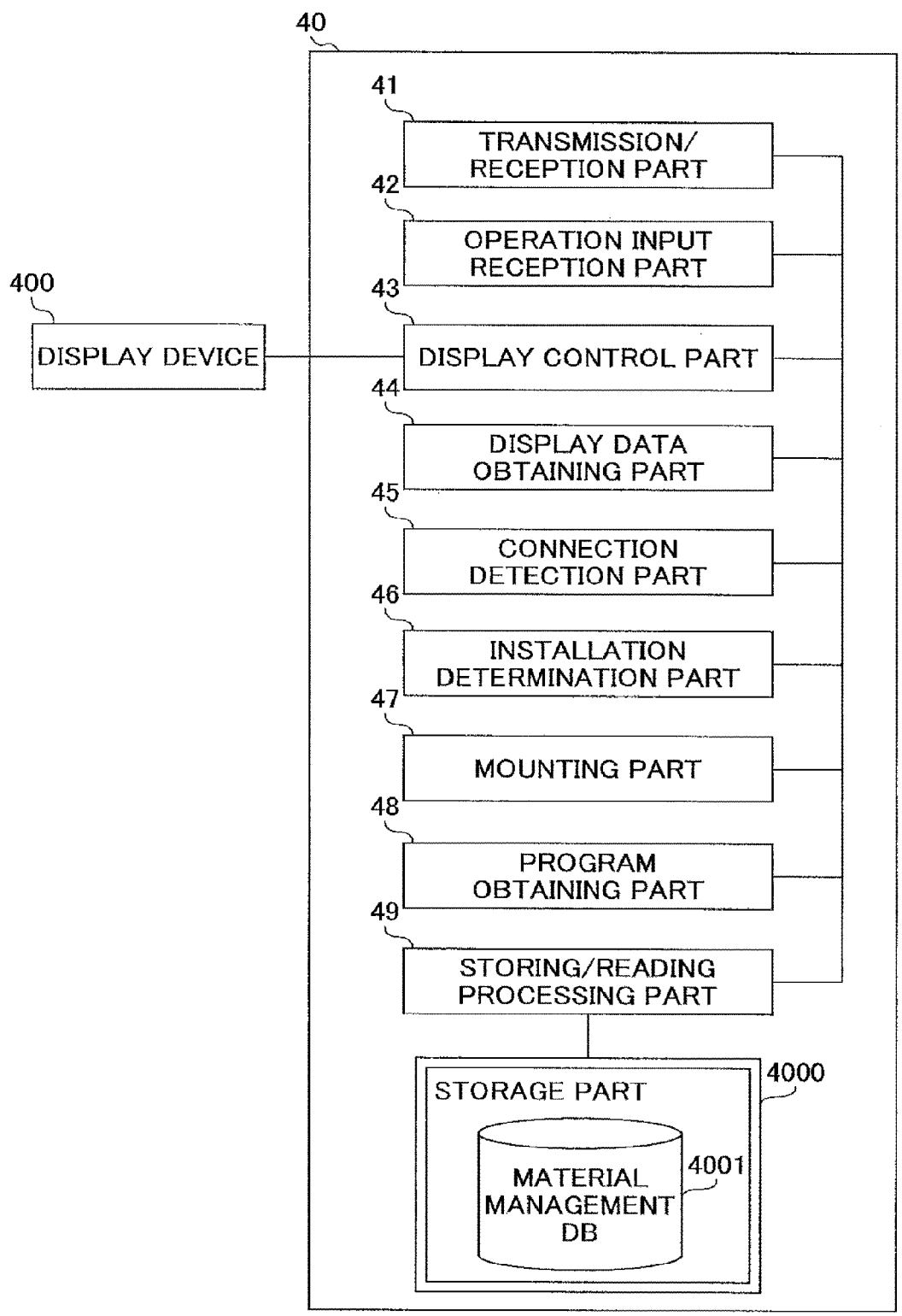
FIG. 47 shows a functional block diagram of an external input apparatus according to the second embodiment.

Next, a functional configuration of the second embodiment will be described. FIGS. 37A and 37B show a functional block diagram of each of the remote communication terminals 10, each of the relay apparatuses 30 and the remote communication management system 50 included in the remote communication system 1 according to the second embodiment. In FIGS. 37A and 37B, the remote communication terminal 10, the relay apparatus 30 and the remote communication management system 50 are connected together by the remote communication network 2 in such a manner that data communication can be mutually carried out. The external input apparatus 40 is connected with the remote communication terminal 10 in such a manner that data communication can be mutually carried out. FIGS. 6A, 6B and 6C, described above for the first embodiment, also illustrate image quality according to the second embodiment. FIG. 7, described above for the first embodiment, also shows a concept of an example of a change quality management table according to the second embodiment. FIG. 8, described above for the first embodiment, also shows a concept of an example of a relay apparatus management table according to the second embodiment. FIG. 9, described above for the first embodiment, also shows a concept of an example of a terminal authentication management table according to the second embodiment. FIG. 10, described above for the first embodiment, also shows a concept of an example of a terminal management table according to the second embodiment. FIG. 11, described above for the first embodiment, also shows a concept of an example of a destination list management table according to the second embodiment. FIG. 12, described above for the first embodiment, also shows a concept of an example of a session management table according to the second embodiment. FIG. 13, described above for the first embodiment, also shows a concept of an example of an address priority management table according to the second embodiment. FIG. 14, described above for the first embodiment, also shows a concept of an example of a transmission rate priority management table according to the second embodiment. FIG. 15, described above for the first embodiment, also shows a concept of an example of a quality management table according to the second embodiment. FIG. 47 shows a functional block diagram of the external input apparatus 40 included in the remote communication system 1 according to the second embodiment. FIG. 28, described above for the first embodiment, also shows a concept of a material management table according to the second embodiment.

<Functional Configuration of Remote Communication Terminal>

As shown in FIG. 37B, the remote communication terminal 10 includes a transmission/reception part 11, an operation input reception part 12, a login request part 13, a photographing part 14a, a display control part 14b, an arrangement information extraction part (i.e., arrangement information selection part) 14c, a voice input part 15a, a voice output part 15b, a finally narrowing down part (or selection processing part) 16, a delay detection part 17, an external information transmission/reception part 18, and a storing/reading processing part 19. The respective parts correspond to functions or functioning parts realized as a result of the respective elements/components shown in FIG. 35 operating according to instructions given by the CPU 101 that operates according to the program for the communication terminal stored in the ROM 102. Further, the communication terminal 10 has a storage part 1000 built by any one of the ROM 102, RAM 103 and the SSD 105 shown in FIG. 35.

(Arrangement Information Management Table)

Figure 46A:
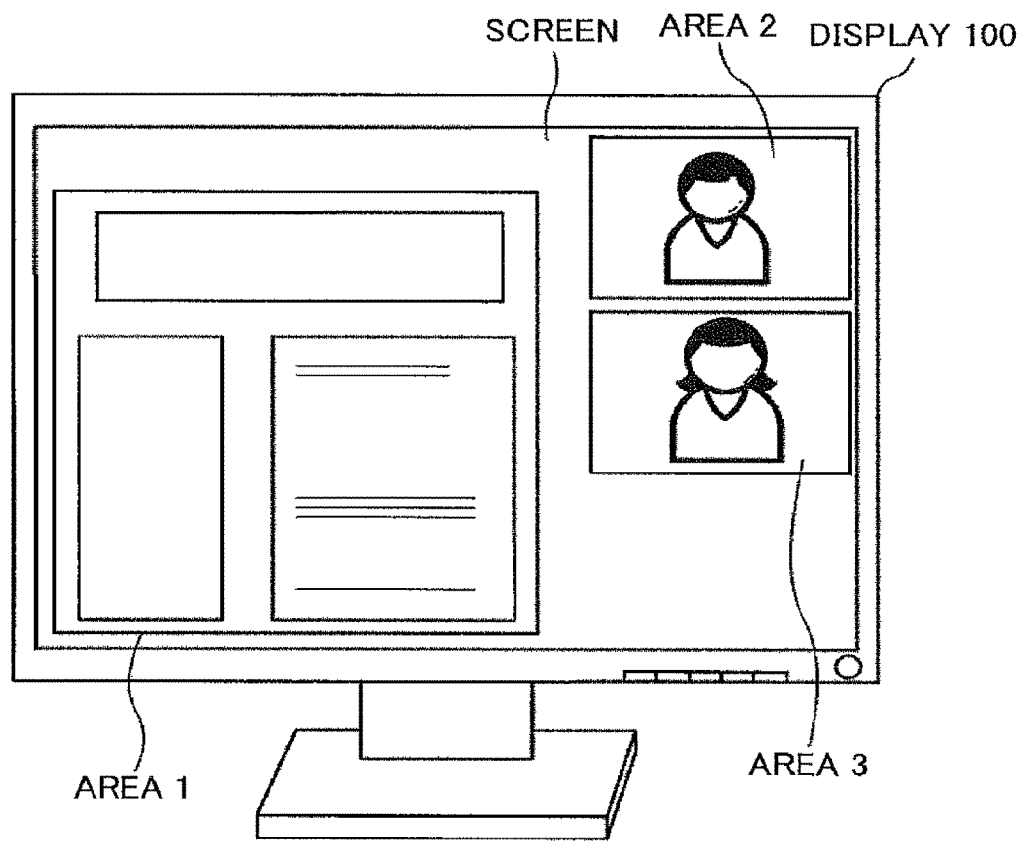
FIGS. 46A and 46B show examples of screen pages in which material data and image data are displayed based on an arrangement drawing as arrangement information stored in the storage part according to the second embodiment.
Figure 46B:
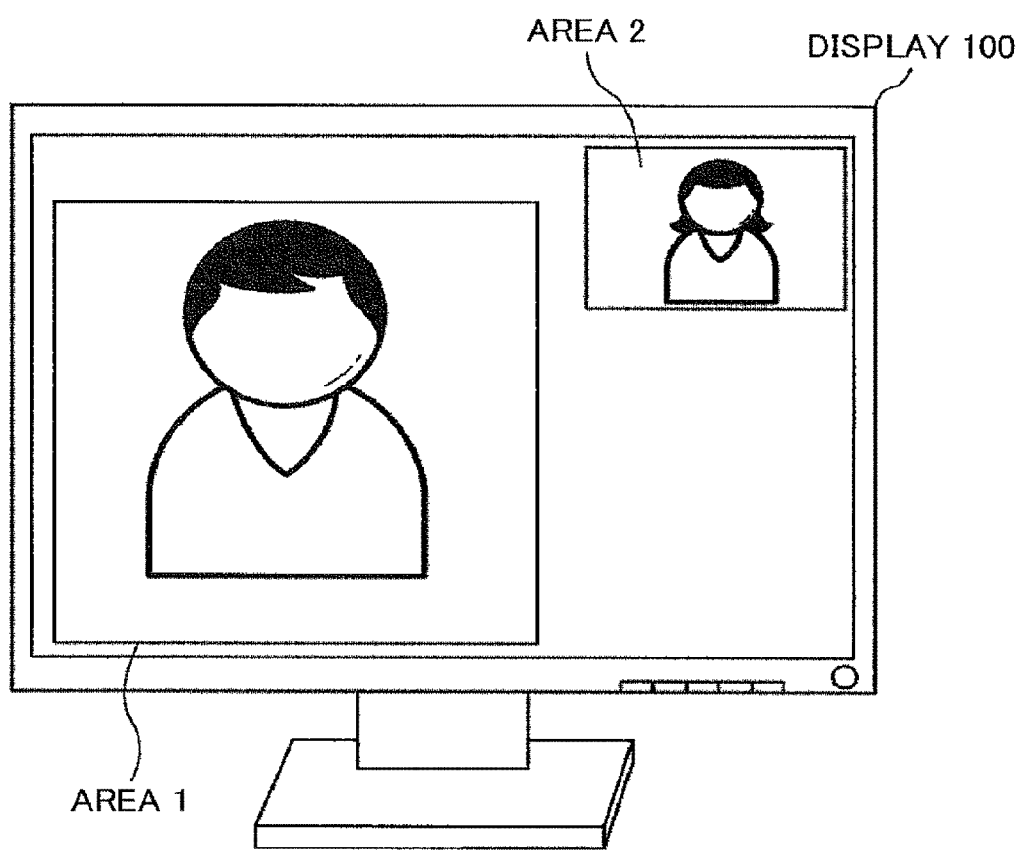

In the storage part 1000, an arrangement information management DB (DataBase) 1001 including an arrangement information management table such as that shown in FIG. 45 is stored. In the arrangement information management table, in association with reception information indicating whether the current state is one where the remote communication terminal 10 can receive display data or whether the remote communication terminal 10 has received display data, arrangement information that indicates data (information) to be displayed at each area on a screen is stored. Whether the current state is one where the remote communication terminal 10 can receive display data is determined by, for example, whether the remote communication terminal 10 is connected with the external input apparatus 40 by a USB cable or such. In a case where the remote communication terminal 10 is connected with the external input apparatus 40, the current state is one where the remote communication terminal 10 can receive display data, and thus, the reception information may indicate "received". In a case where the remote communication terminal 10 is not connected with the external input apparatus 40, the current state is one where the remote communication terminal 10 cannot receive display data, and thus, the reception information may indicate "not received". As shown in the example of FIG. 45, the arrangement information management table shows that in a case where the reception information indicates "received" indicating that display data has been received, the received display data is displayed at an "area 1"; image data obtained of photographing by the photographing part 14*a* of the remote communication terminal 10*aa* which is a terminal at the other end of the communication is displayed at an "area 2"; and image data obtained from photographing by the photographing part 14*a* of the communication terminal 10*db* which is the own terminal is displayed at an "area 3". Further, the arrangement information management table shows that in a case where the reception information indicates "not received" indicating that display data has not been received, image data obtained of photographing by the photographing part 14*a* of the communication terminal 10*aa* which is a terminal at the other end of the communication is displayed at the "area 1"; image data obtained from photographing by the photographing part 14*a* of the communication terminal 10*db* which is the own terminal is displayed at the "area 2"; and nothing is displayed at the "area 3". The areas 1, 2 and 3 are determined by sizes and positions at the screen, respectively. Examples shown in FIGS. 46A and 46B show examples where based on arrangement drawings that are the arrangement information stored in the arrangement information management DB 1001, the material data (display data) and/or the image data are displayed. FIG. 46A shows a screen page displayed based on the arrangement drawing 1 in the case where the reception information indicates "received". FIG. 46B shows a screen page displayed based on the arrangement drawing 2 in the case where the reception information indicates "not received". As shown in FIGS. 46A and 46B, the area at the left side is referred to as the area 1, the area at the top right is referred to as the area 2, and the area at the middle right is referred to as the area 3.

The display data means information corresponding to the screen page where material data is being displayed on the display device 400 of the external input apparatus 40 connected to the remote communication terminal 10. It is noted that the material data (or display data) means data created using document composition software, spreadsheet software or such, and is distinguished from image data obtained from photographing by the camera CCD shown in FIG. 35.

(Detailed Functional Configuration of Remote Communication Terminal)

Next, the respective parts of the remote communication terminal 10 will be described.

The transmission/reception part 11, the operation input reception part 12 and the login request part 13 may be the same as those according to the first embodiment described above, and duplicate description will be omitted.

The photographing part 14*a* is realized by the CCD 112 and the imaging device I/F 113 shown in FIG. 35, photographs an object, and outputs image data thus obtained from the photographing.

The display control part 14*b* may be the same as that according to the first embodiment described above, and duplicate description will be omitted.

The arrangement information extraction part 14*c* extracts the arrangement information indicating an arrangement in a screen page to be displayed on the display device 100 by the display control part 11, based on the reception information indicating whether the transmission/reception part 11 has received the display data.

The voice input part 15*a* and voice output part 15*b* may be the same as those according to the first embodiment described above, and duplicate description will be omitted.

The finally narrowing down part (or selection processing part) 16 may be the same as that according to the first embodiment described above, and duplicate description will be omitted.

The delay detection part 17, the external information transmission/reception part 18 and the storing/reading processing part 19 may be the same as those according to the first embodiment described above, and duplicate description will be omitted.

It is noted that the terminal ID and a relay apparatus ID described later according to the second embodiment indicate identification information such as a language, a character/letter, a sign or various sorts of marks used for uniquely identifying the remote communication terminal 10 and the relay apparatus 30, respectively. Further, each of the terminal ID and the relay apparatus ID may be identification information that is a combination of at least two of the above-mentioned language, character/letter, sign and various sorts of marks. Further, hereinafter, the remote communication terminal 10 as a request source which requests a start of a TV conference will be referred to as a "request source terminal 10A" and the remote communication terminal 10 as a destination as a request destination will be referred to as a "destination terminal 10B".

<Functional Configuration of Relay Apparatus>

Functions and respective parts of the relay apparatus 30 will now be described. As shown in FIG. 37B, the relay apparatus 30 includes a transmission/reception part 31, a state detection part 32, a data quality determination part 33, a change quality management part 34, a data quality changing part 35 and a storing/reading management part 39. These parts correspond to functions or functioning parts realized as a result of the respective elements/components shown in FIG. 36 operating according to instructions given by the CPU 201 that operates according to the program stored in the ROM 202. Further, the relay apparatus 30 has a storage part 3000 (storing a change quality management DB 3001) comprising the HDD 205 shown in FIG. 36.

The relay apparatus 30 shown in FIG. 37B may be the same as that according to the first embodiment described above with reference to FIG. 5B, and duplicate description will be omitted.

<Functional Configuration of External Input Apparatus>

The external input apparatus 40 includes, as shown in FIG. 47, a transmission/reception part 41, an operation input reception part 42, a display control part 43, a display data obtaining part 44, a connection detection part 45, an installation determination part 46, a mounting part 47, a program obtaining part 48 and a storing/reading processing part 49. These parts are functions or functional parts shown in FIG. 36 realized as a result of the CPU 201 operating according to the program (i.e., the program for material management) stored in the ROM 202. Further, the external input apparatus 40 has a storage part 4000 comprising the HDD 205 shown in FIG. 36.

(Material Management Table)

In the storage part 4000, a material management DB (DataBase) 4001 including a material management table such as that shown in FIG. 28, described above for the first embodiment, is stored. The material management DB (DataBase) 4001 may be the same as that of the first embodiment described above with reference to FIG. 28, and duplicate description will be omitted.

<Detailed Functional Configuration of External Input Apparatus>

Next, each part of the external input apparatus 40 will be described in detail.

The transmission/reception part 41, operation input reception part 42, display control part 43 and display data obtaining part 44 may be the same as those of the first embodiment described above with reference to FIG. 27, and duplicate description will be omitted.

The connection detection part 45 detects that the external input apparatus 40 has been connected with another apparatus by a USB cable or such. The installation determination part 46 determines whether the display data obtaining part 44 has been installed in the external input apparatus 40. The mounting part 47 mounts a storage part of the other apparatus, connected with the external input apparatus 40 by the USB cable or such, to the external input apparatus 40. The program obtaining part 48 obtains the display data obtaining part 44 from the thus-mounted storage part of the other apparatus and installs the obtained display data obtaining part 44 in the external input apparatus 40.

The storing/reading processing part 49 may be the same as that of the first embodiment described above with reference to FIG. 27, and duplicate description will be omitted.

<Functional Configuration of Remote Communication Management System>

Next, functions or functional parts of the remote communication management system 50 will be described. As shown in FIG. 37A, the remote communication management system 50 includes a transmission/reception part 51, a terminal authentication part 52, a state management part 53, a terminal extraction part 54, a terminal state obtaining part 55, a narrowing down part 56, a session management part 57, a quality determination part 58, a storing/reading processing part 59 and a delay time management part 60. These parts correspond to functions or functioning parts realized as a result of the respective elements/components shown in FIG. 36 operating according to instructions given by the CPU 201 that operates according to the program for remote communication management stored in the ROM 202. Further, the remote communication management system 50 has a storage part 5000 (storing a relay apparatus management DB 5001, a terminal authentication management DB 5002, a terminal management DB 5003, a destination list management DB 5004, a session management DB 5005, a priority management DB 5006 and a quality management DB 5007) comprising the HD 204 shown in FIG. 36.

The remote communication management system 50 shown in FIG. 37A may be the same as that according to the first embodiment described above with reference to FIG. 5A, and duplicate description will be omitted.

Processing/Operations of Second Embodiment

Thus, the configuration and functions or functional parts of the remote communication system according to the second embodiment has been described. Next, with reference to FIGS. 38 through 43, and FIGS. 48 through 51, a processing method in the remote communication system 1 according to the second embodiment will be described.

FIG. 38 is a sequence diagram showing a process of managing the information indicating the state of each of the relay apparatuses 30. The process of managing the information indicating the states of the relay apparatuses 30, transmitted from the corresponding relay apparatuses 30 to the remote communication management system 50, respectively, shown in FIG. 38, may be the same as that of the first embodiment described above with reference to FIG. 16, and the same step numbers are given to the same steps, and duplicate description will be omitted.

FIG. 39 is a sequence diagram showing a process of a preparation stage for starting remote communication between plural remote communication terminals 10. The process of a preparation stage for starting remote communication between the remote communication terminals 10aa and 10db shown in FIG. 39 may be the same as that of the first embodiment described above with reference to FIG. 17, and the same step numbers are given to the same steps, and duplicate description will be omitted.

Figure 40:
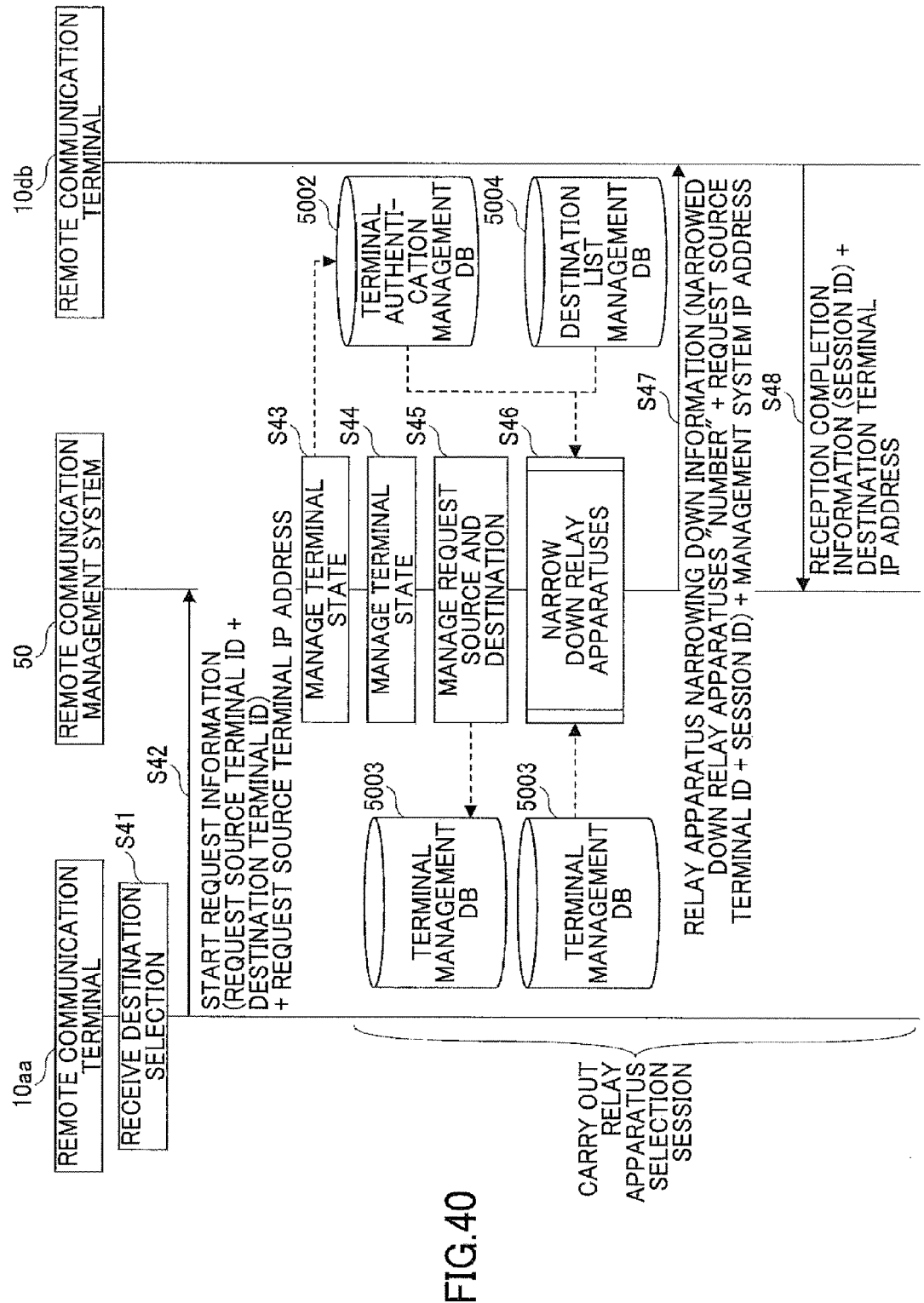
FIG. 40 shows an example of a sequence diagram of a process of narrowing down the relay apparatuses according to the second embodiment.
Figure 41:
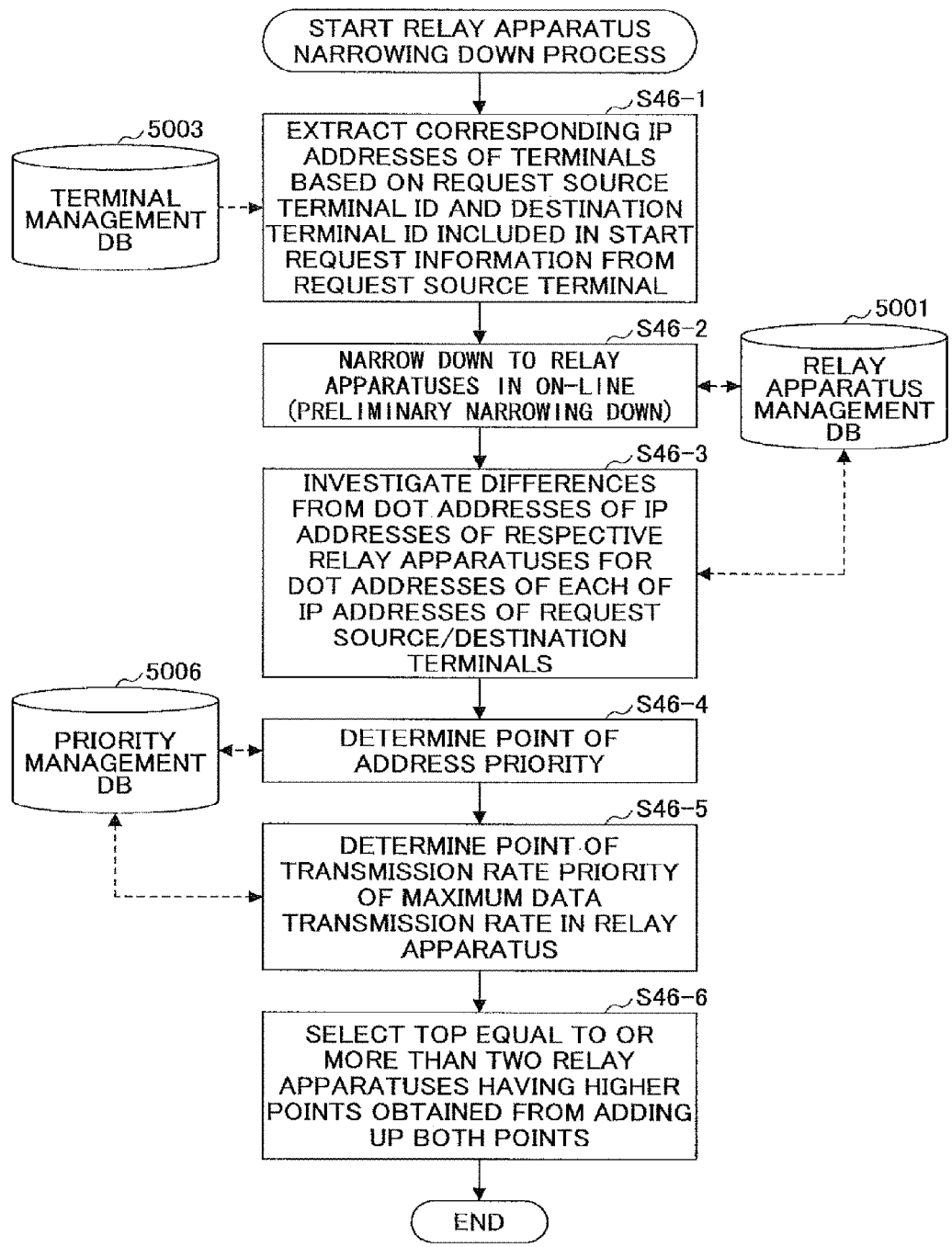
FIG. 41 shows an example of a flowchart of a process of narrowing down the relay apparatuses according to the second embodiment.

FIG. 40 is a sequence diagram showing a process of narrowing down the relay apparatuses 30. FIG. 41 is a flowchart showing the process of narrowing down the relay apparatuses 30. FIG. 20, also described above for the first embodiment, shows a state of calculation of point counts used when narrowing down the relay apparatuses 30. The process of narrowing down the relay apparatuses 30 shown in FIG. 40 may be the same as that of the first embodiment described above with reference to FIG. 18, and the same step numbers are given to the same steps, and duplicate description will be omitted. The process of step S46 shown in FIG. 41 may be the same as that of the first embodiment described above with reference to FIG. 19 and FIG. 20, and therefore, the same step numbers are given to the same steps, and duplicate description therefor will be omitted.

Figure 42:
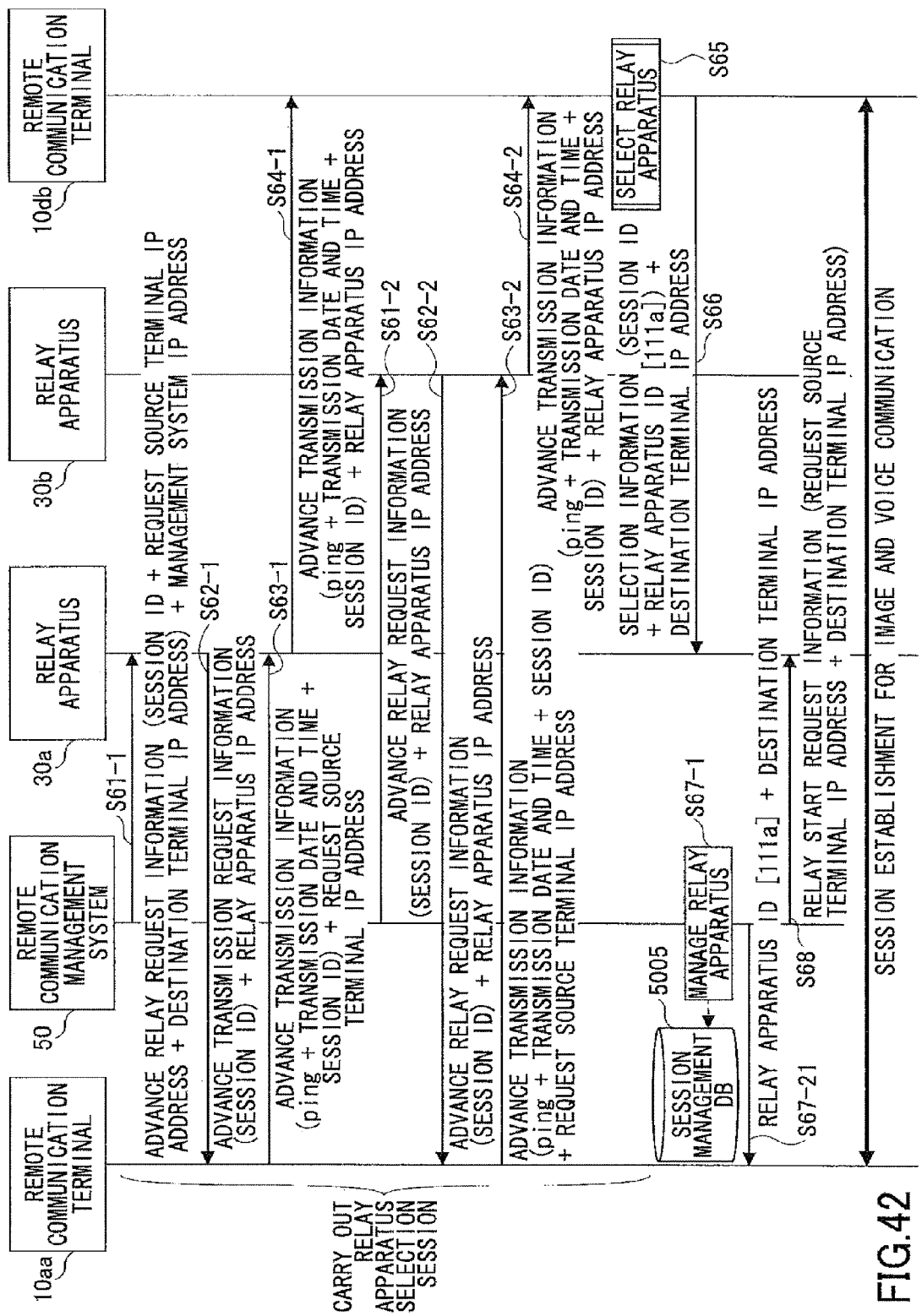
FIG. 42 shows an example of a sequence diagram of a process of selecting the relay apparatus by the remote communication terminal according to the second embodiment.
Figure 43:
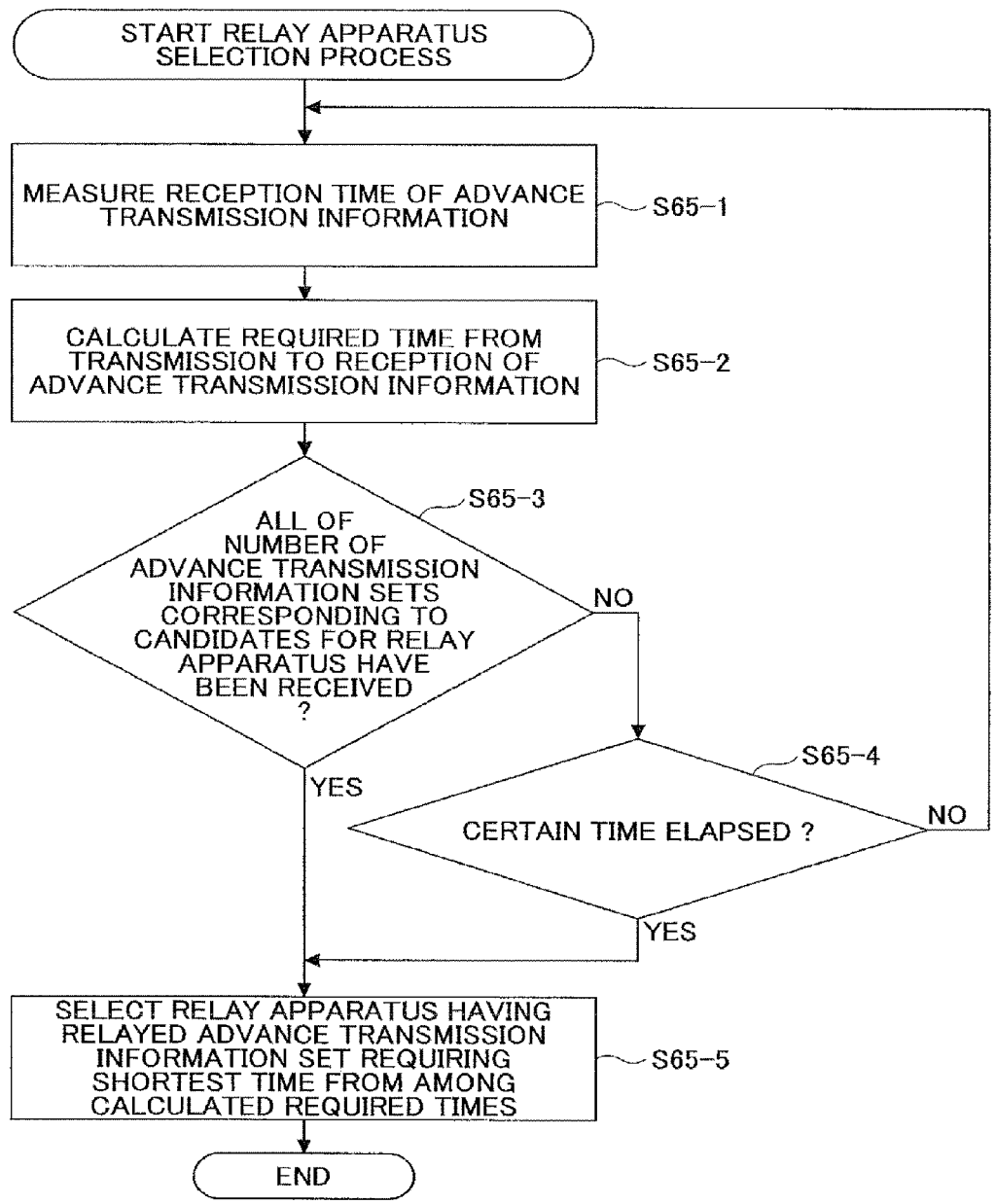
FIG. 43 shows an example of a flowchart of a process of selecting the relay apparatus by the remote communication terminal according to the second embodiment.

FIG. 42 is a sequence diagram showing the process of selecting a relay apparatus 30 by the remote communication terminal 10. FIG. 43 is a flowchart showing the process of selecting a relay apparatus 30 by the remote communication terminal 10. The process of selecting a relay apparatus 30 by the remote communication terminal 10aa (destination terminal) may be the same as that of the first embodiment described above with reference to FIG. 21, and the same step numbers are given to the same steps, and duplicate description will be omitted. The process of step S65 shown in FIG. 43 may be the same as that of the first embodiment described above with reference to FIG. 22, and the same step numbers are given to the same steps, and duplicate description will be omitted.

Figure 44:
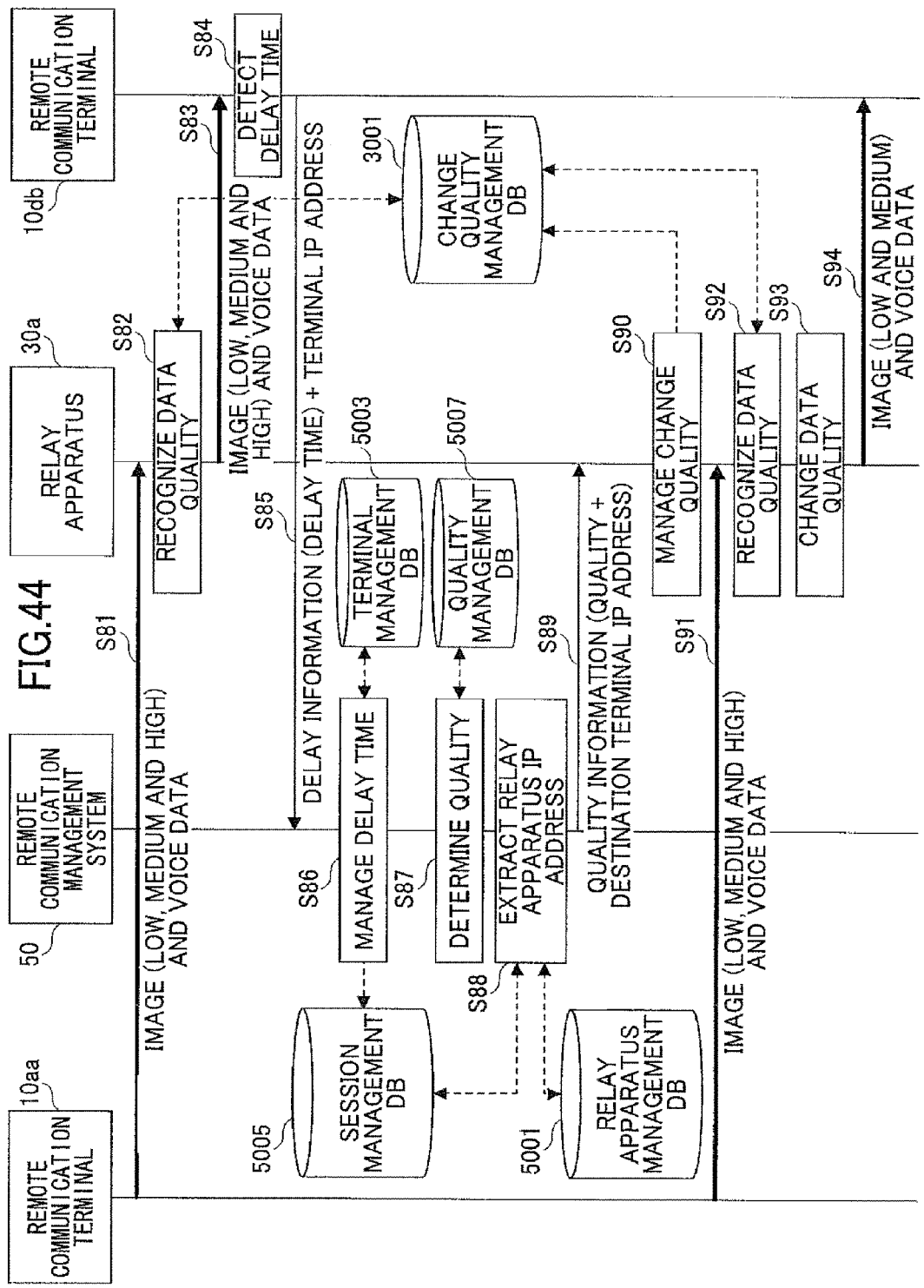
FIG. 44 shows an example of a sequence diagram of a process of transmitting image data and voice data between the remote communication terminals according to the second embodiment.

FIG. 44 is a sequence diagram showing a process of transmitting image data and voice data between the remote communication terminals 10. The process of transmitting image data and voice data between the remote communication terminals 10aa and 10db for the purpose of carrying out a TV conference may be the same as that of the first embodiment described above with reference to FIG. 23, and the same step numbers are given to the same steps, and duplicate description will be omitted.

Figure 48:
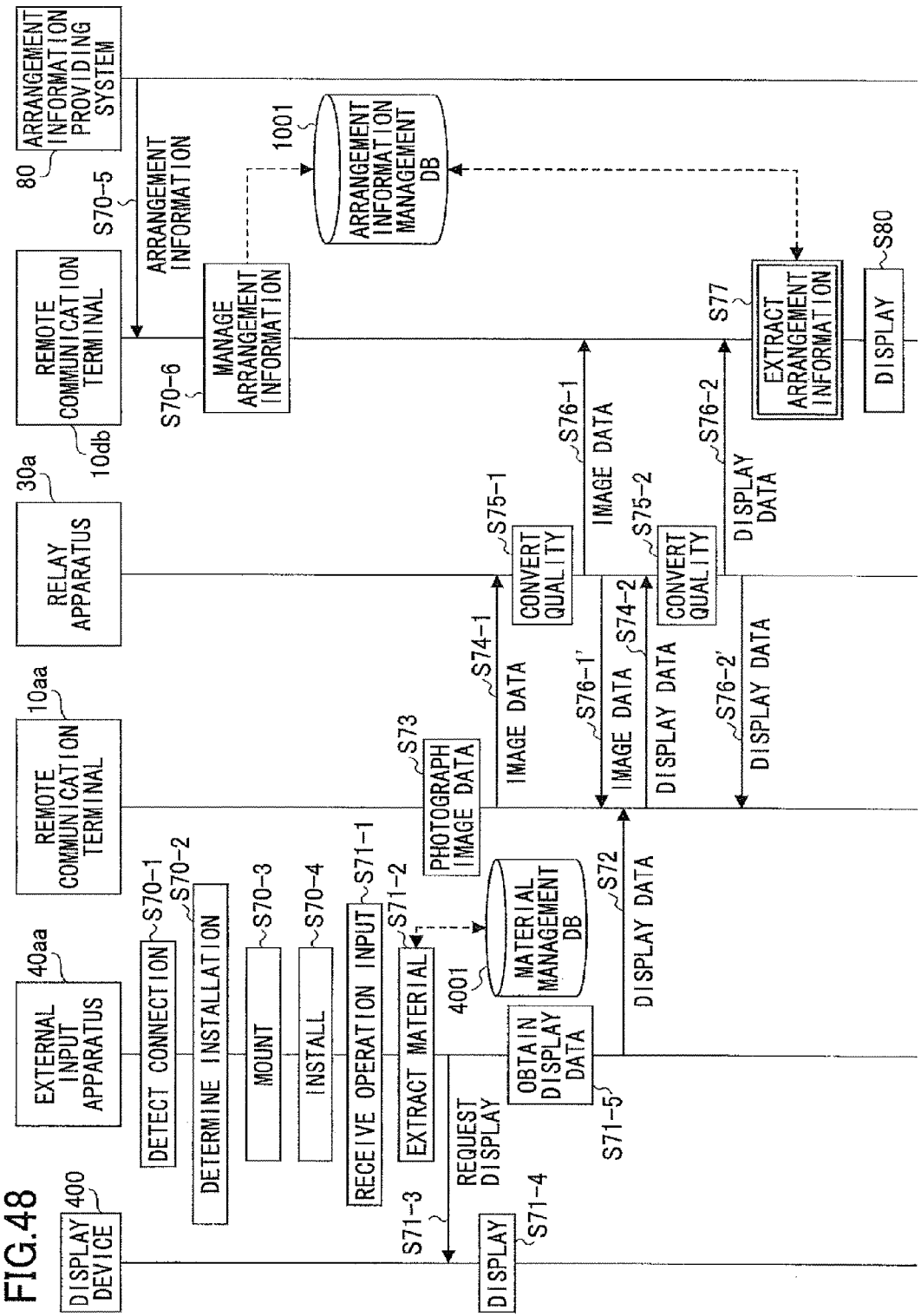
FIG. 48 is a sequence diagram showing a process of displaying image data and display data by the remote communication terminal according to the second embodiment.
Figure 49:
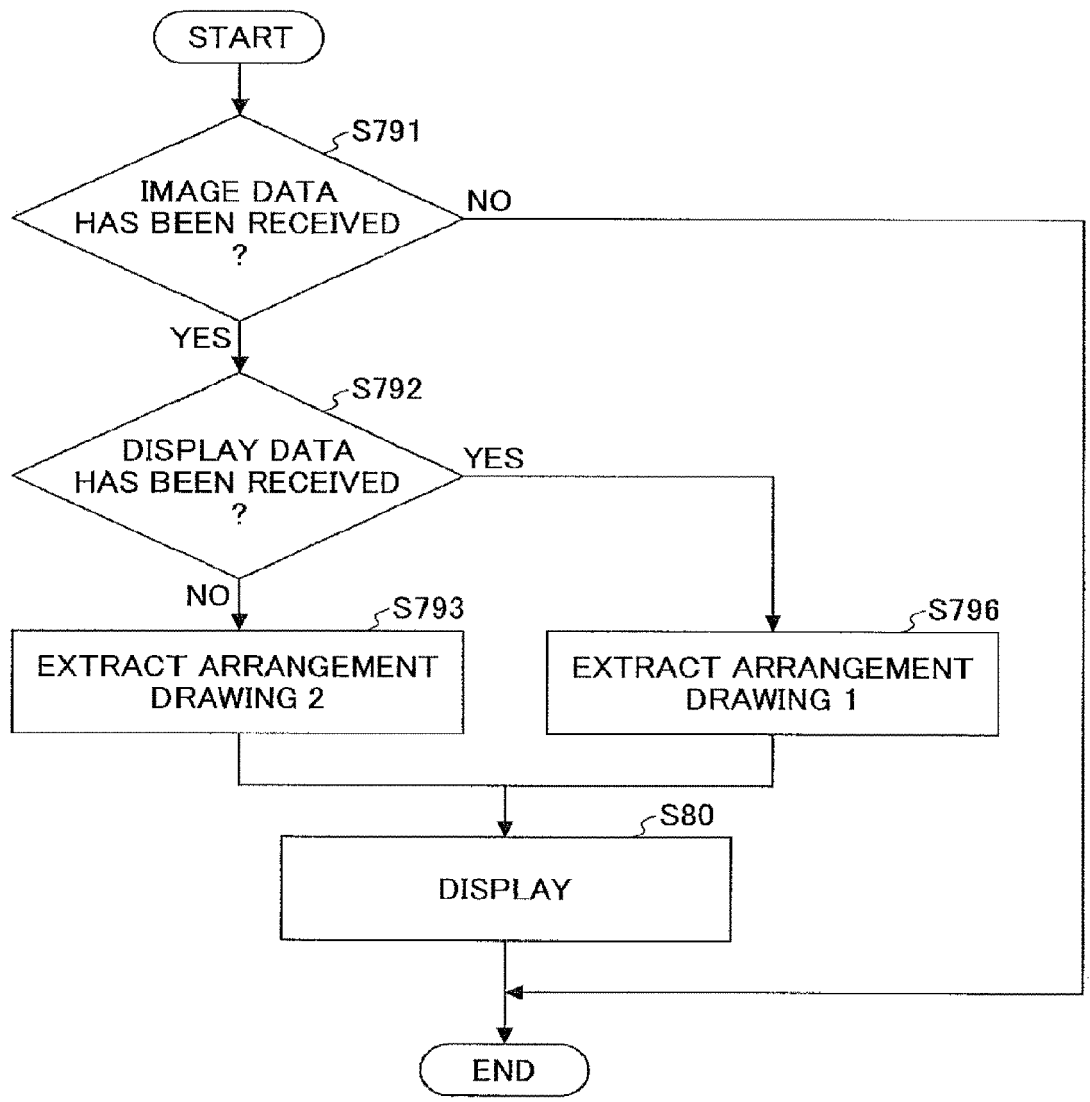
FIG. 49 is a flowchart showing a process of determining, by the remote communication terminal, the arrangement in the process of displaying image data and display data according to the second embodiment.
Figure 50A:
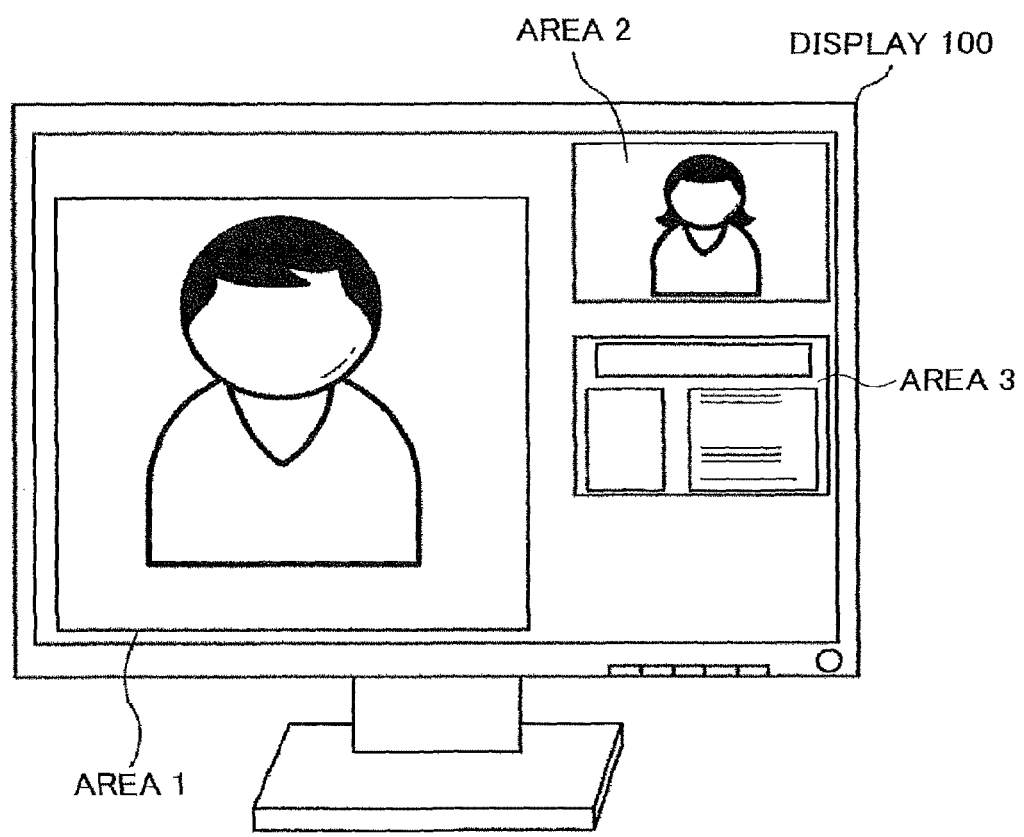
FIGS. 50A, 50B show examples of images displayed on the remote communication terminal.
Figure 50B:
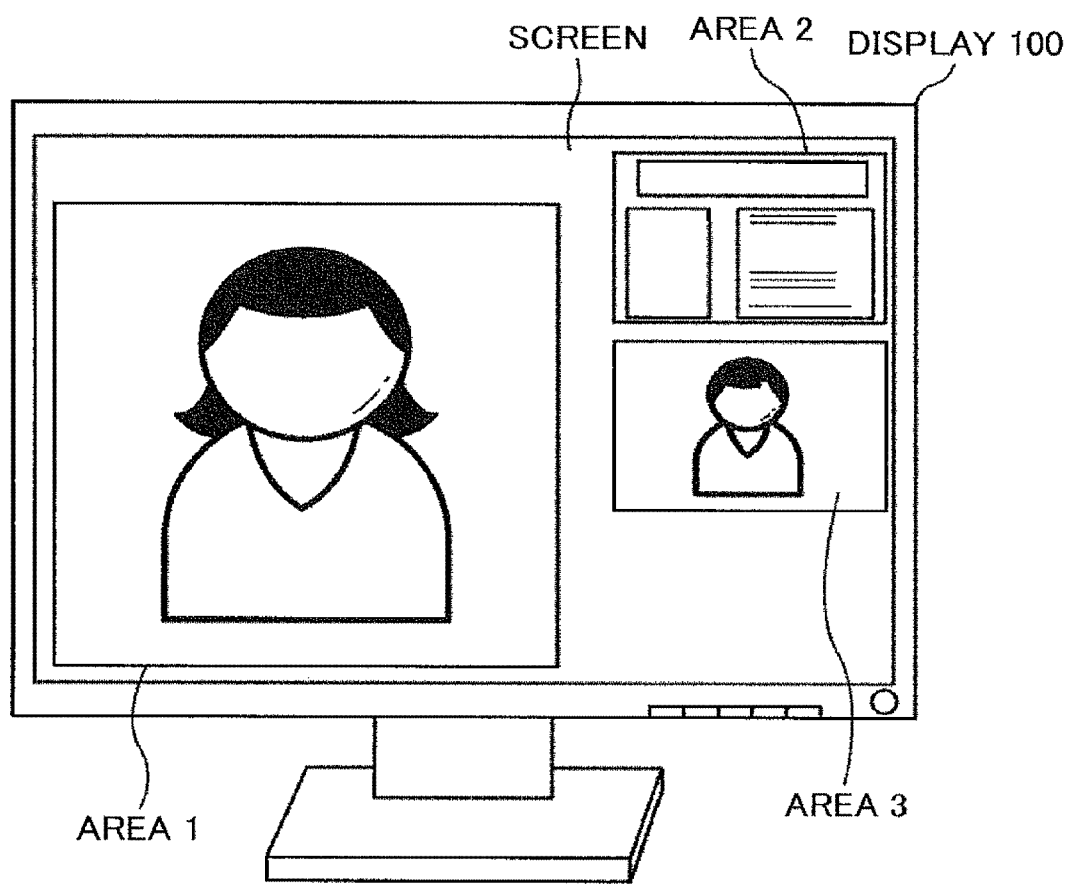
Figure 51:
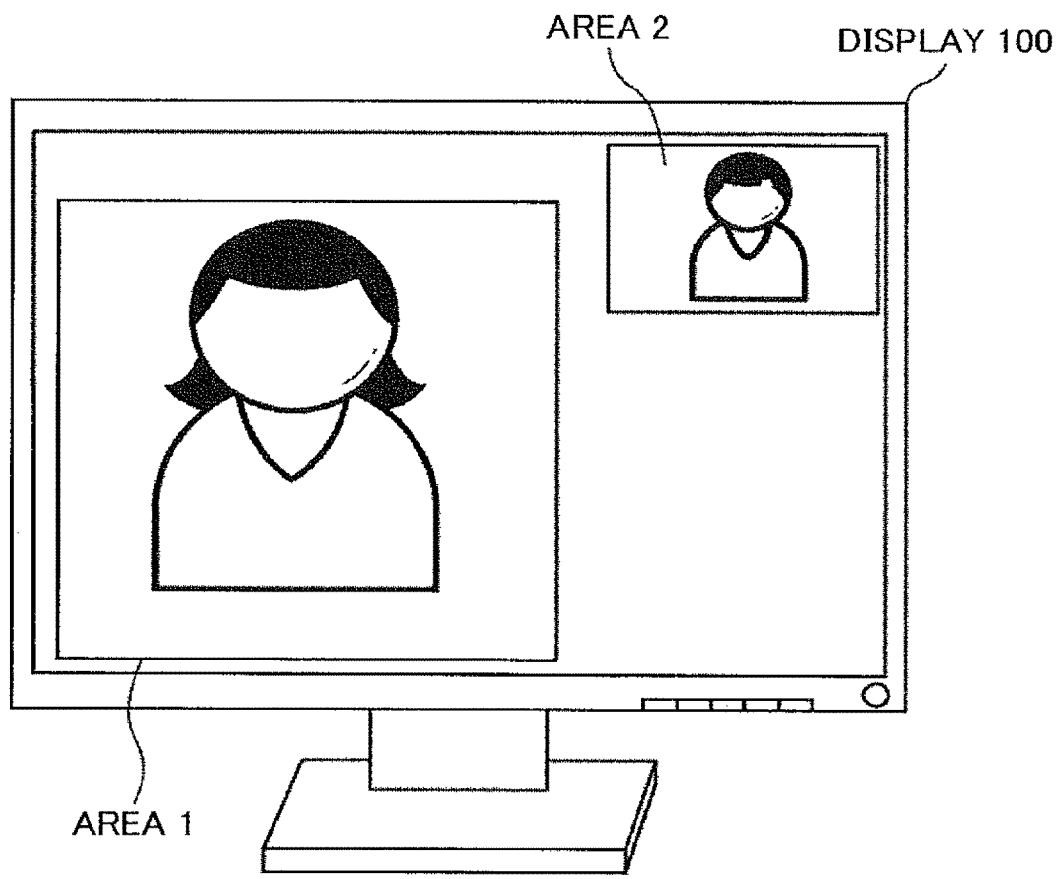
FIG. 51 shows an example of an image displayed on the remote communication terminal.

FIG. 45 shows a concept of the arrangement information management table stored by the storage part 1000 according to the second embodiment. FIGS. 46A and 46B show the examples of screen pages in which the material data and the image data are displayed based on the arrangement drawings as the arrangement information stored in the storage part 1000 according to the second embodiment. FIG. 48 is a sequence diagram showing a process of displaying the image data and the display data by the remote communication terminal 10. FIG. 49 is a flowchart showing a process of determining, by the remote communication terminal 10, the arrangement information used for displaying the image data and the display data. FIGS. 50A, 50B show examples of images displayed on the remote communication terminal 10. FIG. 51 shows an example of an image displayed on the remote communication terminal 10.

Next, using FIG. 48, a process of displaying, at the communication terminal 10*db*, the display data for indicating a screen page of material data of the external input apparatus 40*aa* connected with the communication terminal 10*aa* and the image data input from the communication terminal 10*aa* will be described.

When the external input apparatus 40*aa* and the remote communication terminal 10*aa* are connected together, the connection detection part 45 of the external input apparatus 40*aa* detects it (step S70-1). When the connection detection part 45 of the external input apparatus 40*aa* thus detects that the external input apparatus 40*aa* and the remote communication terminal 10*aa* have been connected together, the installation determination part 46 determines whether the display data obtaining part 44 has been already installed (step S70-2). When it is determined that the display data obtaining part 44 has not been installed yet in step S70-2, the mounting part 47 of the external input apparatus 40*aa* mounts the storage part 1000 of the remote communication terminal 10*aa* (step S70-2), the program obtaining part 48 obtains the display data obtaining part 44 stored in the storage part 1000, and installs it (step S70-4).

In a case where it is determined in step S70-2 that the display data obtaining part 44 has been already installed, the process starting from step S71-1 is proceeded to.

Previously, the arrangement information in which areas and sizes of displaying the image data and the display data on the screen of the remote communication terminal 10 are defined is stored in the remote communication terminal 10. Specifically, from the arrangement information providing system 80, the transmission/reception part 11 of the remote communication terminal 10*db* receives the arrangement information via the Internet 2*i*, the private line 2*cd* and the LAN 2*d* (step S70-5), and the storing/reading processing part 19 stores the arrangement information in the arrangement information management DB 1001 stored in the storage part 1000 (step S70-6).

When a TV conference has been started, the photographing part 14*a* of the remote communication terminal 10*aa* takes a picture of the conference participant or such to obtain the image data (step S73). The image data obtained in step S73 is transmitted to the relay apparatus 30*a* by the transmission/reception part 11 (step S74-1). The relay apparatus 30*a* having received the image data converts the quality of the image (step S75-1), and transmits the image data to the remote communication terminal 10*db* (step S76-1). Then, the transmission/reception part 11 of the remote communication terminal 10*db* receives the image data transmitted from the relay apparatus 30*a*, and extracts the arrangement information used for displaying, from the arrangement information management DB 1001 (step S77).

Further, the relay apparatus 30*a* transmits the image data of the image converted in step S75-1 also to the remote communication terminal 10*aa* (step S76-1'). The transmission/reception part 11 of the remote communication terminal 10*aa* receives the image data transmitted from the relay apparatus 30*a*, and carries out the process the same as that carried out by the remote communication terminal 10*db* in steps S77 and S80.

On the other hand, the operation input reception part 42 of the external input apparatus 40*aa* (see FIG. 27) receives information of at least one of a material name, a size, an application name and updated date and time from the operator (step S71-1). Then, the storing/readying processing part 49 searches the material management DB 4001 of the storage part 4000 using the information received by the operation input reception part 42 as a search key, and extracts the corresponding material (step S71-2). Then, the display control part 43 requests to display the extracted material on the display device 400 (step S71-3), and the display device 400 displays the material data (step S71-4). Next, the display data obtaining part 44 obtains the display data of a screen page including the display of the material data thus requested by the display control part 43 to display on the display device 400 in step S71-3 (step S71-5), and the transmission/reception part 41 transmits the obtained display data to the external information transmission/reception part 18 of the communication terminal 10*aa* (step S72). The transmission/reception part 11 transmits the display data that has been thus received in step S72 to the relay apparatus 30*a* (step S74-2). The relay apparatus 30*a* having received the display data converts the quality of the image of the display data (step S75-2), and transmits the display data (the quality of the image of which has been thus converted) to the communication terminal 10*db* (step S76-2). Then, the transmission/reception part 11 of the communication terminal 10*db* receives the display data transmitted from the relay apparatus 30*a*, and extracts the arrangement information for displaying, from the arrangement information management DB 1001 (step S77).

Further, the relay apparatus 30*a* transmits the display data of the image converted in step S75-2 also to the remote communication terminal 10*aa* (step S76-2'). The transmission/reception part 11 of the remote communication terminal 10*aa* receives the image data transmitted from the relay apparatus 30*a*, and carries out the process the same as that carried out by the remote communication terminal 10*db* in steps S77 and S80.

Details of the process of converting the quality of the image in steps S75-1 and S75-2 are the same as those of the process of changing the quality of the image data described above (steps S81 through S94), and duplicate description thereof will be omitted.

Next, using FIG. 49, the process of extracting the arrangement information carried out in step S77 will be described in detail.

First, the arrangement information extraction part 14*c* determines whether the transmission/reception part 11 has received the image data (step S791). When the image data has not been received, the display control part 14*b* displays nothing and the process is finished. When the image data has been relieved in step S791, the arrangement information extraction part 14*c* determines whether the transmission/reception part 11 has received the display data (step S792). When the display data has received in step S792, the arrangement information management table shown in FIG. 45 is searched using the reception information "received" as a search key, and the arrangement information (corresponding to "arrangement drawing 1" such as that shown in FIG. 46A) indicating that the display data and the image data sets are associated with the respective areas (area 1, area 2 and area 3) is extracted (step S796). When the display data has not received in step S792, the arrangement information management table shown in FIG. 45 is searched using reception information "not received" as a search key, and the arrangement information (corresponding to "arrangement drawing 2" such as that shown in FIG. 46B) indicating that the image data sets are associated with the respective areas (area 1 and area 2) is extracted (step S793).

Then, the display control part 14b creates images based on the image data and the display data and displays the created images on the corresponding respective areas on the screen according to the arrangement information extracted in step S793 or S796 (step S80).

Next, to change the areas at which image data and display data are displayed will now be described.

When the reception information is "received", in step S80, as shown in FIG. 46A, the image based on the display data is displayed at the area 1; the image based on the image data transmitted from the remote communication terminal 10aa of the other participant of the TV conference is displayed at the area 2; and the image photographed by the remote communication terminal 10db of the user is displayed at the area 3. Then, when the user inputs an operation to the remote communication terminal 10db to change the images to be displayed at the respective areas of the screen page, then, as shown in FIG. 50A, the image based on the image data transmitted from the remote communication terminal 10aa of the other participant of the TV conference is displayed at the area 1; the image photographed by the remote communication terminal 10db of the user is displayed at the area 2; and the image based on the display data is displayed at the area 3. Then, when the user again inputs an operation to the remote communication terminal 10db to change the images to be displayed at the respective areas of the screen page, as shown in FIG. 50B, the image photographed by the remote communication terminal 10db of the user is displayed at the area 1; the image based on the display data is displayed at the area 2; and the image based on the image data transmitted from the remote communication terminal 10aa of the other participant of the TV conference is displayed at the area 3. Then, when the user further again inputs an operation to the remote communication terminal 10db to change the images to be displayed at the respective areas of the screen, the respective images are displayed at the areas in the same arrangement as that where the respective image have been displayed in step S80. It is noted that the input of the operation is received by the operation input reception part 12 that is realized by, for example, an arrow key or such.

When the reception information is "not received", in step S80, as shown in FIG. 46B, the image based on the image data transmitted from the remote communication terminal 10aa of the other participant of the TV conference is displayed at the area 1; and the image photographed by the remote communication terminal 10db of the user is displayed at the area 2. After that, in a case where voice data has been obtained from the microphone 114 of the remote communication terminal 10db of the user, as shown in FIG. 51, the image photographed by the remote communication terminal 10db of the user is displayed at the area 1; and the image based on the image data transmitted from the remote communication terminal 10aa of the other participant of the TV conference is displayed at the area 2. In a case where voice data that has been obtained from the microphone 114 of the remote communication terminal 10aa of the other participant of the TV conference has been then received by the transmission/reception part 11 of the remote communication terminal 10db of the user, as shown in FIG. 46B, the image based on the image data transmitted from the remote communication terminal 10aa of the other participant of the TV conference is displayed at the area 1; and the image photographed by the remote communication terminal 10db of the user is displayed at the area 2.

Main Advantageous Effects of Second Embodiment

Thus, according to the second embodiment, based on whether the remote communication terminal has received the display data that is displayed on the external input apparatus of another participant of a TV conference, displaying is controlled using the arrangement information extracted from the storage part. Thereby, it is possible to effectively use the screen of the display device.

Further, when the external input apparatus 40 is connected, the image indicated by the display data is displayed larger than the image indicated by the image data. Thereby, the participant of the TV conference can easily pay attention to material or such prepared for the TV conference.

Further, when the external input apparatus 40 is connected, the image indicated by the display data is displayed at the center more than the image indicated by the image data. Thereby, the participant of the TV conference can easily pay attention to material or such prepared for the TV conference.

Further, according to the second embodiment, in a case where the images of persons or such indicated by the image data are to be given priority in comparison to the image indicated by the display data, the screen page can be switched in response to the user's instruction, and thereby, it is possible to display the images of the persons or such indicated by the image data lager than the image indicated by the display data.

Supplementation of Second Embodiment

It is noted that as the conference system, the example of the conference between places distant from each other has been described. However, the conferences include not only one between distant places but also one between close places such as those in meeting rooms in one building, one between places in one room where a natural voice hardly reaches therebetween, and so forth. That is, the conference means a conference to be carried out using conference apparatuses without being directly carried out, face to face. Further, the conferences include not only a case of three or more persons but also a case between one person and another person (total two persons).

Further, it is possible to control or limit the number of items of the material data. Thereby, it is possible to save resources. Further, in this case, it is possible to display that the number of items of the material data is controlled or limited. Thereby, it is possible to improve convenience of the user.

Further, even in a case where no material data is displayed on the screen of the display device, a process of sharing the display data is carried out. For example, in a case where only a desktop screen page is displayed on the external input apparatus, this screen page itself corresponds to the display data.

Further, whether the remote communication terminal is in a state where the display can be received may be determined from whether the application used for realizing the display data obtaining part 44 or such has been started up. In a case where the application has been started up, the remote communication terminal is in a state of being able to receive the display data, and the reception data "received" may be set. In a case where the application has not been started up, the remote communication terminal is in a state of not being able to receive the display data, and the reception data "not received" may be set. Further, it is also possible to set a state of being able to receive the display data after the application used for obtaining the display data obtaining part 44 or such has been started up. In this case, by the application, on the display device 400 of the external input apparatus 40, a menu of "start sharing", "stop sharing" or such is displayed, the user is urged to select one of these menu items, and thereby, the reception information of "received" or "not received" may be determined. That is, when the user has selected "start sharing", the reception information "received" may be set. When the user has selected "stop sharing", the reception information "not received" may be set.

Each of the communication management system 50 and the program providing system 90 according to the second embodiment may be realized by a single computer, or may be realized by plural computers where the respective parts (or functions) are divided and are arbitrarily allocated to the plural computers. Further, in a case where the program providing system 90 is realized by a single computer, a program to be transmitted by the program providing system 90 may be transmitted as having been divided into plural modules, or may be transmitted as not having been divided into plural modules. Further, in a case where the program providing system 90 is realized by plural computers, divided plural modules may be transmitted by the plural computers, respectively.

Further, recording media such as CD-ROMs storing the program for the remote communication terminal, the program for the relay apparatus and the program for remote communication management, the HD 204 storing these programs, and the program providing system 90 including the HD 204, are used in a case where the program for the remote communication terminal, the program for the relay apparatus and the program for remote communication management, as program products, are provided to users or such in the home country or aboard.

Further, in the above-mentioned second embodiment, quality of image data is managed in particular using resolution of an image of image data as one example of quality of an image of image data relayed by the relay apparatus 30, using the change quality management table shown in FIG. 7 and the quality management table shown in FIG. 15. However, quality of data is not limited thereto, and as other examples of quality of data, data may be managed in particular using depth (for example, color depth) of image quality of image data, a sampling frequency in voice data, a bit length in voice data, or such. Further, voice data may be transmitted as having been divided into three resolutions (i.e., high resolution, medium resolution and low resolution).

Further, in FIGS. 8, 10 and 12, the reception dates and times are managed. However, it is not necessary to be limited thereto, and it may be sufficient that at least the reception times from among the reception dates and times are managed.

Further, in the above-mentioned embodiments, the IP addresses of the relay apparatuses in FIG. 8 and the IP addresses of the communication terminals in FIG. 10 are managed. However, it is not necessary to be limited thereto, and as long as relay apparatus identification information for identifying the relay apparatus 30 in the remote communication network 2 or terminal identification information for identifying the remote communication terminal 10 in the remote communication network 2 is used, a FQDN (Fully Qualified Domain Name) thereof may be managed. In this case, the IP address corresponding to the FQDN will be obtained from a well-known DNS (Domain Name System) server. It is noted that "relay apparatus identification information for identifying the relay apparatus 30 in the remote communication network 2" may also be expressed as "relay apparatus connecting destination information indicating a connecting destination for the relay apparatus 30 in the remote communication network 2" or "relay apparatus destination information indicating a destination for the relay apparatus 30 in the remote communication network 2". Similarly, "terminal identification information for identifying the remote communication terminal 10 in the remote communication network 2" may also be expressed as "terminal connecting destination information indicating a connecting destination for the remote communication terminal 10 in the remote communication network 2" or "terminal destination information indicating a destination for the remote communication terminal 10 in the remote communication network 2".

Further, in the above-mentioned embodiments, as an example of the communication system 1, the case of the TV conference system has been described. However, it is not necessary to be limited thereto, and an example of the remote communication system 1 may be a telephone system for IP (Internet Protocol) telephone, Internet telephone, or such. Further, the transmission system 1 may be an automotive navigation system. In this case, one of the remote communication terminals 10 corresponds to an automotive navigation apparatus mounted in one automobile, and another of the remote communication terminals 10 corresponds to a management terminal or a management server in a management center which manages the automotive navigation system, or an automotive navigation apparatus mounted in another automobile. Further, the remote communication system 1 may be a communication system for cellular phones. In this case, the terminals correspond to cellular phones.

Further, although the case has been described where the external input apparatus 40 displays data from the display device 400, the display device 400 may be an apparatus separate from the external input apparatus 40, or may be provided to the external input apparatus 40.

Although this invention has been described in detail with reference to certain embodiments, variations and modifications exist within the scope and spirit of the invention as described and defined in the following claims.

The invention claimed is:

1. A communication terminal which is capable of carrying out communication with another communication terminal via a communication network, comprising:
   a receiver configured to receive, from the another communication terminal, both an image data taken by a photography device, and a display data that is different from the image data and is displayed on a screen of a display device at the another communication terminal as separate transmissions from each other; and
   processing circuitry configured to automatically control display of the image data based on arrangement information retrieved from a memory that indicates at least one of a size and a position of displaying the image data on a screen of a display device at the communication terminal, the arrangement information being different depending on whether the receiver receives the display data, wherein the arrangement information includes at least first arrangement information and second arrangement information which each indicate a different predetermined allocation of the image data to one of predefined areas within the screen of the display device at the communication terminal, the predetermined allocation being different depending on whether the receiver receives the display data such that the image data is automatically allocated by the communication terminal to a certain one of the predefined areas according to the second arrangement information that is retrieved from the memory when the display data is not received as a separate communication stream from the image data, and the display data is automatically allocated by the communication terminal to a certain one of the predefined areas and the image data is automatically allocated by the communication terminal to a different one of the predefined areas according to the first arrangement information that is retrieved from the memory when the display data is received as a separate communication stream from the image data.

2. The communication terminal as claimed in claim 1, wherein when the receiver has received the display data, the processing circuitry is configured to control display of the image corresponding to the received display data larger than the image corresponding to the received image data according to an arrangement based on the arrangement information.

3. The communication terminal as claimed in claim 1, wherein
the processing circuitry is configured to control display of the image corresponding to the image data displayed in the arrangement according to the second arrangement information at a position closer to the center than the image corresponding to the image data displayed in the arrangement according to the first arrangement information.

4. The communication terminal as claimed in claim 1, the processing circuitry being configured to receive an instruction concerning a position or a size to display the image indicated by the image data and the image indicated by the display data, wherein
the processing circuitry is configured to change the position or the size to display the images indicated by the image data and the display data based on the received instruction.

5. The communication terminal as claimed in claim 4, wherein
the processing circuitry configured to receive an instruction to replace positions of the images indicated by the image data and the image indicated by the display data with one another, and
when the processing circuitry has received the instruction, the processing circuitry is configured to replace the positions of the image indicated by a first set of image data and the image indicated by a second set of image data of plural sets of the image data and the image indicated by the display data with each other.

6. The communication terminal as claimed in claim 1, wherein the display data is produced by application software.

7. The communication terminal as claimed in claim 1, wherein the display data is displayed on a same user interface of a videoconference session as the image data.

8. The communication terminal as claimed in claim 1, wherein the arrangement information indicates (i) at least one of a size and a position of the image based on the image data when the display data has not been received, and (ii) at least one of a size and position of the image based on the image data and a layout position of the display data in relation to the image data when the display data has been received.

9. A method, implemented by a communication terminal which is capable of carrying out communication with another communication terminal via a communication network, comprising:
receiving, by a receiver, from the another communication terminal, both an image data taken by a photography device, and a display data that is different from the image data and is displayed on a screen of the another communication terminal as separate transmissions from each other; and
automatically controlling, by processing circuitry, display of an image corresponding to the image data based on arrangement information retrieved from a memory that indicates at least one of a size and a position of displaying the image corresponding to the image data on a screen of a display device at the communication terminal, the arrangement information being different depending on whether the receiver receives the display data, wherein the arrangement information includes at least first arrangement information and second arrangement information which each indicate a different a predetermined allocation of the image data to one of predefined areas within the screen of the display device at the communication terminal, the predetermined allocation being different depending on whether the receiver receives the display data such that the image data is automatically allocated by the communication terminal to a certain one of the predefined areas according to the second arrangement information that is retrieved from the memory when the display data is not received as a separate communication stream from the image data, and the display data is automatically allocated by the communication terminal to a certain one of the predefined areas and the image data is automatically allocated by the communication terminal to a different one of the predefined areas according to the first arrangement information that is retrieved from the memory when the display data is received as a separate communication stream from the image data.

10. The method as claimed in claim 9, wherein when the receiver has received the display data, the method further includes controlling display of the image corresponding to the received display data larger than the image corresponding to the received image data according to an arrangement based on the arrangement information.

11. The method as claimed in claim 9, further comprising:
controlling display of the image corresponding to the image data displayed in the arrangement according to the second arrangement information at a position closer to the center than the image corresponding to the image data displayed in the arrangement according to the first arrangement information.

12. The method as claimed in claim 9, further comprising:
receiving an instruction concerning a position or a size to display the image indicated by the image data and the image indicated by the display data; and
changing the position or the size to display the images indicated by the image data and the display data based on the received instruction.

13. The method as claimed in claim 12, further comprising:
receiving an instruction to replace positions of the images indicated by the image data and the image indicated by the display data with one another; and
when the instruction is received, replacing the positions of the image indicated by a first set of image data and the image indicated by a second set of image data of plural sets of the image data and the image indicated by the display data with each other.

14. The method as claimed in claim 9, wherein the display data is produced by application software.

15. The method as claimed in claim 9, wherein the display data is displayed on a same user interface of a videoconference session as the image data.

16. The method as claimed in claim 9, wherein the arrangement information indicates (i) at least one of a size and a position of the image based on the image data when the display data has not been received, and (ii) at least one of a size and position of the image based on the image data and a layout position of the display data in relation to the image data when the display data has been received.

17. A non-transitory computer readable information recording medium storing a communication program executed by a communication terminal which is capable of carrying out communication with another communication terminal via a communication network, the communication program causing the communication terminal to execute a method comprising:

receiving, by a receiver, from the another communication terminal, both an image data taken by a photography device, and a display data that is different from the image data and is displayed on a screen of the another communication terminal as separate transmissions from each other; and automatically controlling, by processing circuitry, display of an image corresponding to the image data based on arrangement information retrieved from a memory that indicates at least one of a size and a position of displaying the image corresponding to the image data on a screen of a display device at the communication terminal, the arrangement information being different depending on whether the receiver receives the display data, wherein the arrangement information includes at least first arrangement information and second arrangement information which each indicate a different a predetermined allocation of the image data to one of predefined areas within the screen of the display device at the communication terminal, the predetermined allocation being different depending on whether the receiver receives the display data such that the image data is automatically allocated by the communication terminal to a certain one of the predefined areas according to the second arrangement information that is retrieved from the memory when the display data is not received as a separate communication stream from the image data, and the display data is automatically allocated by the communication terminal to a certain one of the predefined areas and the image data is automatically allocated by the communication terminal to a different one of the predefined areas according to the first arrangement information that is retrieved from the memory when the display data is received as a separate communication stream from the image data.

18. The communication terminal as claimed in claim 1, wherein when the receiver receives the display data and the display data is provided from an external input apparatus that is connected to the another communication terminal via a cable, the receiver is configured to receive, from the another communication terminal, transmission stop information to indicate that the transmission of the display data is stopped when the cable is disconnected between the external input apparatus and the another communication terminal, and in response to receiving the transmission stop information, the processing circuitry is configured to automatically control display of the image data based the second arrangement information.

\* \* \* \* \*